(12) United States Patent  
Tsujimoto

(10) Patent No.: US 6,201,932 B1  
(45) Date of Patent: Mar. 13, 2001

(54) CAMERA USED WITH LIGHT SOURCE TYPE DETECTING CIRCUIT

(75) Inventor: Shinichi Tsujimoto, Tokyo (JP)

(73) Assignee: Canon Kabushiki Kaisha, Toyko (JP)

( * ) Notice: Subject to any disclaimer, the term of this patent is extended or adjusted under 35 U.S.C. 154(b) by 0 days.

(21) Appl. No.: 08/786,255

(22) Filed: Jan. 22, 1997

Related U.S. Application Data

(63) Continuation of application No. 08/372,241, filed on Jan. 13, 1995, now abandoned.

(30) Foreign Application Priority Data

Jan. 18, 1994 (JP) .................................................. 6-016966  
Mar. 31, 1994 (JP) .................................................. 6-083600  
Jul. 15, 1994 (JP) .................................................. 6-185097

(51) Int. Cl.[7] ............................. G03B 7/00; G03B 17/18; G03B 17/24
(52) U.S. Cl. ........................... 396/225; 396/287; 396/319
(58) Field of Search ............................ 396/225, 233, 396/275, 287, 319, 543

(56) References Cited

U.S. PATENT DOCUMENTS

| | | | |
|---|---|---|---|
| 4,389,118 | * 6/1983 | Yuasa et al. | 356/404 |
| 5,128,708 | * 7/1992 | Murayama et al. | 354/430 |
| 5,130,742 | * 7/1992 | Miyamoto et al. | 354/475 |
| 5,172,146 | * 12/1992 | Wooldridge | 354/21 |
| 5,298,935 | 3/1994 | Nagata | 354/430 |
| 5,394,217 | * 2/1995 | Gaboury et al. | 354/430 |
| 5,500,709 | * 3/1996 | Kazami et al. | 354/416 |
| 5,543,872 | * 8/1996 | Goto et al. | 396/319 |
| 5,548,398 | * 8/1996 | Gaboury | 356/218 |
| 5,617,175 | * 4/1997 | Asakura et al. | 396/166 |
| 5,710,948 | * 1/1998 | Takagi | 396/50 |

FOREIGN PATENT DOCUMENTS

| | | |
|---|---|---|
| 0663607 | 7/1995 | (EP) . |
| 5197009 | 8/1993 | (JP) . |

OTHER PUBLICATIONS

Patent Abstracts of Japan No. JP5197009, published Aug. 6, 1993, vol. 017, No. 621 (P–1645), Nov. 16, 1993.

* cited by examiner

Primary Examiner—Christopher E. Mahoney  
(74) Attorney, Agent, or Firm—Robin, Blecker & Daley

(57) ABSTRACT

The present invention relates to a camera capable of making a decision as to the kind of illumination light source and recording information indicative of the result of the decision on a magnetic recording part of a film. In the camera provided according to the present invention, the kind of light source detected at an arbitrary time instant when a manual operation independent of a shutter release operation is carried out is stored, and the stored value is magnetically recorded during a photographic operation executed by a shutter release operation at a later time.

13 Claims, 38 Drawing Sheets

F I G. 10
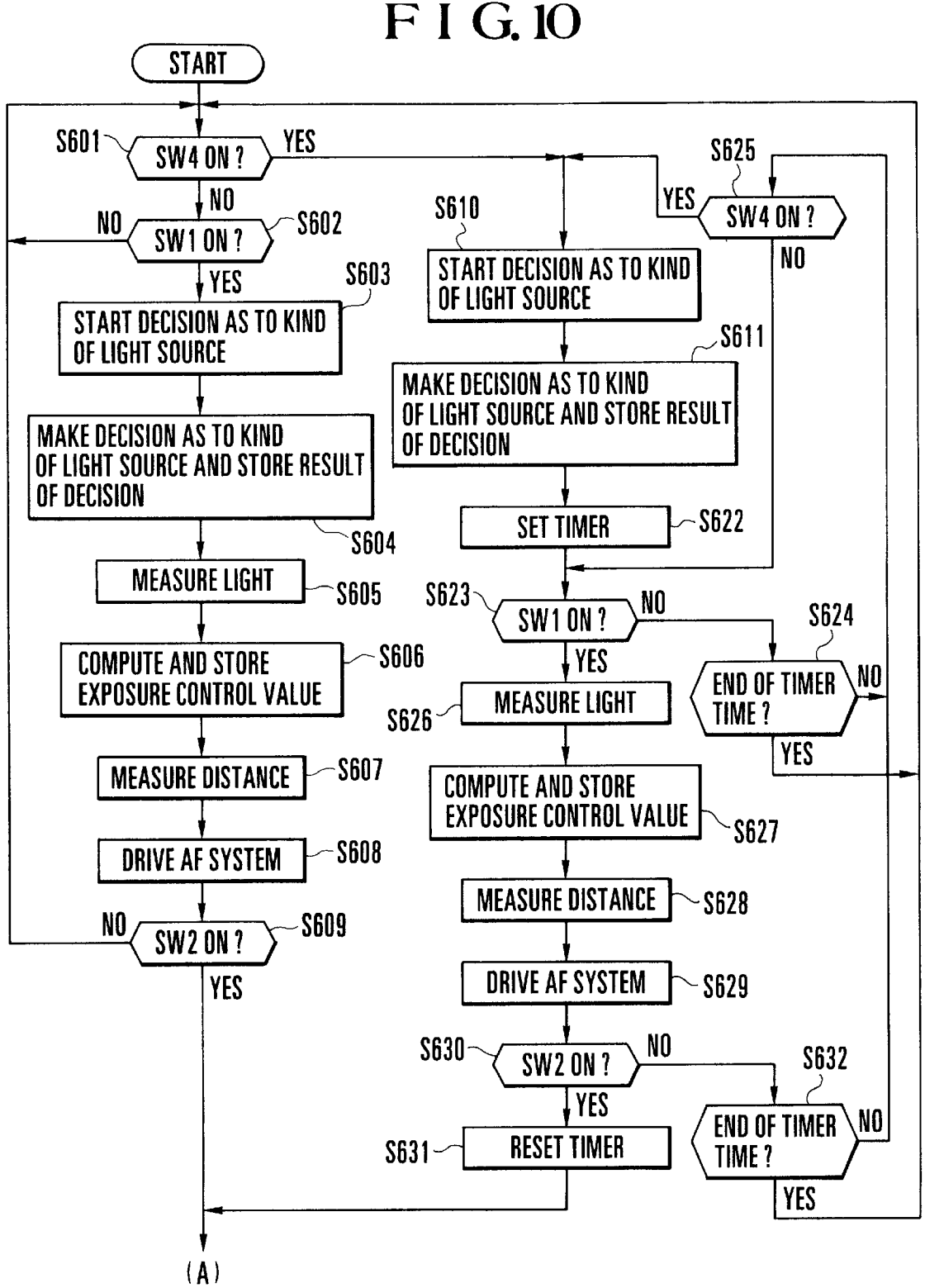

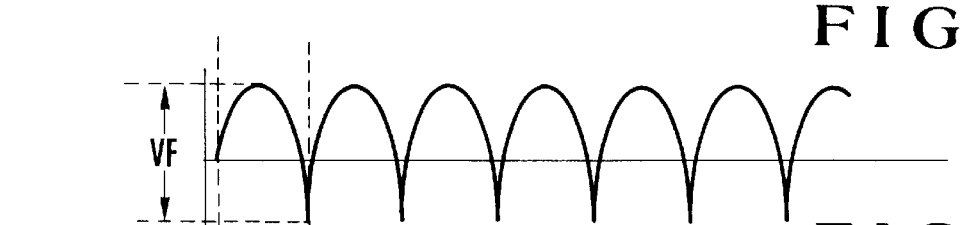
FIG.12(a)
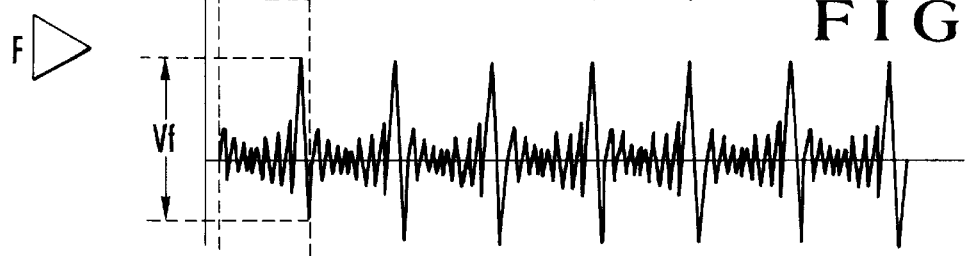
FIG.12(b)
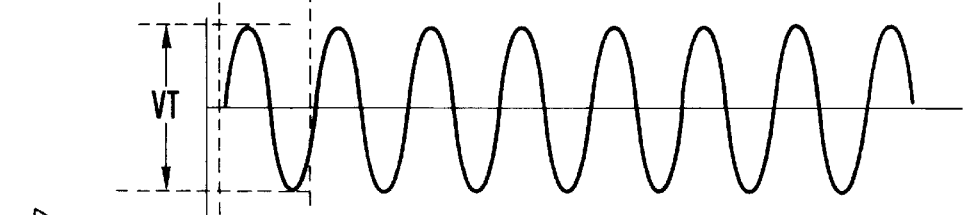
FIG.12(c)
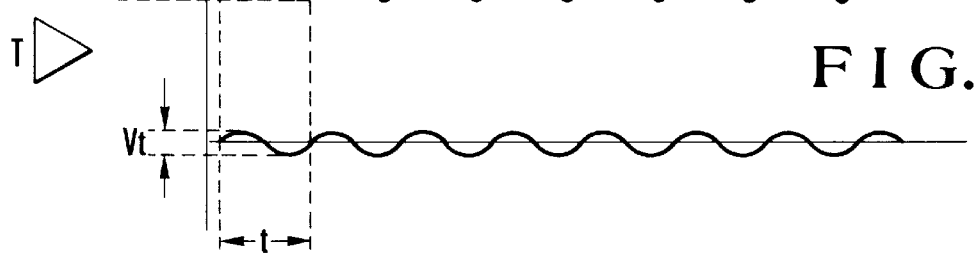
FIG.12(d)
FIG.12(e)
FIG.12(f)

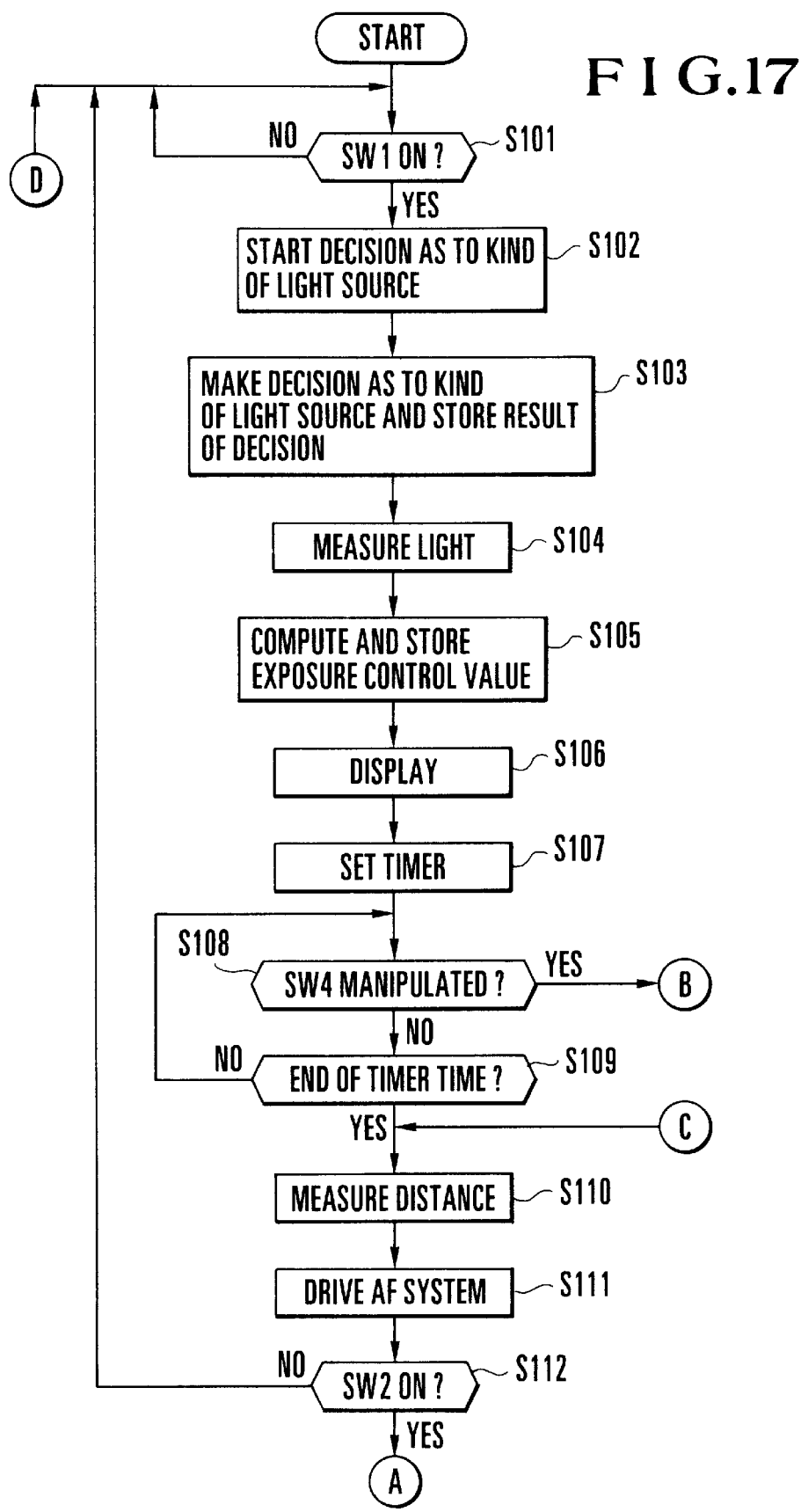

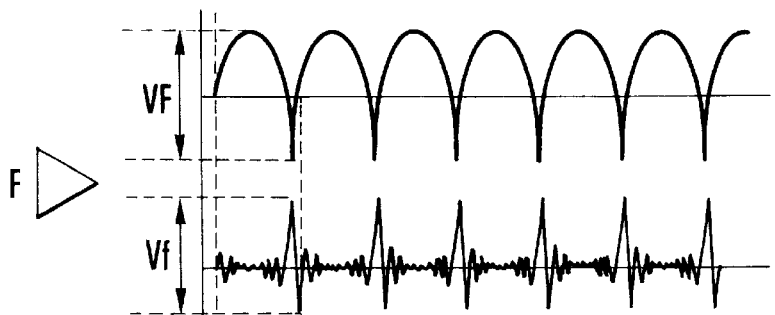
FIG.33(a)
FIG.33(b)
FIG.33(c)
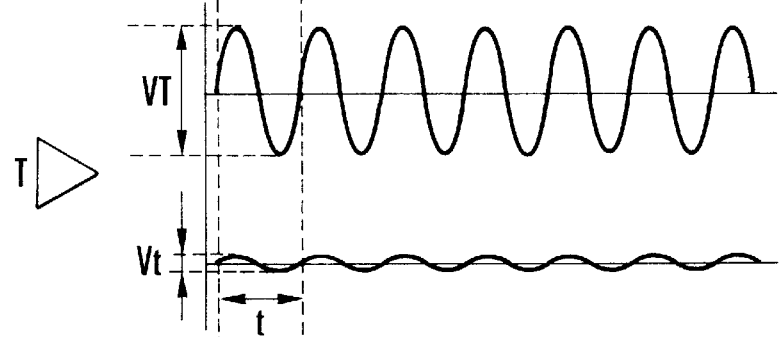
FIG.33(d)
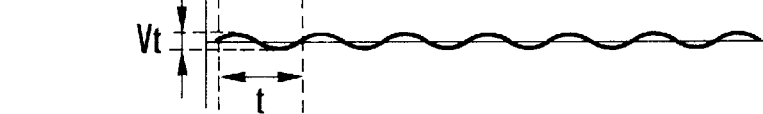
FIG.33(e)
FIG.33(f)
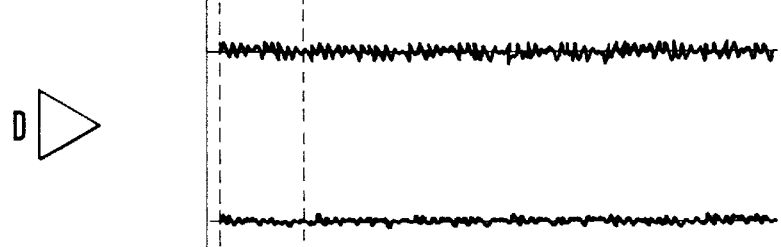
FIG.33(g)
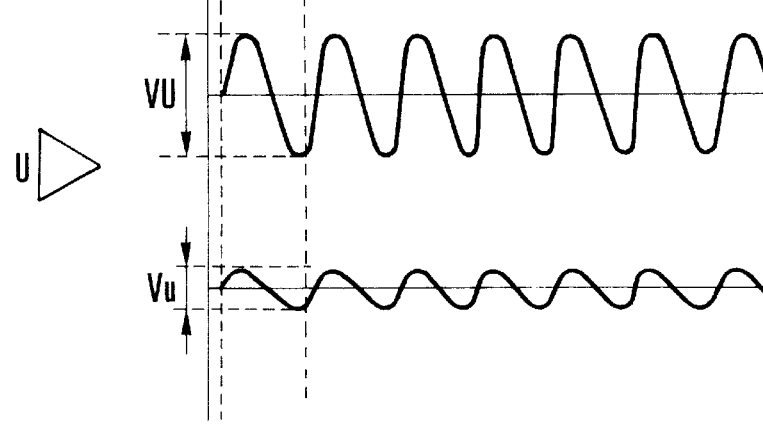
FIG.33(h)
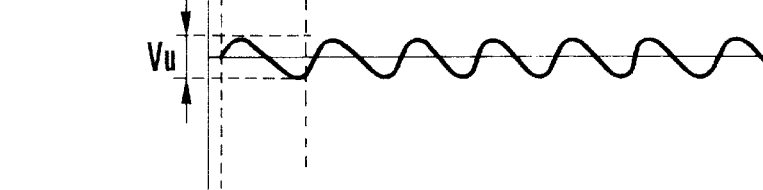

CAMERA USED WITH LIGHT SOURCE TYPE DETECTING CIRCUIT

This is a continuation application under 37 CFR 1.62 of prior application Ser. No,. 08/372,241, filed Jan. 13, 1995, now abandoned.

BACKGROUND OF THE INVENTION

1. Field of the Invention

The present invention relates to a camera capable of detecting information about the kind of illumination light source used during photography and recording the result of the detection on a photographic film.

2. Description of the Related Art

For example, Japanese Patent Publication No. Sho 58-53327 discloses a camera which is arranged to detect whether the kind of light source used during photography is natural light (sunlight or daylight), a fluorescent lamp or a tungsten lamp, and record the result of the detection on a film as an optical mark.

FIG. 38 is a schematic, front elevational view showing a conventional film on which information about a light source is recorded.

During photography, illumination light is received by a pair of filter and light-receiving elements which have a spectral characteristic showing a peak in an infrared range or a visible light range close thereto as well as a pair of filter and light-receiving elements which have a spectral characteristic showing a peak in an ultraviolet range or a visible light range close thereto. The outputs from the respective pairs which have received the illumination light are compared with each other, and if the amount of received light is larger in the infrared range than in the ultraviolet range, it is determined that the kind of light source is a tungsten lamp. If the kind of light source is not a tungsten lamp, the rectified outputs of the respective pairs are compared with each other and it is determined whether the kind of light source is natural light or a fluorescent lamp, by utilizing the knowledge that a rectified level obtained from the fluorescent lamp becomes lower by the amount of flicker. Three LEDs which respectively correspond to the results of the aforesaid decisions as to illumination light are used to record an imprinting code co at a position independent of both a frame fa of a film f and perforations fp, as shown in FIG. 38.

To produce a print from such film f after development, the imprinting code co is read out by a printer and a printing filter is adjusted according to the kind of illumination light source, thereby effecting appropriate correction of color balance. In this manner, it is possible to eliminate the problem that if a general daylight type of negative film is used to photograph a person under fluorescent illumination, the skin of the photographed person is printed in greenish flesh.

As another conventional means for detecting the kind of illumination light source, Japanese Laid-Open Patent Application No. Hei 3-136026 discloses a camera arranged to detect the color temperature of an illumination light source by using an RGB sensor, convert the color temperature into a color temperature code and record the color temperature code on a film. During printing, the color temperature code is read out to effect correction.

Japanese Laid-Open Patent Application No. Hei 3-163538 discloses a camera arranged to detect the presence or absence of a bright line of 436 nm or 546 nm which is peculiar to a fluorescent lamp, thereby determining whether the kind of illumination light source is a fluorescent lamp.

However, none of the aforesaid conventional examples discloses measures against the problem that the camera may make an erroneous decision as to the kind of light source and record erroneous information on a film. The decision processing proposed by any of the conventional examples is, therefore, imperfect.

FIG. 14 is an explanatory view showing the status in which a decision is made as to the kind of light source by means of a conventional arrangement. As shown specifically in FIG. 14, a camera C is arranged to detect the color of a light source within the extent of a light-receiving angle θ and make a decision as to the kind of light source. Since a person O who is a subject is illuminated with natural light S, the camera C needs to determine that the kind of light source is natural light. However, if a considerably wide area of a background B has a particular color, the camera C will be influenced by the background B. For example, if the background B is green, the camera C will determine that the kind of light source is a fluorescent lamp. This status is generally referred to as the "color-failure scene".

If a tungsten lamp L is located behind the subject O, the camera C will be influenced by the tungsten lamp L and erroneously determines that the kind of light source is a tungsten lamp.

If such an erroneous decision result is recorded on the film without modification and printing conditions for a printer are set on the basis of the recorded data, the color balance of the obtained print will be seriously impaired.

FIG. 39 shows the photographic status in which the person O who is a subject stands near a window W of a room R and the room R is provided with a fluorescent lamp FL as an illumination light source. In such a photographic status, the subject O is illuminated with two kinds of light sources, the natural light S which enters from the window W and illumination light F emitted from the fluorescent lamp FL. Such a scene is generally referred to as the "mixed-illuminant scene". In the case of the mixed-illuminant scene, even if the kind of light source is recorded on the film as fluorescent lamp "F" or natural light "D", it is impossible to produce a good print. In other words, if color correction and print-exposure correction are performed by a method optimum for a particular kind of light source before a print is produced from a frame which contains a photographed subject illuminated with two or more kinds of light sources, the color balance and the amount of print exposure are unnaturally corrected to impair the printing quality of the frame. The above-described problem derived from the mixed-illuminant scene takes place in the printing of various mixed-illuminant scenes illuminated with fluorescent light and tungsten light, natural light and tungsten light, and others.

To prevent the camera C from erroneously determining that the kind of light source is the fluorescent lamp "F", it is necessary to prepare a decision region for detecting a photographic scene illuminated with a fluorescent lamp which emits light containing large amounts of green components and a decision region for detecting a photographic scene illuminated with natural light having natural color, as well as a decision region for detecting a color-failure scene which is slightly greener than natural color. However, there have not yet been disclosures which suggest measures to be taken against the color-failure scene, the mixed-illuminant scene or other similar scenes illuminated with an unknown kind of light source. As is apparent from the above description, there is the problem that it is impossible to make an accurate decision by using the decision processing of making a decision as to the kind of light source in accordance with the conventional three categories, namely, fluorescent light, tungsten light and natural light.

SUMMARY OF THE INVENTION

An object of the present invention is, therefore, to provide a camera capable of accurately detecting and/or recording information about an illumination light source.

To achieve the above object, in accordance with one aspect of the present invention, there is provided a camera arranged to store and hold information about an illumination light source, which is detected at an arbitrary time point or the time point of occurrence of a manual operation, and cause the held information to be recorded on recording means during photography.

In accordance with another aspect of the present invention, there is provided a camera which includes holding means for storing and holding, for a predetermined time period, information stored at an arbitrary time point or the time point of occurrence of a manual operation, and is arranged to cause the information held by the holding means to be recorded on recording means.

In accordance with another aspect of the present invention, there is provided a camera which allows manual setting of information about a light source different from information about an automatically detected illumination light source and which is arranged to cause the automatic detection information or the manually set information to be selectively recorded on recording means.

In accordance with another aspect of the present invention, there is provided a camera which has selectable, information recording modes: a first mode for recording automatically detected information; and a second mode for recording manually set information, and which is arranged to perform information recording in a selected mode.

In accordance with another aspect of the present invention, there is provided a camera arranged to provide a visual display indicative of unknown and/or record data indicative of unknown if it is determined that the kind of light source is unknown.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 10 is a flowchart showing the operation of a camera according to the fifth embodiment of the present invention;

FIGS. 12(a) to 12(f) are views aiding in explaining flicker detection according to the sixth embodiment of the present invention;

FIG. 17 is a flowchart showing the operation of the camera according to the embodiment shown in FIG. 15;

FIGS. 33(a) to 33(h) are different output waveform charts of the flicker detecting circuit shown in FIG. 32;

DETAILED DESCRIPTION OF THE PREFERRED EMBODIMENTS

Preferred embodiments of the present invention will be described below in detail with reference to the accompanying drawings.

Figure 1:
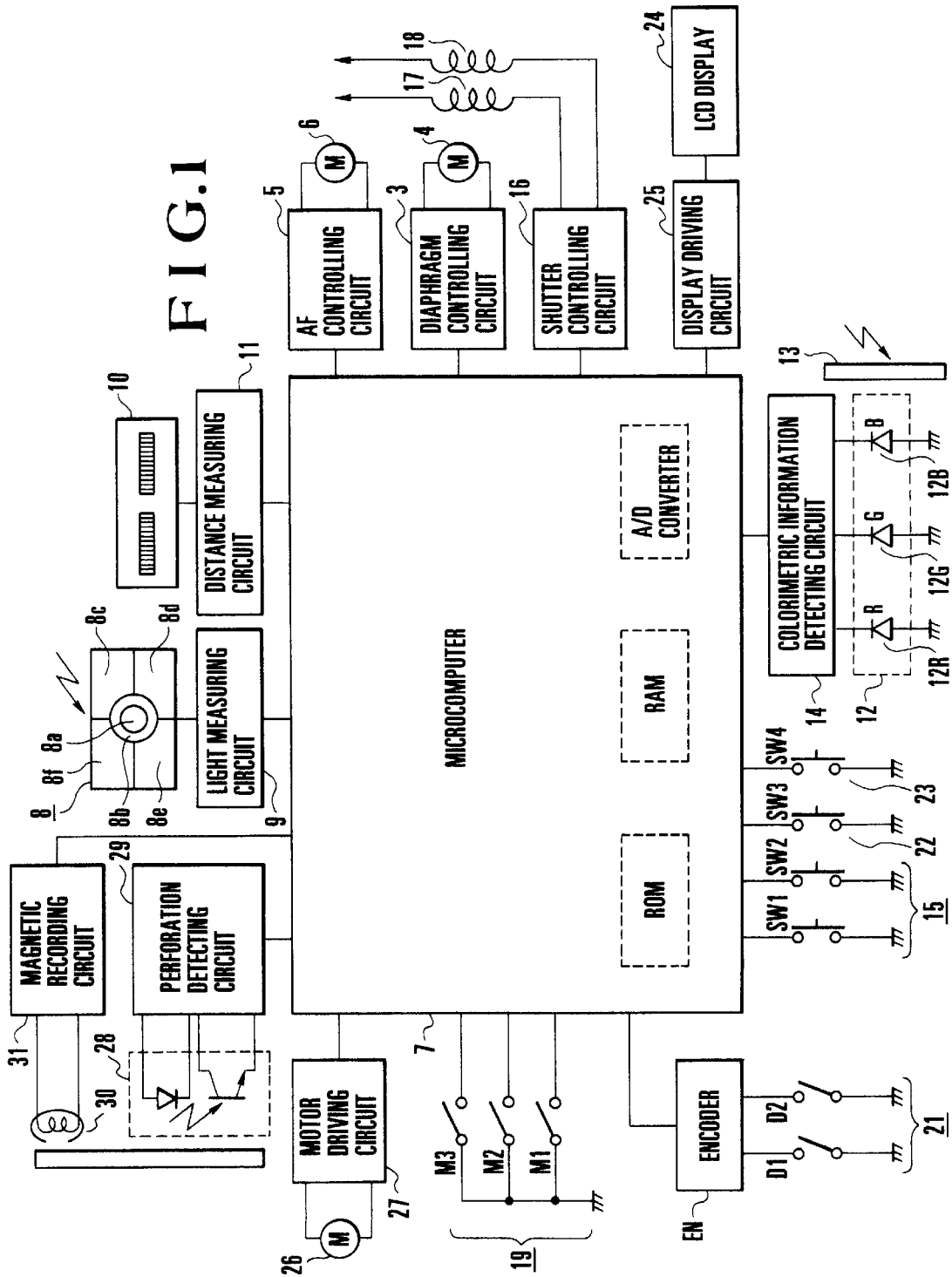
FIG. 1 is a schematic block diagram showing a camera according to a first embodiment of the present invention.
Figure 2A:
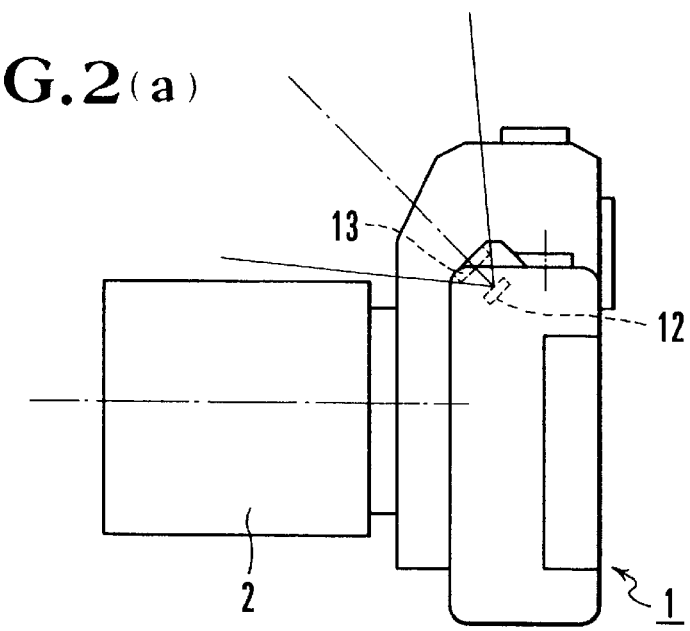
FIGS. 2(a) and 2(b) are a side elevational view and a top plan view schematically showing the external appearance of the camera according to the first embodiment of the present invention.
Figure 2B:
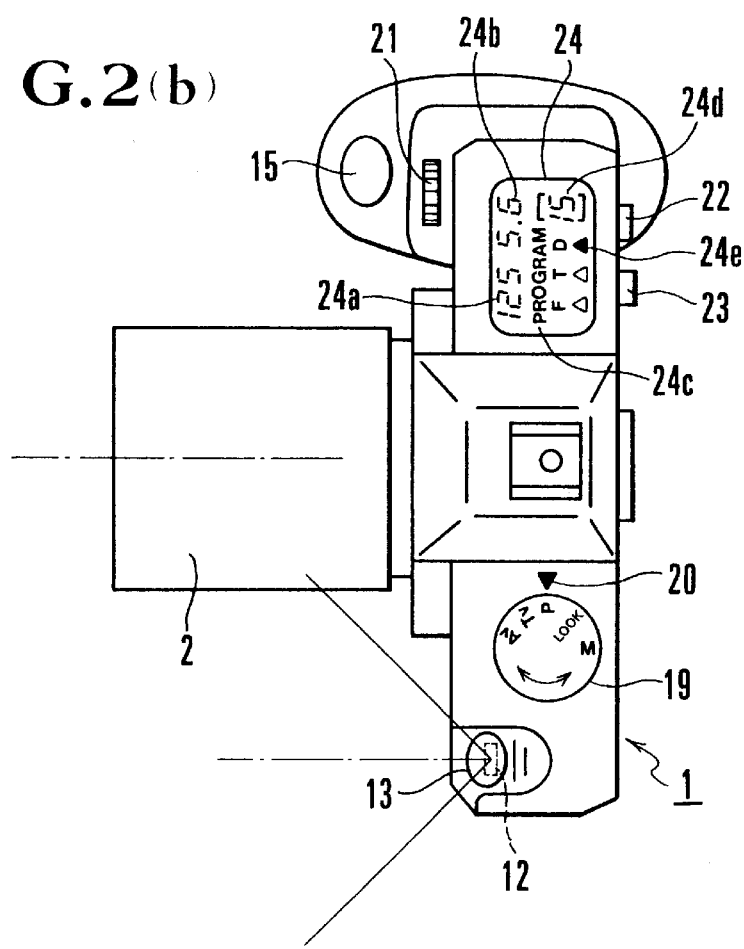

FIG. 1 is a block diagram showing the circuit arrangement of a camera according to a first embodiment of the present invention. FIG. 2(a) is a diagrammatic, side elevational view of the external appearance of the camera, while FIG. 2(b) is a diagrammatic, top plane view of the external appearance of the camera. The camera shown in FIGS. 1 and 2(a), 2(b) includes a camera body 1, a photographic lens 2 which has in its inside a diaphragm controlling circuit 3, a diaphragm driving motor 4, an autofocus (AF) controlling circuit 5 and an autofocus (AF) motor 6, and a microcomputer 7 for the camera which has a ROM, a RAM and an A/D converter. The microcomputer 7 controls all the operations, visual displays and the like needed for the camera in accordance with the program stored in the microcomputer 7, and each part or mechanism of the camera and the photographic lens 2 operates in accordance with an instruction given by the microcomputer 7. The camera also includes a light measuring sensor 8 which is a multiple-point light measuring sensor having six light measuring areas 8a to 8f, a light measuring circuit 9 which amplifies the output signal of the light measuring sensor 8, performs analog-to-digital conversion of the amplified signal and inputs the digital signal to the microcomputer 7, a CCD 10 which serves as a distance measuring sensor, a distance measuring circuit 11, and a calorimetric sensor (hereinafter referred to as the RGB sensor) 12 having three light-receiving parts 12R, 12G and 12B which have sensitivity peaks for R (red), G (green) and B (blue), respectively. The RGB sensor 12 is arranged to detect calorimetric information about photographic light which passes through a white transmission plate 13. The white transmission plate 13 is provided for diffusing the photographic light incident thereon to eliminate the influence of a particular color contained in the incident photographic light in a locally concentrated state. As shown in FIGS. 2(a) and 2(b), the RGB sensor 12 is disposed in the front portion (subject side) of the camera body 1 in such a manner as to receive light coming from above over a wide angular extent. This disposition of the RGB sensor 12 is intended to provide two effects, namely, elimination of the influence of a particular color contained in a subject image in a locally concentrated state, and easy detection of the color of a light source (in many cases, a light source which illuminates a subject is located above the camera). A colorimetric information detecting circuit 14 is provided for amplifying and controlling the output signals of the respective light-receiving parts 12R, 12G and 12B.

Figure 3:
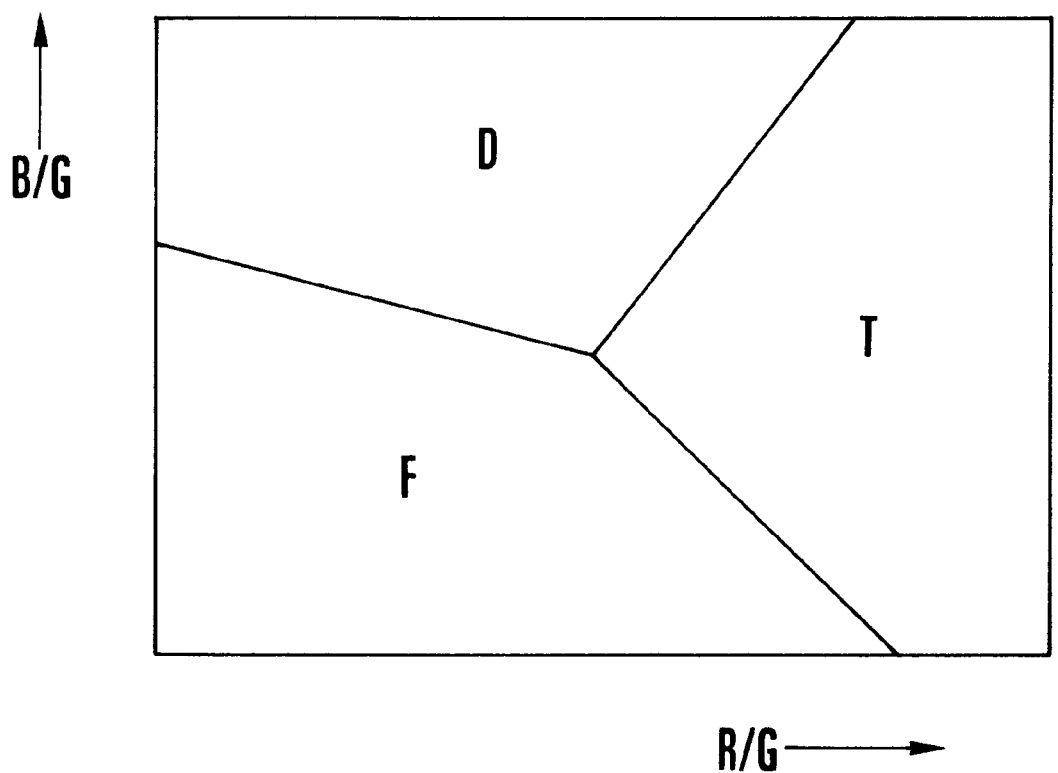
FIG. 3 is a region diagram for use in making a decision as to the kind of light source according to the first embodiment of the present invention.

The light-receiving parts 12R, 12G and 12B of the RGB sensor 12 have spectral sensitivities for an R region (approximately 500 to 650 nm), a G region (approximately 450 to 600 nm) and a B region (approximately 460 to 550 nm), respectively. The output signals of the respective light-receiving parts 12R, 12G and 12B are inputted to the microcomputer 7 via the colorimetric information detecting circuit 14 in the form of an R/G value and a B/G value, and the R/G value and the B/G value are temporarily stored in the RAM. The microcomputer 7 determines whether the illumination light used during photography is daylight (D), a fluorescent lamp (F) or a tungsten lamp (T), on the basis of the R/G value and the B/G value in the accordance with the region diagram shown in FIG. 3. The region diagram shown in FIG. 3 is experimentally obtained in advance, and is stored in the ROM of the microcomputer 7. The camera also includes a release button 15. When the release button 15 is pressed down to a first stroke position, a switch SW1 is closed to start light measurement, distance measurement and colorimetry. When the release button 15 is pressed down to a second stroke position, a switch SW2 is closed to start an exposure operation. A shutter controlling circuit 16 controls a retention-of-shutter-leading-curtain releasing magnet 17, and a retention-of-shutter-trailing-curtain releasing magnet 18, thereby providing a desired shutter time. When the switch SW2 is closed, the microcomputer 7 determines a shutter time and an aperture value on the basis of the output signal of the light measuring circuit 9 and drives the diaphragm controlling circuit 3 and the shutter controlling circuit 16, thereby executing control so that a desired amount of exposure can be obtained. A main dial 19 is provided for determining an exposure mode, and three switches M1 to M3 are provided so that the rotational position of the main dial 19 in either of the opposite directions indicated by the arrow shown in FIG. 2(b) can be detected.

In the first embodiment, it is possible to selectively manipulate four exposure modes by setting a desired one of the marks displayed on the main dial 19 at the position of an index 20. The four exposures are aperture priority automatic exposure (AE), shutter speed priority AE, program AE, and manual setting exposure. The mark "Lock" indicates a position at which to turn off the power of the camera. A setting dial 21 which is used for setting information is provided with two slide contacts D1 and D2, and the slide contacts D1 and D2 are made to rotate with respect to a coding plate (not shown) and the amount of movement of the slide contacts D1 and D2 with respect to the coding plate is detected in the form of a digital electrical signal. The slide contacts D1 and D2 and the coding plate constitute a known, incremental rotary encoder EN. If the setting dial 21 is rotated by one click to the right with the aperture priority AE selected by the main dial 19, the aperture set value varies by 0.5 steps toward a fully open side. If the setting dial 21 is rotated by one click to the left with the aperture priority AE selected by the main dial 19, the aperture set value varies by 0.5 steps toward a small aperture side. Similarly, in the case of the shutter speed priority AE, the shutter speed set value varies in accordance with the manipulation of the setting dial 21, while, in the case of the program AE, both the shutter speed set value and the aperture set value vary by 0.25 steps. If the manual exposure is selected, the shutter speed set value varies in accordance with the manipulation of the setting dial 21, and if the setting dial 21 is rotated with an aperture button 22 depressed (a switch SW3 is closed), the aperture set value varies. The camera also includes a memory lock switch 23 which is related to the present invention, and if the memory lock switch 23 is pressed to close a switch SW4, the result of colorimetry of photographic light is held. The camera also includes a liquid-crystal display (LCD) 24 on which to display a shutter speed 24a, an aperture value 24b, an exposure mode 24c, a frame counter 24d and an index 24e indicative of the kind of photographic light detected (F: fluorescent lamp; T: tungsten lamp; D: daylight). The camera also includes a motor 26 for transporting a film F and a driving circuit 27 for the motor 26. Winding of the film F is performed by the forward rotation of the motor 26, whereas rewinding of the film F is performed by the reverse rotation of the motor 26. The camera also includes a photoreflector 28 and a perforation detecting circuit 29 for detecting the perforations of the film F to detect the completion of transportation of the film F by one frame, as well as a magnetic head 30 and a magnetic recording circuit 31 for recording date, time and various photographic data as well as information about the kind of photographic light source on a magnetic recording layer provided on the film F. This recording is performed during the transportation of the film F to the next photographic frame by one frame after the completion of one photographic cycle.

The operation of the camera according to the first embodiment will be described below with reference to the flowchart shown in FIG. 4.

Figure 5:
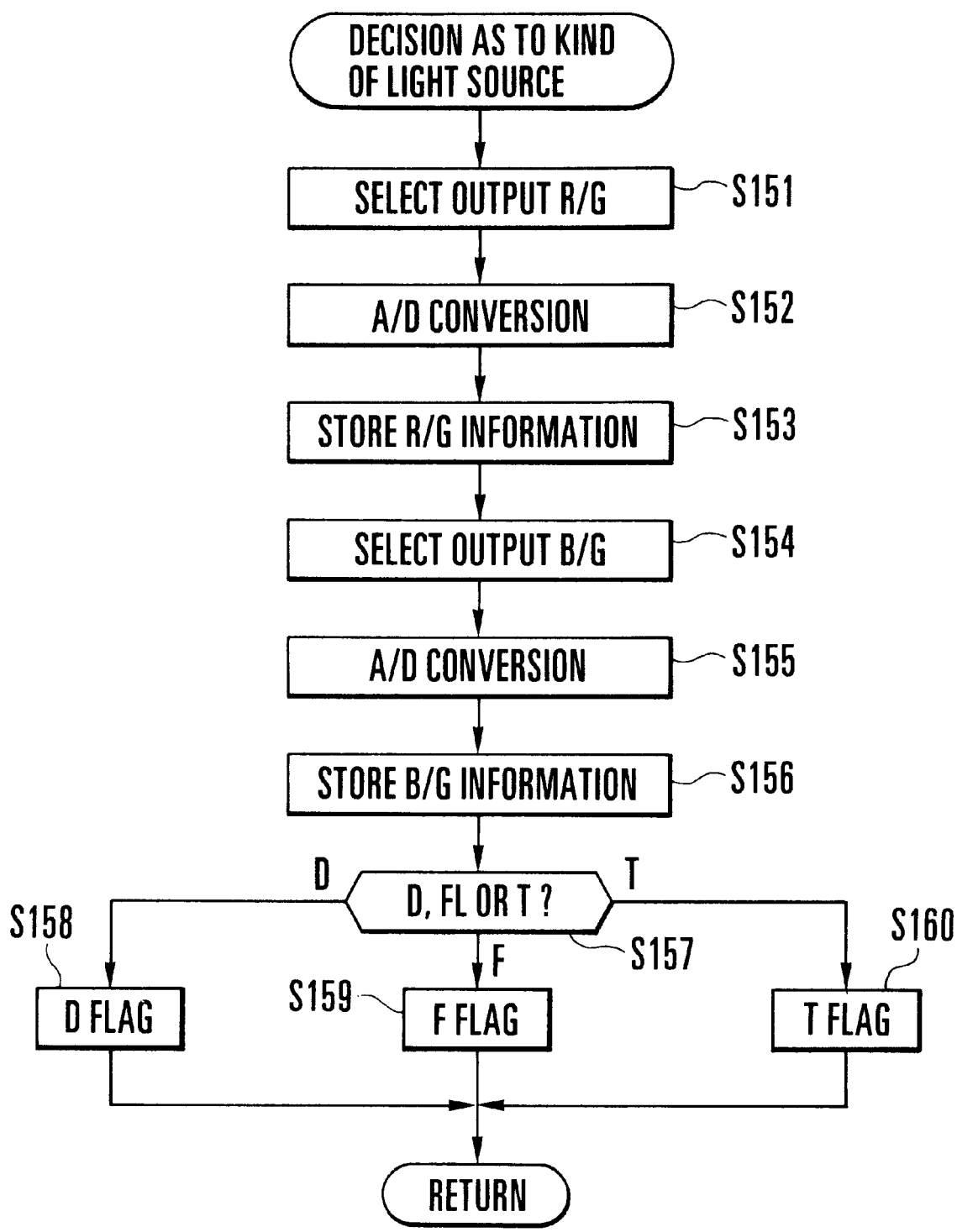
FIG. 5 is a flowchart showing a subroutine for making a decision as to the kind of light source according to the first embodiment of the present invention.

If the main dial 19 of the camera is set to a position other than "Lock", it is detected in Step S101 whether the switch SW1 is closed (on). If the switch SW1 is on, the process proceeds to Step S102, whereas if the switch SW1 is off, the process waits for switch SW1 to be turned on. In Step S102, the calorimetric information detecting circuit 14 is activated to start colorimetry, and, in Step S103, a decision is made as to the kind of light source and the result of the decision is stored. FIG. 5 shows the subroutine of Step S103. First, the output switch bit of the colorimetric information detecting circuit 14 is selected so that an R/G value can be outputted (S151), and the process proceeds to step S152. The R/G value is inputted to and A/D converted by the A/D converter of the microcomputer 7 (S152) and data sampling is performed for a predetermined period of time, and sampled data is temporarily stored in the RAM (S153). At this time, it is not necessary to store all data obtained from the data sampling performed for the predetermined period of time, and an averaged value of the date may be stored.

Then, the output switch bit of the colorimetric information detecting circuit 14 is selected so that a B/G value can be outputted (S154). The B/G value is inputted to and A/D converted by the A/D converter of the microcomputer 7 (S155) and data sampling is performed for a predetermined period of time, and the obtained B/G value is temporarily stored in the RAM (S156). A decision is made as to the color of a light source from the stored R/G and B/G values and the relation shown in FIG. 3 (S157). If it is determined that the kind of light source is daylight, a D flag is turned on (S158). If it is determined that the kind of light source is a fluorescent lamp, an F flag is turned on (S159). If it is determined that the kind of light source is a tungsten lamp, a T flag is turned on (S160). Then, the process returns to Step S104 of FIG. 4. In Step S104, it is determined whether the memory lock switch 23 has been manipulated and the switch SW4 has been closed (on). If the switch SW4 has not been turned on, the light measuring circuit 9 is driven to start light measurement (S105), and an exposure control value, i.e., a shutter speed and an aperture value, are computed on the basis of the obtained, measured-light value and they are stored (S106). The distance measuring sensor 10 and the distance measuring circuit 11 are driven to measure the distance to a subject (S107), and the AF controlling circuit 5 and the AF motor 6 are driven to perform AF driving to make the position of focus of the photographic lens 2 coincident with the position of the subject (S108). Then, it is determined whether the switch SW2 has been turned on by the manipulation of the release button 15 (S109). If an affirmative decision is made, the process proceeds to a release operation which follows (A). If a negative decision is made, the process returns to Step S101 and continues to waits for the switch SW2 to be turned on, while repeating colorimetry, light measurement and distance measurement.

If it is determined in Step S104 that the switch SW4 has been turned on, light measurement, computation and storage of an exposure control value, distance measurement and AF driving are performed in Steps S110 to S113. In Steps S110 to S113, operations identical to Steps S105 to S108 are respectively executed, and the process proceeds to Step S114. Then, it is determined whether the switch SW2 has been turned on by the manipulation of the release button 15 (S114). If an affirmative decision is made, the process proceeds to the release operation which follows (A). If a negative decision is made, the process proceeds to Step S115, in which it is determined whether the switch SW4 is still on by the manipulation of the memory lock switch 23 (S115). If an affirmative decision is made, the process returns to Step S110, repeats the aforementioned operations, such as light measurement and distance measurement, and waits for the switch SW2 to be turned on by the manipulation of the release button 15. Accordingly, this loop does not vary and stores the result of the decision as to the kind of light source which has been stored in Steps S102 and S103. If it is not determined in Step S115 that the switch SW4 is on, the process returns to Step S101 and if it is determined in Step S101 that the switch SW1 is on, colorimetry is again performed in Step S102. In Step S103, a decision is again made as to the kind of light source. Accordingly, to make a correct decision as to the kind of light source which illuminates a scene which tends to cause an erroneous decision, such as that shown in FIG. 14, a user first manipulates the release button 15 to turn on the switch SW1 while turning a camera C (i.e., the calorimetric sensor 12) toward a background B or in a direction free of the influence of an illumination T, and then presses the memory lock switch 23 to turn on the switch SW4. In this manner, it is possible to achieve a correct decision as to the kind of light source, and the result of the decision can be held. Then, if the user turns the camera C toward a subject with the switches SW1 and SW2 remaining on, it is possible to perform accurate light and distance measurement on the subject.

Then, if it is determined in Step S109 or S114 that the switch SW2 has been turned on, the process proceeds to the exposure control which follows (A). Then, the diaphragm controlling circuit 3 and the autofocus motor (diaphragm) 6 are controlled on the basis of the aperture value which has been stored in Step S116 or S111 (S116), so that the diaphragm 6 is stopped down to a corresponding aperture value. In Step S117, the shutter controlling circuit 16 is made to drive the retention-of-shutter-leading-curtain releasing magnet 17 to start an exposure cycle. After the elapse of the shutter time stored in Step S106 or S111, the retention-of-shutter-trailing-curtain releasing magnet 18 is driven to terminate the exposure cycle, thereby returning the stopped-down diaphragm to its fully open state (S118). In Step S119, storage of data to be magnetically recorded (as will be described later) is performed. The data contains the data (D, F or T) about the kind of light source which has been stored in Step S103 as well as photographic data such as photographic mode, shutter time, aperture value, date and time instant. Then, the driving circuit 27 is made to drive the film transporting motor 26 in the forward direction, thereby starting winding the film F to the next photographic frame by one frame (S120). During the winding of the film F, the data stored in Step S119 is magnetically recorded on the magnetic recording layer provided on the film F by means of the magnetic recording circuit 31 and the magnetic head 30 (S121). In Step S122, the perforation detecting circuit 29 and the photoreflector 28 are made to detect the perforations formed in the film F, so that it is determined whether the transportation of the film F by one frame has been completed, on the basis of the result of detection of the perforations. If it is determined that the transportation of the film F by one frame has been completed, the supply of electrical power to the motor 26 is shut off to stop winding the film F (S123). Then, a frame counter indicative of the number of exposed frames is incremented by one (S124), and it is determined whether rewinding is to be performed (S125). If no rewinding is needed, the process returns to Step S101 and makes preparations for the next photographic cycle. If rewinding is to be performed, the driving circuit 27 is made to drive the transporting motor 26 in the reverse direction, thereby starting rewinding the film F (S126). The perforation detecting circuit 29 is made to detect whether the film F is being rewound on frame-by-frame basis (S127), and each time it is detected that the film F has been rewound by one frame, the frame counter is decremented by one (S128). Then, it is determined whether all the frames have been rewound (S129). If all the frames have not yet been rewound, the process returns to Step S127, whereas if all the frames have been rewound, the process proceeds to Step S130, in which rewinding is brought to a stop. Then, the film F is unloaded from the camera body 1 (S131) and the entire operation is completed.

Figure 6:
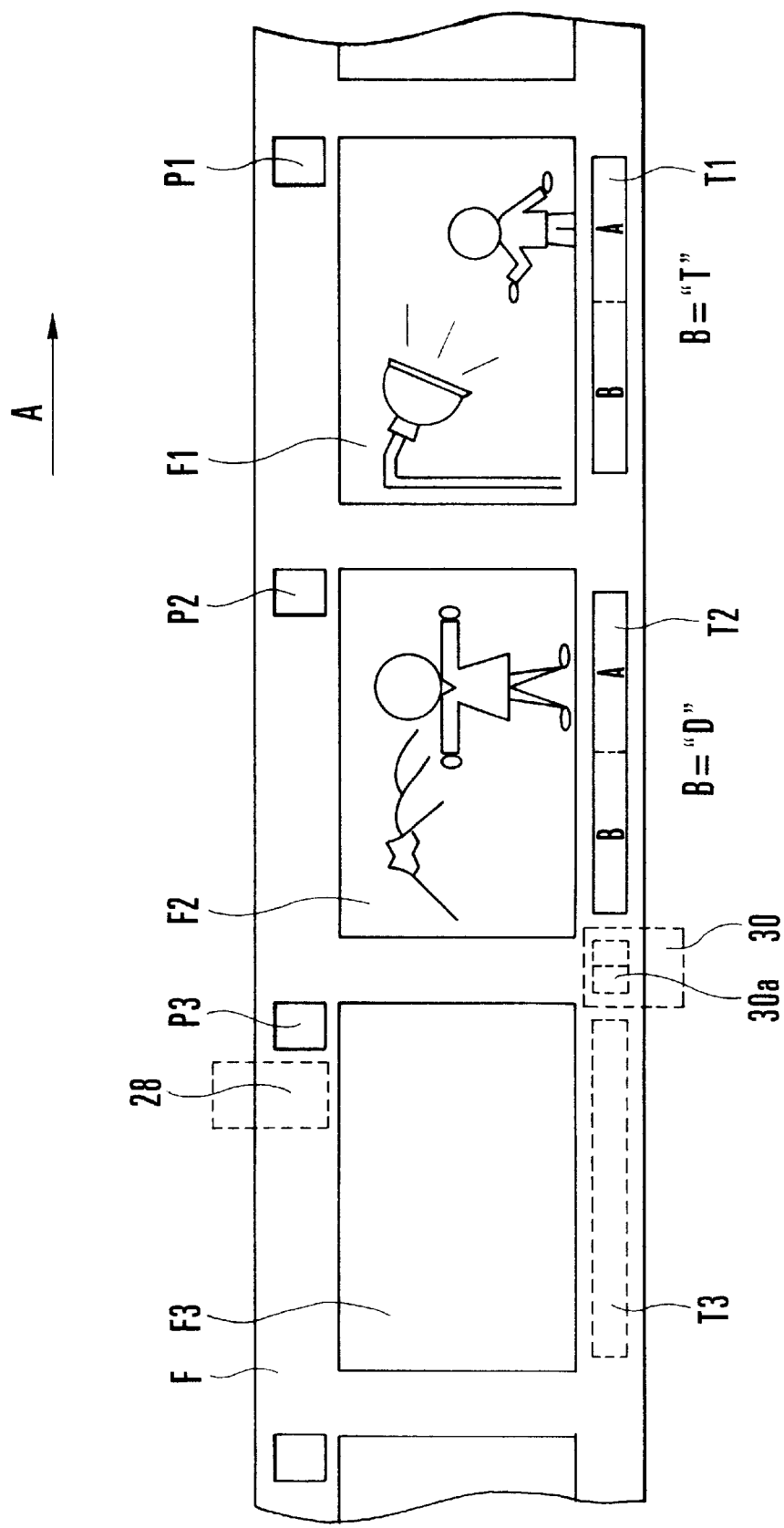
FIG. 6 is a schematic view showing the state of a negative film which contains frames exposed by the camera according to the first embodiment of the present invention.

FIG. 6 is a view conceptually showing the state of the film F being exposed by the camera according to the first embodiment. As shown in FIG. 6 by way of example, the film F has photographic frames F1 to F3, and the photographic frames F1 and F2 are exposed frames and the photographic frame F3 is an unexposed frame. Magnetic storage parts T1 to T3 are formed on the film F at locations corresponding to the respective photographic frames F1 to F3. While the film F is being transported by one frame in the direction of an arrow A, magnetic recording on the magnetic storage parts T1 to T3 is performed by a recording part 30a of the magnetic head 30 of the camera. Data recorded in each of the magnetic storage parts T1 and T2 are indicated by "A" and "B", and the data "A" is general photographic data (exposure mode, shutter speed, date, time instant, etc.) while the data "B" is information about the kind of light source, i.e., data indicative of F (fluorescent lamp), T (tungsten lamp) or D (daylight). In the example shown in FIG. 6, the data "B" about the photographic frame F1 indicates "T" and the data "B" about the photographic frame F2 indicates "D". If the film F is to be printed after development, the contents of the magnetic storage parts T1 and T2 are reproduced by the magnetic readout means of a printer. Therefore, in the case of the photographic frame F1, the amount of print exposure as well as color balance are adjusted on the basis of an algorithm suited to a subject illuminated with tungsten light, while, in the case of the photographic frame F2, the amount of print exposure as well as color balance are adjusted on the basis of an algorithm suited to a subject illuminated with daylight. Accordingly, it is possible to produce a good print from either of the photographic frames F1 and F2. Incidentally, in FIG. 6, P1, P2 and P3 respectively indicate the perforations formed in the film F at locations corresponding to the photographic frames F1, F2 and F3, and reference numeral 28 denotes the photoreflector provided in the camera body 1.

Figure 4:
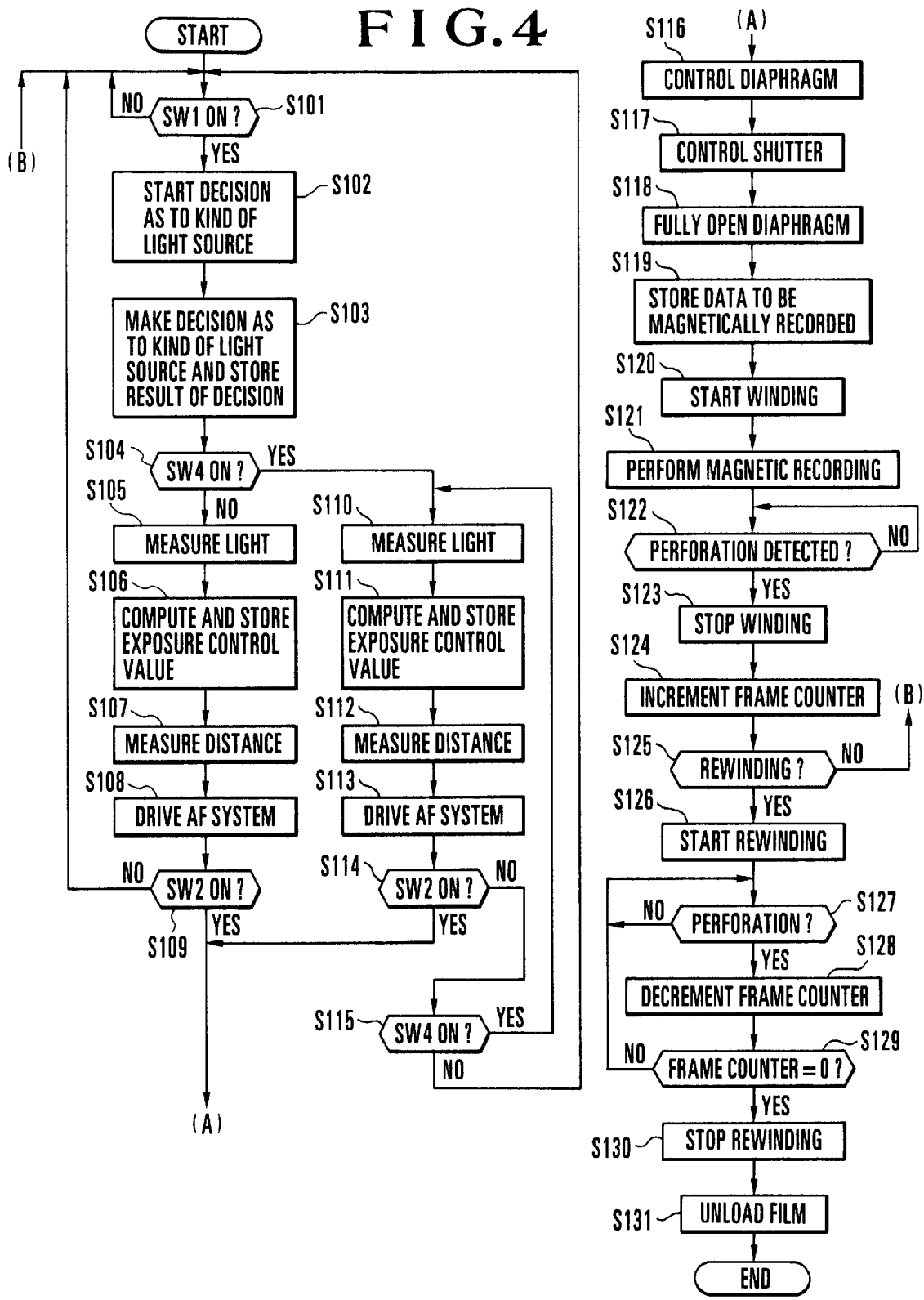
FIG. 4 is a flowchart showing the operation of the camera according to the first embodiment of the present invention.
Figure 7:
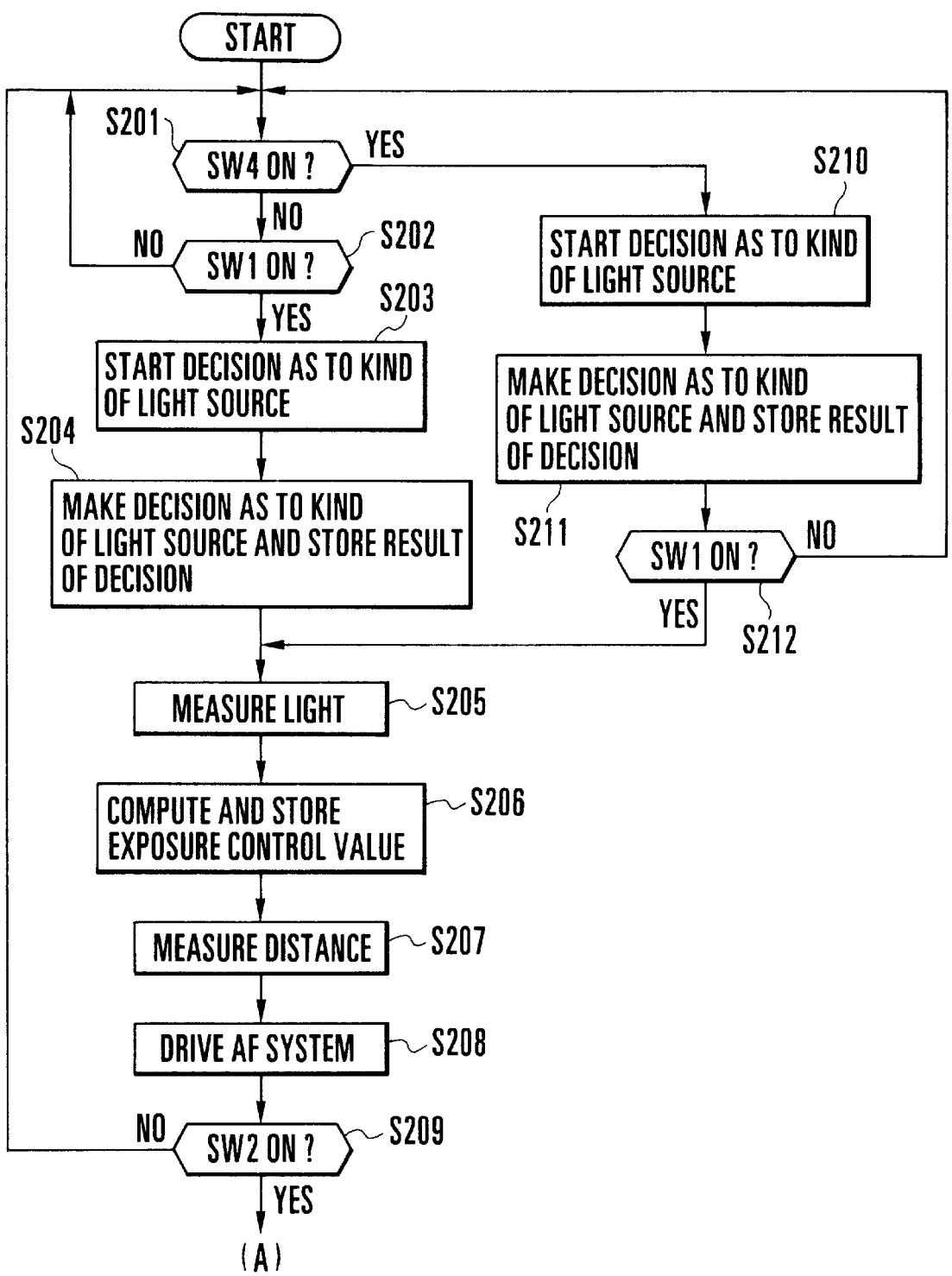
FIG. 7 is a flowchart showing the operation of a camera according to the second embodiment of the present invention.

FIG. 7 is a flowchart showing a second embodiment of the present invention, and corresponds to FIG. 4. A camera according to the second embodiment has an arrangement identical to that shown in FIGS. 1 and 2.

If the main dial 19 of the camera is set to a position other than "Lock", it is detected in Step S201 whether the switch SW4 has been turned on by the manipulation of the memory lock switch 23. If the switch SW4 is not on, it is determined whether the switch SW1 has been turned on by the manipulation of the release button 15 (S202). If a negative decision is made, the process returns to Step S201, whereas, if an affirmative decision is made, the calorimetric information detecting circuit 14 is activated to start colorimetry (S203). Then, a decision is made as to the kind of light source (S204). The content of the operation performed in Step S204 is identical to the subroutine shown in FIG. 5, and any one of the D, T and F flags is turned on. Then, in Steps S205 to S208, light measurement is performed, and computation is performed on an exposure control value on the basis of the measured-light value obtained from the light measurement and the exposure control value is stored. Then, distance measurement followed by AF driving is carried out. In Step S209, it is determined whether the switch SW2 has been turned on by the manipulation of the release button 15. If a negative decision is made, the process returns to Step S201. If an affirmative decision is made, the process proceeds to the exposure operation which follows (A). The contents of the exposure operation which follows (A) are identical to those described previously in connection with the first embodiment with reference to FIG. 4, and description thereof is omitted.

If it is determined in Step S201 that the switch SW4 has been turned on, the colorimetric information detecting circuit 14 is activated to start colorimetry (S210), and a decision is made as to the kind of light source in accordance with a subroutine identical to that shown in FIG. 5 and the result of this decision is stored (S211). Then, it is determined whether the switch SW1 has been turned on by the manipulation of the release button 15 (S212). If an affirmative decision is made, the process proceeds to Step S205, while if a negative decision is made, the process returns to Step S201. Accordingly, while the switch SW4 is turned on by the manipulation of the memory lock switch 23, the result of the decision as to the kind of light source which has been stored once is held without being varied. In the meantime, the stored contents of measured light and distance continue to vary until the switch SW2 is turned on by the manipulation of the release button 15. Incidentally, the memory lock switch 23 used in the second embodiment is different from that used in the first embodiment in that the former serves also as a start switch for starting colorimetry.

Figure 14:
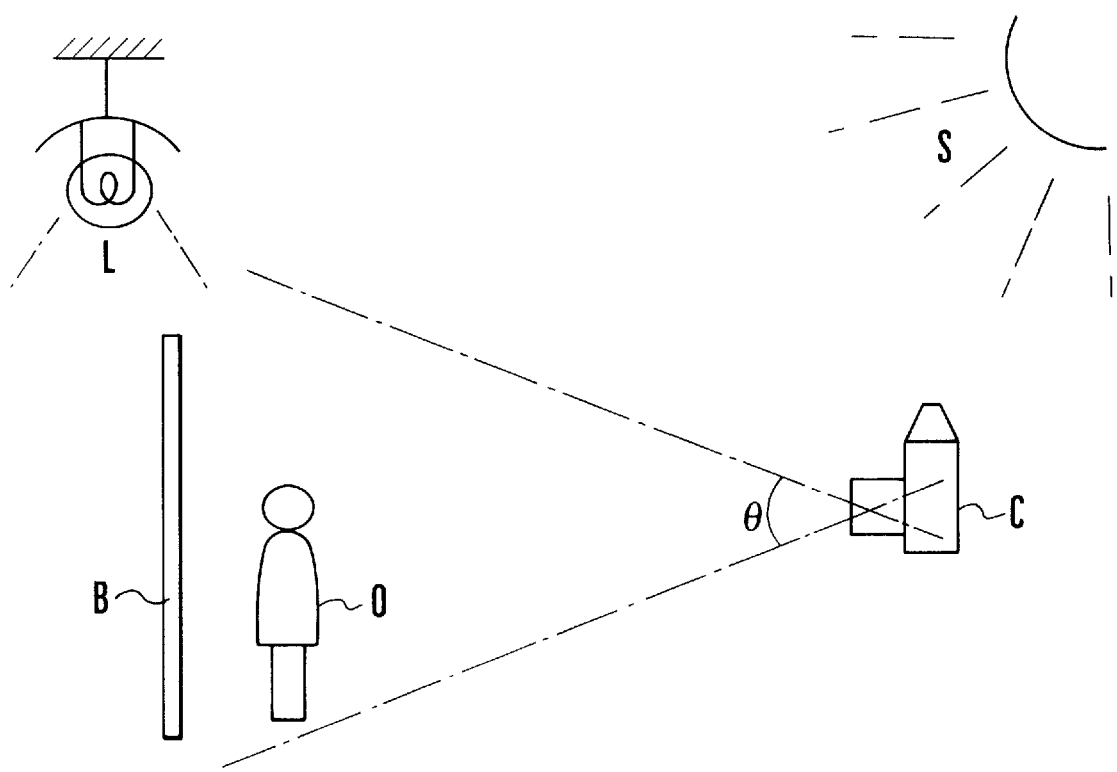
FIG. 14 is a schematic view aiding in explaining the status in which a decision is made as to the kind of light source.

To make a correct decision as to the kind of light source which illuminates a scene which tends to cause an erroneous decision, such as that shown in FIG. 14, the user first manipulates the memory lock switch 23 to turn on the switch SW4 while turning the camera C (i.e., the colorimetric sensor 12) toward the background B or in the direction free of the influence of the illumination T, thereby achieving a correct decision as to the kind of light source, and the result of the decision can be held. Then, if the user turns the camera C toward the subject with the switch SW4 remaining on and turns on the switch SW1 by means of the release button 15, it is possible to perform accurate light and distance measurement on the subject while holding the result of the decision as to the kind of light source. Information about the kind of light source which has been stored in Step S204 or S211 is magnetically recorded on the film F during winding of the film F in a manner similar to that used in the first embodiment.

Figure 8:
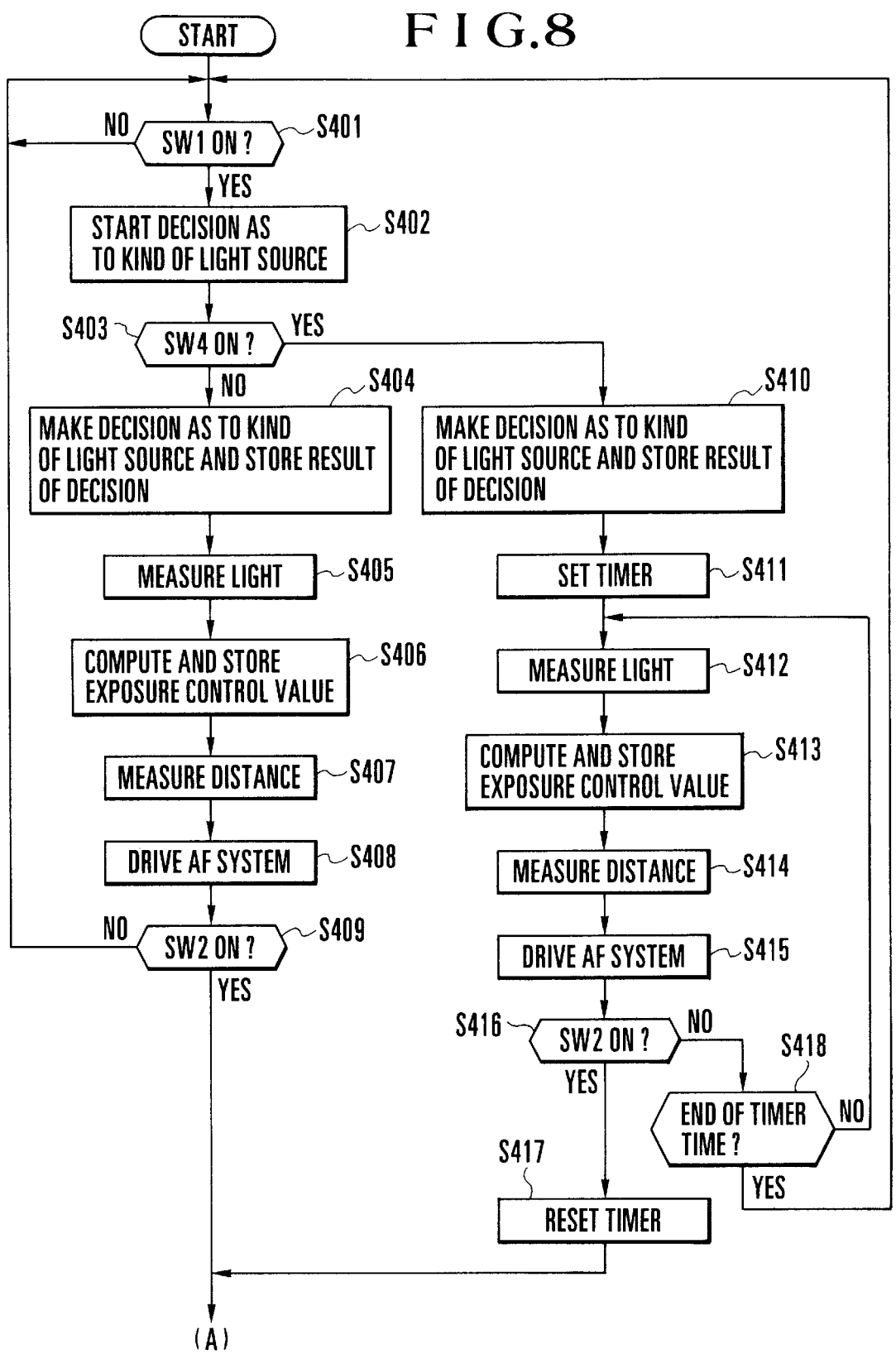
FIG. 8 is a flowchart showing the operation of a camera according to the third embodiment of the present invention.
Figure 9:
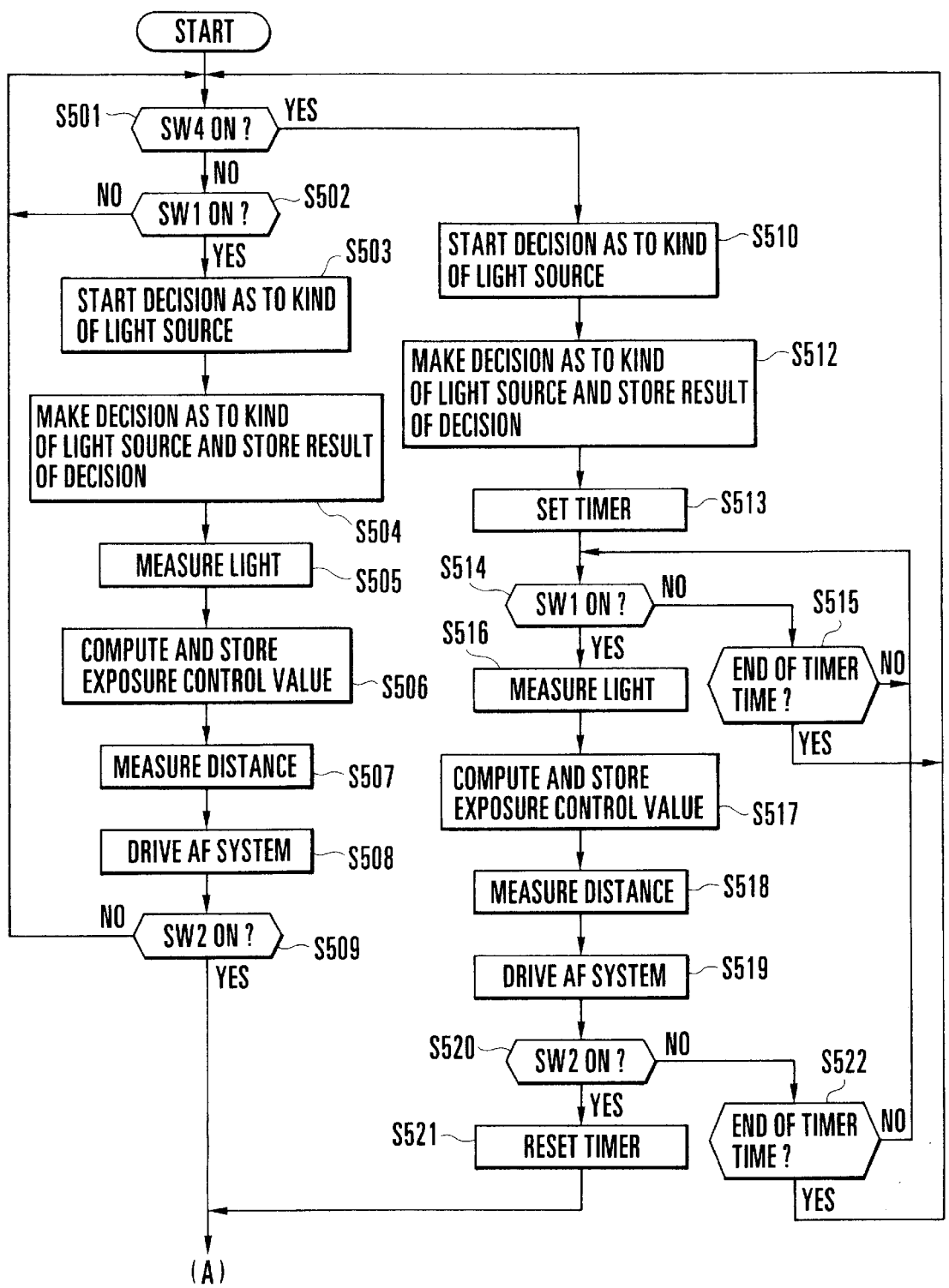
FIG. 9 is a flowchart showing the operation of a camera according to the fourth embodiment of the present invention.

FIGS. 8 and 9 are flowcharts respectively showing third and fourth embodiments of the present invention, and show the operation of the memory lock switch 23 similarly to the flowchart of FIG. 7 referred to above in connection with the second embodiment. In the flowchart shown in FIG. 8, it is first determined whether the switch SW1 has been turned on by the manipulation of the release button 15 (S401). If a negative decision is made, Step S401 is repeated. If an affirmative decision is made, the colorimetric information detecting circuit 14 is activated to start colorimetry (S402) and it is determined whether the switch SW4 has been turned on by the manipulation of the memory lock switch 23 (S403). If the switch SW4 has been turned on, a decision is made as to the kind of light source and the result of the decision is stored in the RAM (S410). Even if the switch SW4 has not been turned on, a decision is made as to the kind of light source and the result of the decision is stored in the RAM (S404). Then, in Steps S405 to S408, light measurement is performed, and computation is performed on an exposure control value on the basis of the measured-light value obtained from the light measurement and the exposure control value is stored. Then, distance measurement followed by AF driving is carried out. In Step S409, it is determined whether the switch SW2 has been turned on by the manipulation of the release button 15. If a negative decision is made, the process returns to Step S401. If an affirmative decision is made, the process proceeds to the exposure operation which follows (A). The contents of the exposure operation which follows (A) are identical to those described previously in connection with the first embodiment with reference to FIG. 4, and description thereof is omitted.

If it is determined in Step S403 that the switch SW4 is on, the process proceeds to Step S410, in which a decision is made as to the kind of light source and the result of the decision is stored in the RAM. Then, in Step S411, a predetermined period of time is set in a timer and the timer starts counting the predetermined period of time (timer time). Subsequently, in Steps S412 to S415, processing identical to that performed in Steps S405 to S408 is carried out, and it is determined in Step S416 whether the switch SW2 is on. If a negative decision is made, it is determined in step S418 whether the timer time has elapsed. If the timer time has not elapsed, the process returns to Step S412. Accordingly, the result of the processing performed in Step S410 is held from the moment the switch SW4 is turned on until the moment the timer time elapses. If the timer time elapses, the process returns to Step S401. If the switch SW2 is turned on during the timer time, the timer is reset in Step S417 and the process proceeds to the exposure operation which follows (A).

Referring to FIG. 9, similarly to the flowchart shown in FIG. 7, if the main dial 19 of the camera is set to a position other than "Lock", it is detected in Step S501 whether the switch SW4 has been turned on by the manipulation of the memory lock switch 23. If the switch SW4 is not on, it is determined whether the switch SW1 has been turned on by the manipulation of the release button 15 (S502). If a negative decision is made, the process returns to Step S501, whereas, if an affirmative decision is made, the colorimetric information detecting circuit 14 is activated to start colorimetry (S503). Then, a decision is made as to the kind of light source (S504). The contents of the operation performed in Step S504 are identical to the subroutine shown in FIG. 5, and any one of the D, T and F flags is turned on. Then, in Steps S505 to S508, light measurement is performed, and computation is performed on an exposure control value on the basis of the measured-light value obtained from the light measurement and the exposure control value is stored. Then, distance measurement followed by AF driving is carried out. In Step S509, it is determined whether the switch SW2 has been turned on by the manipulation of the release button 15. If a negative decision is made, the process returns to Step S501. If an affirmative decision is made, the process proceeds to the exposure operation which follows (A). The contents of the exposure operation which follows (A) are identical to those described previously in connection with the first embodiment with reference to FIG. 4, and description thereof is omitted.

If it is determined in Step S501 that the switch SW4 has been turned on, processing identical to that performed in Steps S503 and S504 is performed in Steps S510 and S512, i.e., a decision is made as to the kind of light source and the result of this decision is stored. Then, in Step S513, a timer time is set in a timer and the timer starts counting the timer time. While the timer is counting the timer time, as long as the switch SW1 is off (S514), the process repeats Steps S514 and S515 while waiting for the timer time to elapse. If the timer time elapses, the process returns to Step S501. If the switch SW1 is turned on while the timer is counting the timer time, processing identical to that performed in Steps S505 to S508 is performed in Steps S516 to S519. In Step S520, it is detected whether the switch SW2 is on or off. If the switch SW2 is off, Steps S514 to S520 are repeated while the timer time is elapsing. If the timer time elapses, the process returns to Step S501. If the switch SW2 is turned on while the timer time is elapsing, the timer is reset in Step S521 and the exposure operation which follows (A) is executed.

FIG. 10 is a flowchart showing a fifth embodiment, and shows the operation of the memory lock switch 23. The fifth embodiment is different from the fourth embodiment of FIG. 9 with regard to only the operation of Step S625. In this flowchart, in Step S625, a decision is necessarily made as to the state of the switch SW4 during the elapse of a timer time of predetermined duration which is set in Step S622. Accordingly, even while the timer time is elapsing, if the switch SW4 is turned on by the manipulation of the memory lock switch 23, Step 610 and the subsequent processing, such as a decision as to the kind of light source, are again performed to update stored contents, and the updated contents can be held again. The above-described operation is convenient if it is desired to again make a decision as to the kind of light source owing to any cause.

Figure 11:
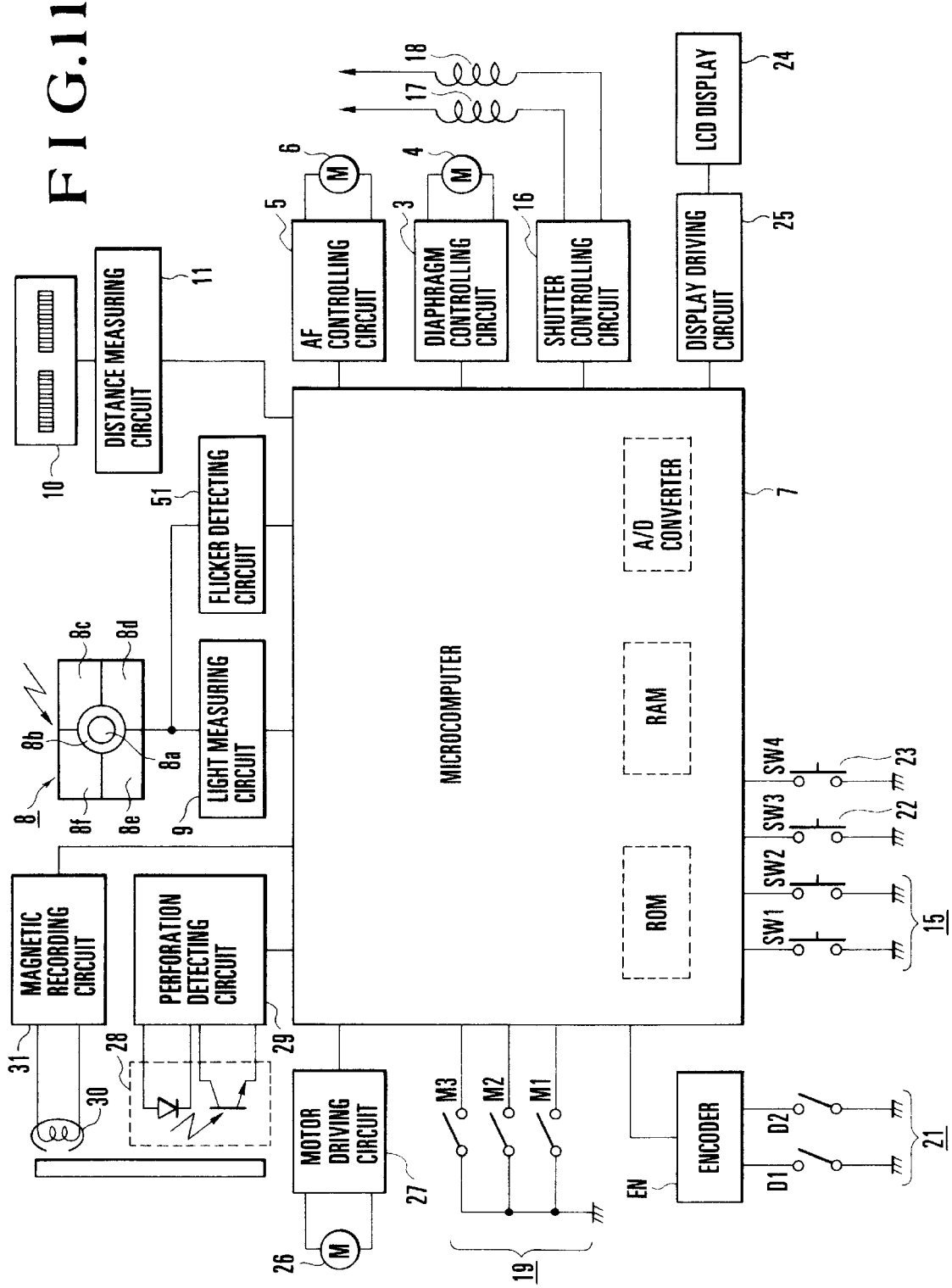
FIG. 11 is a flowchart showing the operation of a camera according to the sixth embodiment of the present invention.

FIG. 11 is a block diagram showing a camera according to a sixth embodiment of the present invention. Although the calorimetric sensor 12 and the calorimetric information detecting circuit 14 are employed for making a decision as to the kind of light source in the first embodiment, the sixth embodiment realizes an equivalent function by detecting a flicker contained in illumination light during photography. In FIG. 11, identical reference numerals are used to denote constituent elements identical to those shown in FIG. 1. As shown, a flicker detecting circuit 51 is connected to the light measuring sensor 8. The light measuring sensor 8 is the multiple-point light measuring sensor having the six light measuring areas 8a to 8f, and the flicker detecting circuit 51 performs flicker detection on the basis of the sum of the output signals of the light measuring areas 8a to 8f for the purpose of efficiently and uniformly detecting a flicker in a picture.

FIGS. 12(a) to 12(f) show the input and output of the flicker detecting circuit 51. FIGS. 12(a) and 12(b) show a case where the fluorescent lamp F is detected. FIGS. 12(c) and 12(d) show a case where the tungsten lamp T is detected. FIGS. 12(e) and 12(f) show a case where the daylight D is detected. FIG. 12(a) shows the output waveform of the first-stage amplifying part of the flicker detecting circuit 51. This waveform is the flicker waveform of a general fluorescent lamp. FIG. 12(b) shows the output waveform obtained by passing the output waveform of FIG. 12(a) through a high-pass circuit and cutting its low-frequency range. The output waveforms of FIGS. 12(a) and 12(b) are selectively outputted to the microcomputer 7. FIGS. 12(c) and 12(d) show the output waveforms obtained when the tungsten lamp T is detected, and FIG. 12(c) shows the output waveform of the first-stage amplifying part of the flicker detecting circuit 51, while FIG. 12(d) shows the output waveform obtained by passing the output waveform of FIG. 12(c) through the high-pass circuit. FIGS. 12(e) and 12(f) show the output waveforms obtained when the daylight D is detected, and FIG. 12(e) shows the output waveform of the first-stage amplifying part of the flicker detecting circuit 51, while FIG. 12(f) shows the output waveform obtained by passing the output waveform of FIG. 12(e) through the high-pass circuit. As the output of the first-stage amplifying part, flicker voltages VF and VT each of which coincides with a period "t" of a commercial power source are detected from the light source F of FIG. 12(a) and the light source T of FIG. 12(c), respectively. Accordingly, it is impossible to discriminate between the light source F and the light source T by using only the output of the first-stage amplifying part. In the case of the output of the high-pass filter, since the light source F contains a high-frequency component as shown in FIG. 12(b), a flicker voltage Vf can be detected, whereas a flicker voltage Ft obtained from the light source T is extremely small as shown in FIG. 12(d). Accordingly, it is possible to discriminate between the light source F and the light source T by comparing the flicker voltages Vf and Vt outputted from the high-pass filter. In the case of the daylight D, no flicker voltage is detected from either of the output of the high-pass filter (FIG. 12(e)) and the output of the high-pass filter (FIG. 12(f)).

Figure 13:
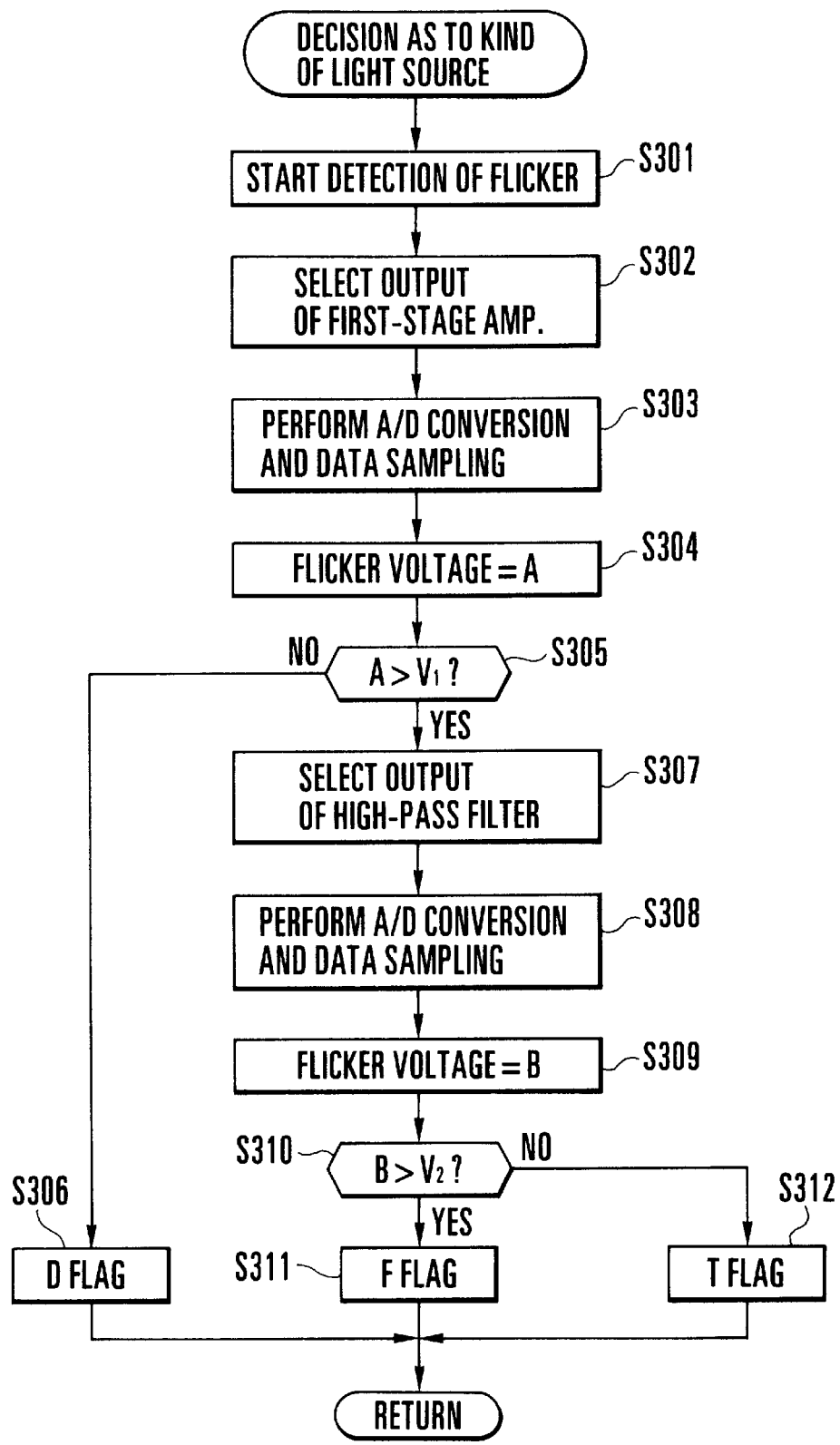
FIG. 13 is a flowchart showing a subroutine for making a decision as to the kind of photographic light source according to the sixth embodiment of the present invention.

FIG. 13 is a flowchart showing the operation of the sixth embodiment. The flowchart shown in FIG. 13 corresponds to the flowchart of FIG. 5 which is used in each of the first and second embodiments, and represents a subroutine for making a decision as to the kind of light source. In the sixth embodiment, since the flowchart of FIG. 4 which is used in the first embodiment and the flowchart of FIG. 7 which is used in the second embodiment are employed without modification, the description thereof is omitted.

Referring to FIG. 13, if the subroutine for making a decision as to the kind of light source is called, flicker detection is started (S301), and the output switch bit of the flicker detecting circuit 51 is selected so that the output of the first-stage amplifying part can be obtained (S302). The output of the first-stage amplifying part is inputted to and A/D converted by the A/D converter of the microcomputer 7 and data sampling is performed for a predetermined period of time (S303). A flicker voltage is obtained from the sampled data and the value of the flicker voltage is stored as a flicker voltage A (S304). Then, it is determined whether the flicker voltage A is greater than a preset voltage V1 (S305). If the flicker voltage A is smaller than the voltage V1, it is determined that the kind of light source is daylight, and the D flag is turned on in Step S306 and the process returns to the main routine. If it is determined in Step S305 that the flicker voltage A is greater than the voltage V1, i.e., if a flicker is detected, the output switch bit of the flicker detecting circuit 51 is selected so that the output of the high-pass filter can be obtained (S307). The output of the high-pass filter is inputted to and A/D converted by the A/D converter of the microcomputer 7 and data sampling is performed for a predetermined period of time (S308). A flicker voltage is obtained from the sampled data and the value of the flicker voltage is stored as a flicker voltage B (S309). Then, it is determined whether the flicker voltage B is greater than a preset voltage V2 (S310). If the flicker voltage B is greater than the voltage V2, it is determined that the kind of light source is a fluorescent lamp, and the F flag is turned on in Step S311 and the process returns to the main routine. If it is determined in Step S310 that the flicker voltage B is smaller than the voltage V2, it is determined that the kind of light source is a tungsten lamp, and the process proceeds to Step S312, in which the T flag is turned on. Then, the process returns to the main routine. The result of the above-described decision as to the kind of light source is magnetically recorded on the film F during winding of the film F by one frame in a manner similar to that used in each of the first and second embodiments.

Figure 15:
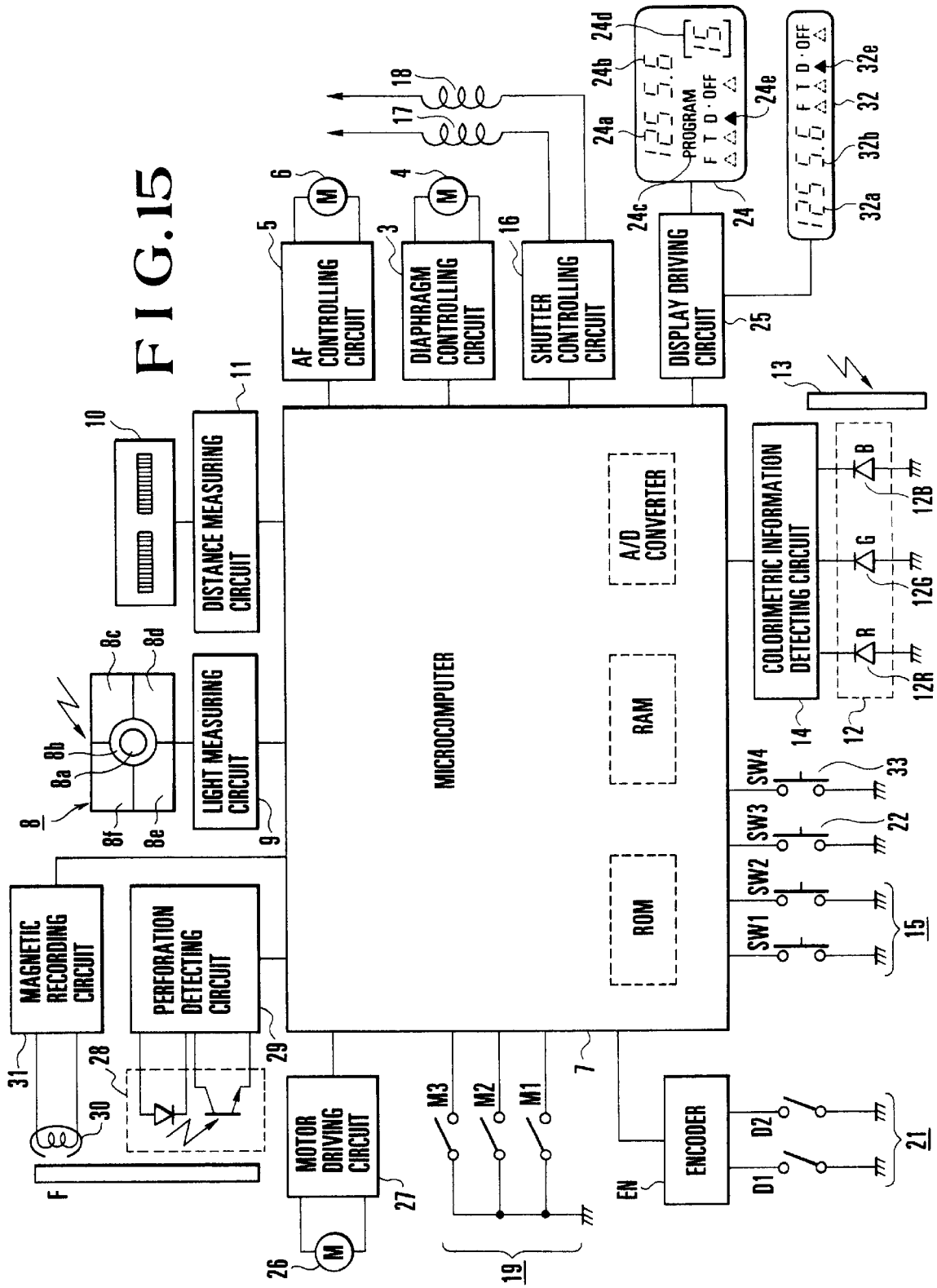
FIG. 15 is a schematic block diagram showing a camera capable of recording information about an illumination light source according to another embodiment of the present invention.
Figure 16A:
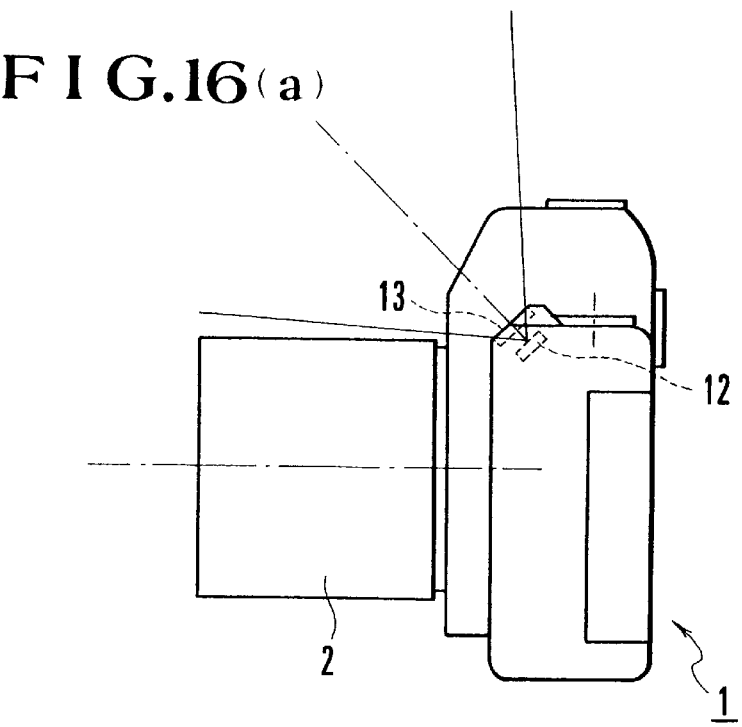
FIGS. 16(a) and 16(b) are a side elevational view and a top plan view schematically showing the external appearance of the camera according to the embodiment shown in FIG. 15.
Figure 16B:
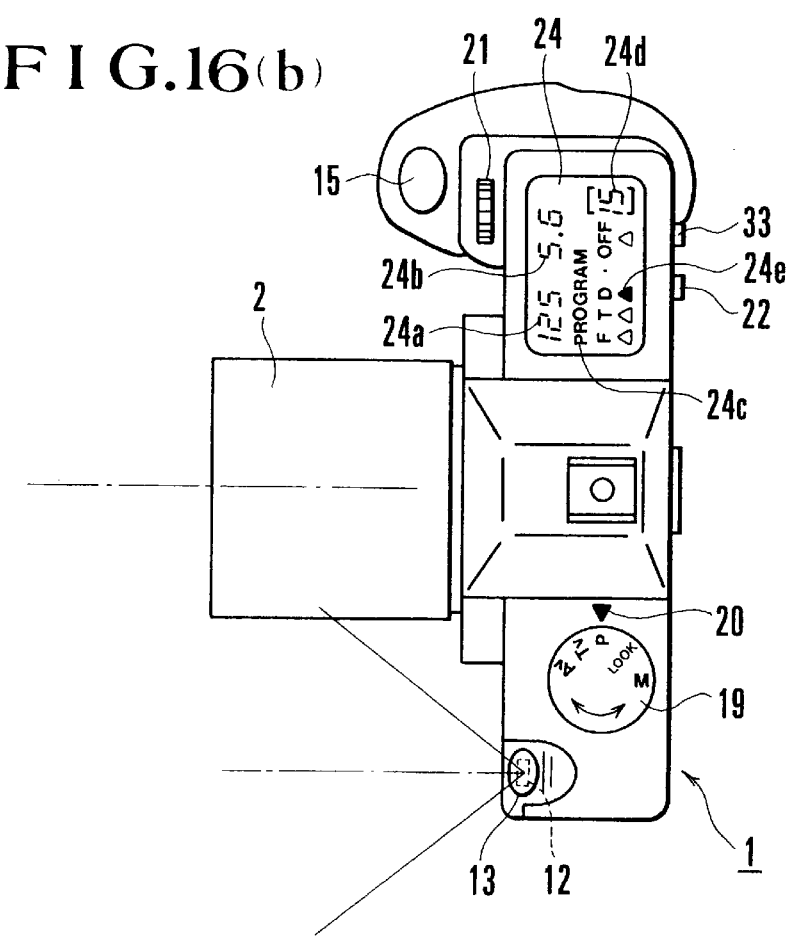

FIG. 15 is a block diagram showing the circuit of a camera according to a seventh embodiment of the present invention. FIG. 16(a) is a diagrammatic, side elevational view of the external appearance of the camera, while FIG. 16(b) is a diagrammatic, top plane view of the external appearance of the camera. In FIGS. 15 and 16(a), 16(b), identical reference numerals are used to denote constituent elements identical to those used in the embodiment shown in FIGS. 1 and 2(a), 2(b), and the description thereof is omitted.

The camera shown in FIGS. 15 and 16(a), 16(b) includes an external LCD display 24 and a viewfinder LCD display 32 which is viewed in the viewfinder of the camera body 1. The external LCD display 24 and the viewfinder LCD display 32 are driven by a display driving circuit 25.

The external LCD display 24 displays the following contents, namely, the shutter speed 24a, the aperture value 24b, the exposure mode 24c, the frame counter 24d, and the index 24e for indicating the kind of light source, i.e., one of "F" (fluorescent lamp), "T" (tungsten lamp) and "D" (daylight). The viewfinder LCD display 32 displays the following contents: a shutter speed 32a, an aperture value 32b, and an index 32e for indicating the kind of light source, i.e., one of "F" (fluorescent lamp), "T" (tungsten lamp) and "D" (daylight).

The camera also includes a changing switch 33 to be manipulated by the user if the user desires to change the kind of light source which is automatically determined by the calorimetric information detecting circuit 14 and stored in the RAM.

The result of automatic detection performed by the colorimetric information detecting circuit 14 is displayed by the index 24e on the external LCD display 24 and by the index 32e on the viewfinder LCD display 32. If the result of the automatic detection is to be changed, the user may manipulate the changing switch 33. Each time the changing switch 33 is manipulated once (the switch SW4 is turned on), both the index 24e on the external LCD display 24 and the index 32e on the viewfinder LCD display 32 are cyclically changed from the fluorescent lamp "F" in the order of →F→T→D→off→F→T→D . . . on step-by-step basis. With this manipulation, it is possible to change information about the kind of light source to be recorded.

Figure 19:
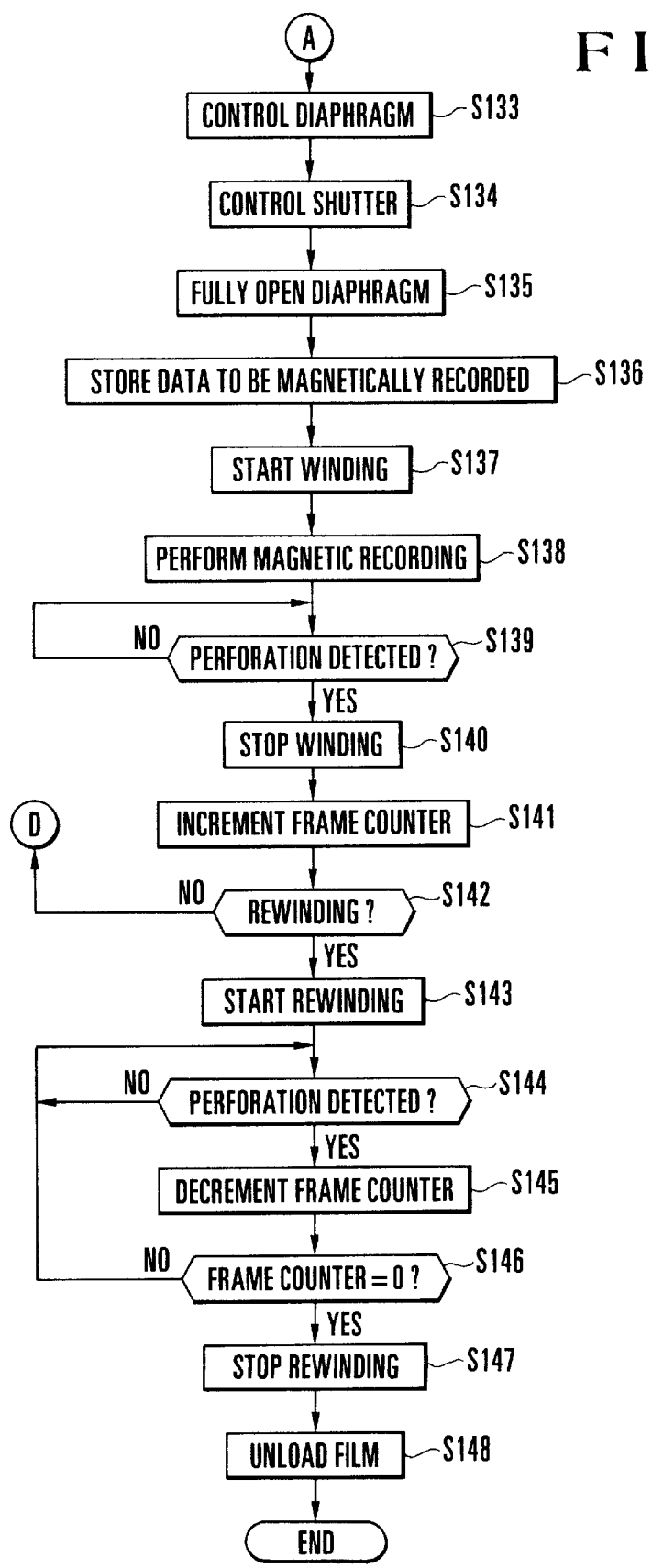
FIG. 19 is a flowchart showing the photographic operation of the camera according to the embodiment shown in FIG. 15.

FIGS. 17 and 19 are flowcharts of the operation of the camera according to the seventh embodiment shown in FIG. 15.

Figure 18:
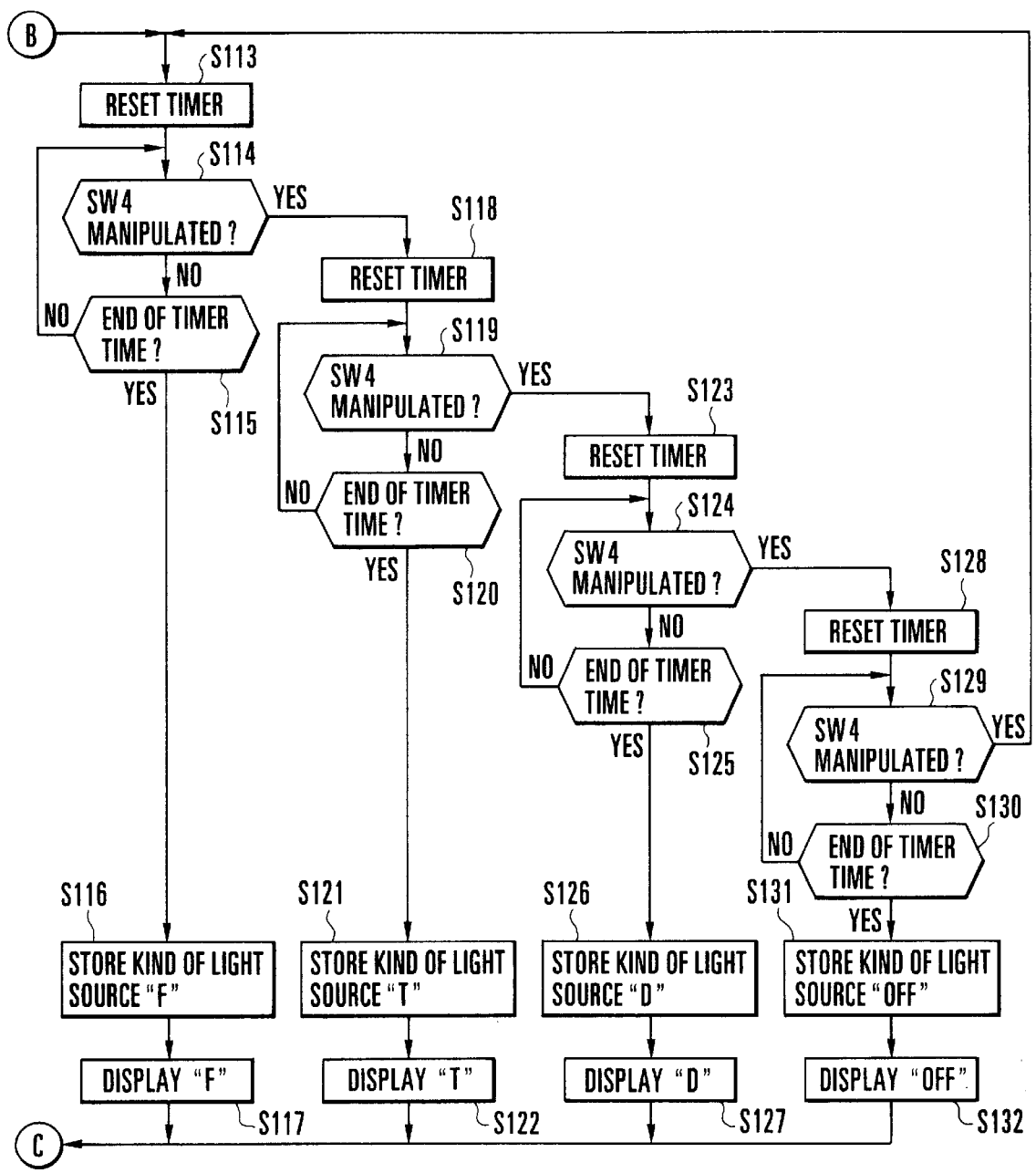
FIG. 18 is a flowchart showing a subroutine for the changing processing shown in FIG. 17.

FIG. 18 is a flowchart of the kind-of-light-source changing subroutine of Step S108 shown in FIG. 17.

Figure 20:
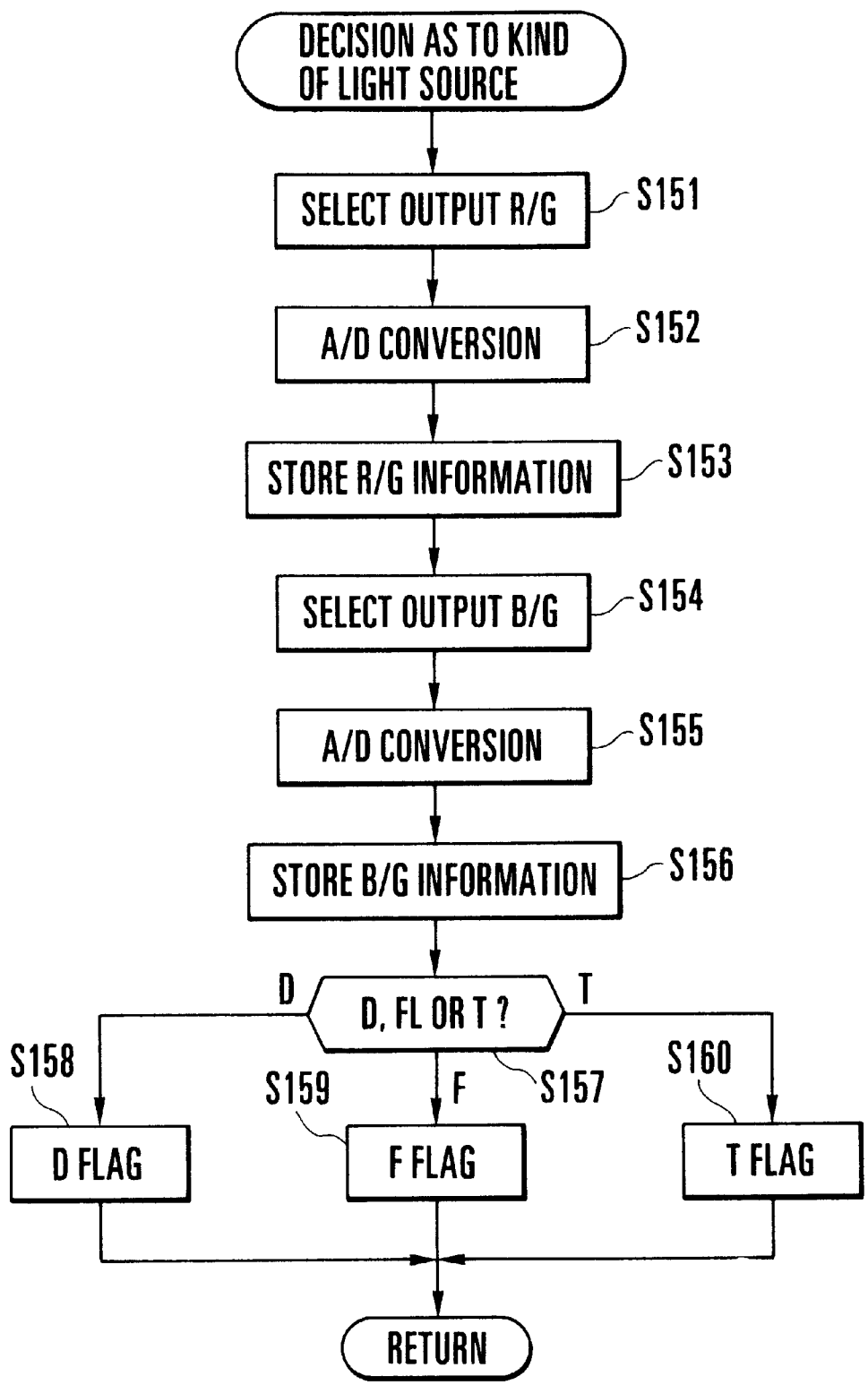
FIG. 20 is a flowchart showing a subroutine for the processing, shown in FIG. 17, of making a decision as to the kind of light source and storing the result of the decision.

FIG. 20 is a flowchart of the subroutine of Step S103 shown in FIG. 17 for making a decision as to the kind of light source and storing the result of the decision.

The operation of the camera according to the seventh embodiment will be described below with reference to FIGS. 17 to 20.

If the main dial 19 of the camera body 1 is set to a position other than "Lock", it is detected whether the switch SW1 has been turned on (S101). If the switch SW1 is on, the process proceeds to Step S102, whereas, if the switch SW1 is on, the process waits for the switch SW1 to be turned on.

The calorimetric information detecting circuit 14 is activated to start colorimetry (S102). Then, a decision is made as to the kind of light source and the result of the decision is stored in the RAM (S103).

The processing of Step S103 in FIG. 7 is identical to that shown in FIG. 5 referred to previously, and the description thereof is omitted.

After the processing of Step S103, the light measuring circuit 9 is activated to start light measurement (S104).

On the basis of the obtained, measured-light value, an exposure control value, i.e., a shutter speed and an aperture value, are computed and stored in the RAM (S105).

The result of the decision as to the kind of light source, which has been stored in the RAM by the processing of Step S103, is displayed via the display driving circuit 25 by the index 24e on the external LCD display 24 and by the index 32e on the viewfinder LCD display 32 (S106).

A timer for counting a predetermined period of time is started (S107).

It is detected whether the manipulation of the changing switch 33 has occurred, by detecting whether the switch SW4 is on (S108). The fact that the manipulation of the changing switch 33 has occurred means that the photographer has the intention of changing the automatically determined kind of light source which is displayed by the index 24e on the external LCD display 24 and by the index 32e on the viewfinder LCD display 32.

If the manipulation of the switch SW4 is not detected, it is determined whether the timer set in Step S107 has completed counting the predetermined period of time (S109).

If it is determined whether the timer set in Step S107 has completed counting the predetermined period of time, the distance measuring sensor 10 and the distance measuring circuit 11 are driven to detect the distance to a subject (S110). Then, the autofocus controlling circuit 5 and the autofocus motor 6 are driven to perform AF driving for making the position of focus of the photographic lens 2 coincident with the position of the subject (S111). It is determined whether the switch SW2 has been turned on by the manipulation of the release button 15. If the switch SW2 is on, the process proceeds to the release (exposure) operation which follows (A). If the switch SW2 is not on, the process returns to Step S101 and repeats the above-described operation while waiting for the switch SW2 to be turned on.

Processing to be performed when it is detected in Step S108 that the switch SW4 has been closed will be described below with reference to FIG. 18. If it is determined in Step S108 that the manipulation of the switch SW4 by the photographer has occurred, the timer set in Step S107 is reset (restarted) (S113).

Then, it is detected whether the manipulation of the switch SW4 has been performed twice or more (S114). This detection is repeated until the completion of the counting operation of the timer reset in Step S113 is detected. If the manipulation of the switch SW4 is not detected, the content of the kind of light source stored in Step S103 is switched to the fluorescent lamp "F" in the above-described cyclic order (S116). The index 24e on the external LCD display 24 and the index 32e on the viewfinder LCD display 32 are both switched to "F", and the process proceeds to Step S110 (S117).

If the second manipulation of the switch SW4 is detected in Step S114 and if the third manipulation of the switch SW4 is not detected in the processing of Steps S118, S119 and S120, the stored content of the kind of light source and each of the displays are changed to the tungsten lamp "T" in Steps S121 and S122. Then, the process proceeds to Step S110.

In addition, if the third manipulation of the switch SW4 is detected in Step S119 and if the fourth manipulation of the switch SW4 is not detected in Steps S123, S124 and S125, the stored content of the kind of light source and each of the displays are changed to the daylight "D" in Steps S126 and S127. Then, the process proceeds to Step silo.

In addition, if the fourth manipulation of the switch SW4 is detected in Step S124 and if the fifth manipulation of the switch SW4 is not detected in Steps S128 to S130, the storage of the kind of light source is inhibited ("off", the last one of the cyclic display) in Steps S131 and S132. Then, the process proceeds to Step S110. If the fifth manipulation of the switch SW4 is detected in Step S129, the process proceeds to Step S113 and repeats the above-described processing.

If the manipulation of the switch SW4 is detected in Step S108, the content stored in Step S103 on the basis of the automatic detection is switched in the order of →F→T→D→off . . . by the processing of Steps S113 to S132. Thus, any of "F", "T", "D" and "off" is again stored in the RAM.

Then, the process proceeds to the flowchart shown in FIG. 19. If it is determined in Step S112 that the switch SW2 is on, the diaphragm controlling circuit 3 and the diaphragm driving motor 4 are controlled on the basis of the aperture value stored in Step S105, thereby stopping down the diaphragm to a predetermined aperture value (S133).

The shutter controlling circuit 16 is made to drive the retention-of-shutter-leading-curtain releasing magnet 17, thereby starting an exposure operation. After the elapse of the shutter time stored in Step S105, the retention-of-shutter-trailing-curtain releasing magnet 18 is driven to bring the exposure operation to an end (S134).

The stopped-down diaphragm is returned to a fully open state (S135).

Storage of data to be magnetically recorded (as will be described later) is performed. The data contains the data (D, F, T or off) about the kind of light source which has been stored in any one of Steps S103, S116, S121, S126 and S131, as well as photographic data such as photographic mode, shutter time, aperture value, date and time instant (S136).

Then, the motor driving circuit 27 is made to drive the film transporting motor 26 in the forward direction, thereby starting winding the film F to the next photographic frame by one frame (S137).

During the winding of the film F, the data stored in Step S136 is magnetically recorded on the magnetic recording layer provided on the film F by means of the magnetic recording circuit 31 and the magnetic head 30 (S138). The perforation detecting circuit 29 and the photoreflector 28 are made to detect the perforations formed in the film F, so that it is determined whether the transportation of the film F by one frame has been completed (S139).

If it is determined that the transportation of the film F by one frame has been completed, the supply of electrical power to the motor 26 is shut off to stop winding the film F (S140). Then, the frame counter indicative of the number of exposed frames is incremented by one (S141). It is determined whether rewinding of the film F is to be performed (S142). If no rewinding is needed, the process returns to Step S101 and makes preparations for the next photographic cycle.

If rewinding is to be performed, the driving circuit 27 is made to drive the transporting motor 26 in the reverse direction, thereby starting rewinding the film F (S143). The perforation detecting circuit 29 is made to detect whether the film F is being rewound on frame-by-frame basis (S144), and each time it is detected that the film F has been rewound by one frame, the frame counter is decremented by one (S145). Then, it is determined whether all the frames have been rewound (S146).

If all the frames have not yet been rewound, the process returns to Step S144, whereas if all the frames have been rewound, rewinding is brought to a stop (S147). Then, when the film F is unloaded from the camera body 1 (S148), the entire operation is completed.

Figure 21:
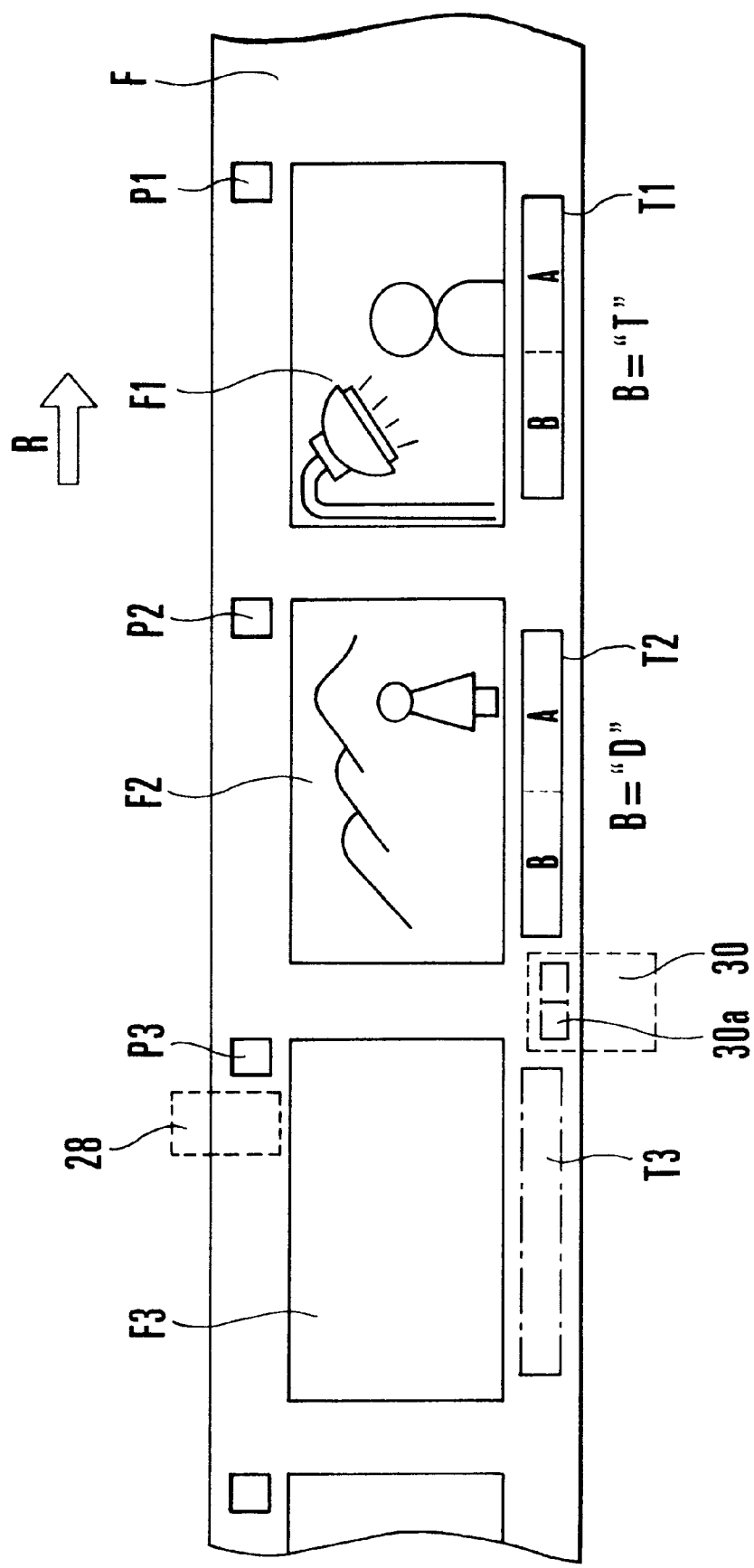
FIG. 21 is a schematic view showing the state of a negative film which contains frames exposed by the camera according to the embodiment shown in FIG. 15.

FIG. 21 is a view conceptually showing the state of the film F being exposed by the camera shown in FIG. 15.

As shown in FIG. 21 by way of example, the film F has the photographic frames F1 to F3, and the photographic frames F1 and F2 are exposed frames and the photographic frame F3 is an unexposed frame. The magnetic storage parts T1 to T3 are formed on the film F at locations corresponding to the respective photographic frames F1 to F3.

While the film F is being transported by one frame in the direction of an arrow R, magnetic recording on the magnetic storage parts T1 to T3 is performed by the recording part 30a of the magnetic head 30 of the camera body 1.

Data recorded in each of the magnetic storage parts T1 and T2 are indicated by "A" and "B", and the data "A" is general photographic data (exposure mode, shutter speed, aperture value, date, time instant, etc.) while the data "B" is information about the kind of light source (F, T, D or off).

In the example shown in FIG. 21, the data "B" about the photographic frame F1 indicates "T" and the data "B" about the photographic frame F2 indicates "D". If the film F is to be printed after development, the contents of the magnetic storage parts T1 and T2 are reproduced by the magnetic readout means of a printer. Therefore, in the case of the photographic frame F1, the amount of print exposure as well as color balance are adjusted on the basis of an algorithm suited to a subject illuminated with tungsten light, while, in the case of the photographic frame F2, the amount of print exposure as well as color balance are adjusted on the basis of an algorithm suited to a subject illuminated with daylight. Accordingly, it is possible to produce a good print from either of the photographic frames F1 and F2. Incidentally, if the content of the data "B" is set to "off", a print is produced by correcting the amount of print exposure as well as color balance by means of automatic correction of an automatic printer, without employing the information about the kind of light source.

Incidentally, as shown in FIG. 21, the perforations P1, P2 and P3 are formed in the film F at locations corresponding to the photographic frames F1, F2 and F3, and are detected by the photoreflector 28.

The above-described processing of making a decision as to the kind of light source magnetically recorded on a photographic film capable of magnetic recording is also applicable to a photographic film capable of optical recording or the like. In addition, the above-described processing is also applicable to not only the color correction of a photographic camera but also the color correction of a video camera or the like according to the kind of light source.

As is apparent from the above description, according to the above-described embodiment, since it is possible to correct information about an illumination light source, it is possible to compensate for the disadvantage of an automatic decision as to the kind of light source, whereby it is possible to produce a good print at any time.

Figure 22:
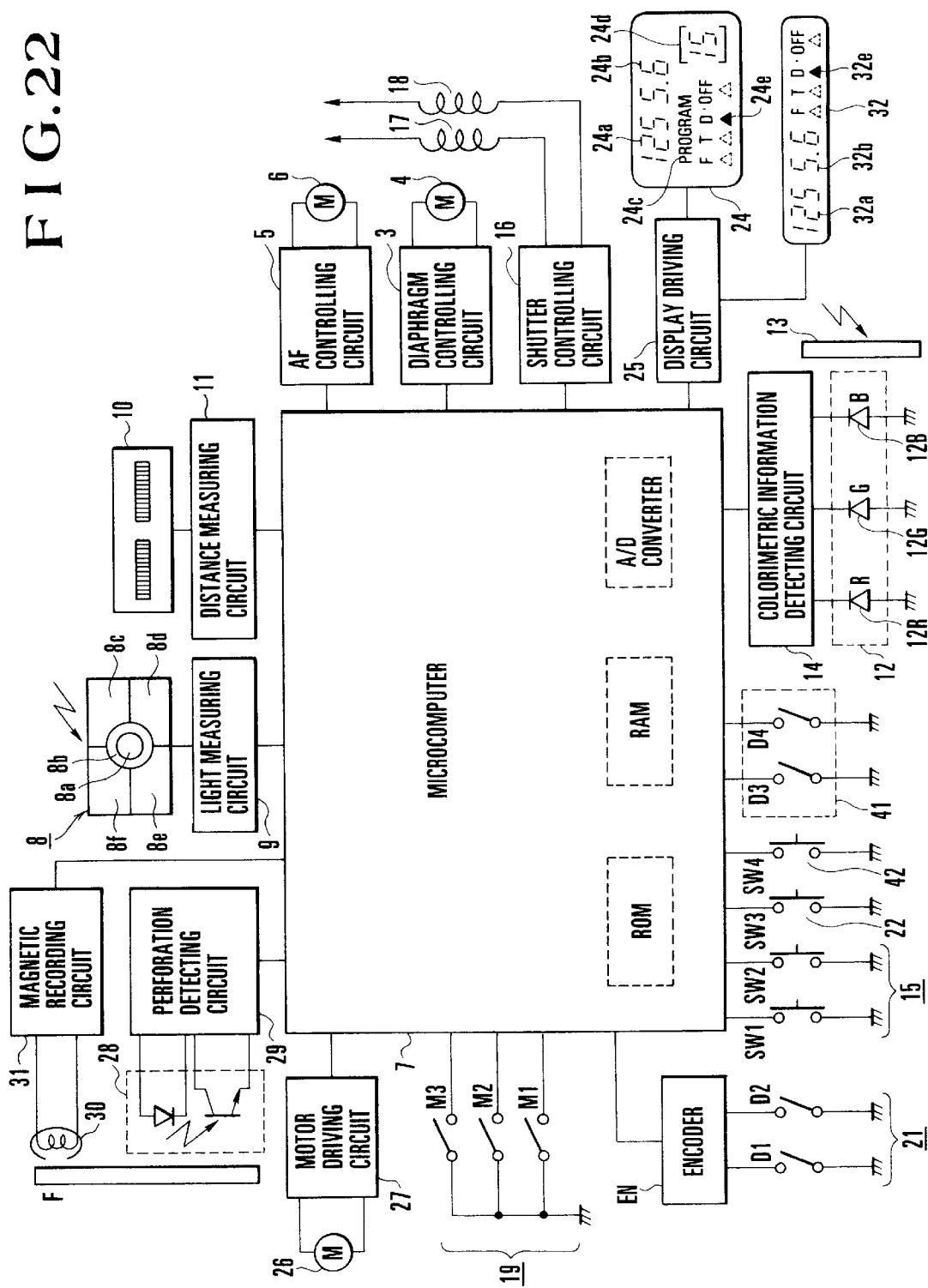
FIG. 22 is a schematic block diagram showing a camera capable of recording information about an illumination light source according to another embodiment of the present invention.

FIG. 22 is a block diagram showing a camera capable of recording information about an illumination light source according to another embodiment of the present invention.

Figure 23A:
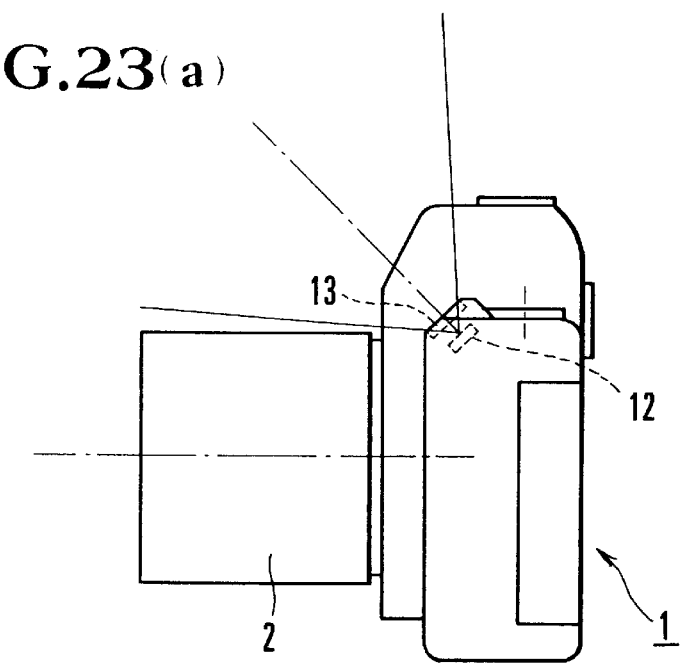
FIGS. 23(a) and 23(b) are a side elevational view and a top plan view schematically showing the external appearance of the camera according to the embodiment shown in FIG. 22.
Figure 23B:
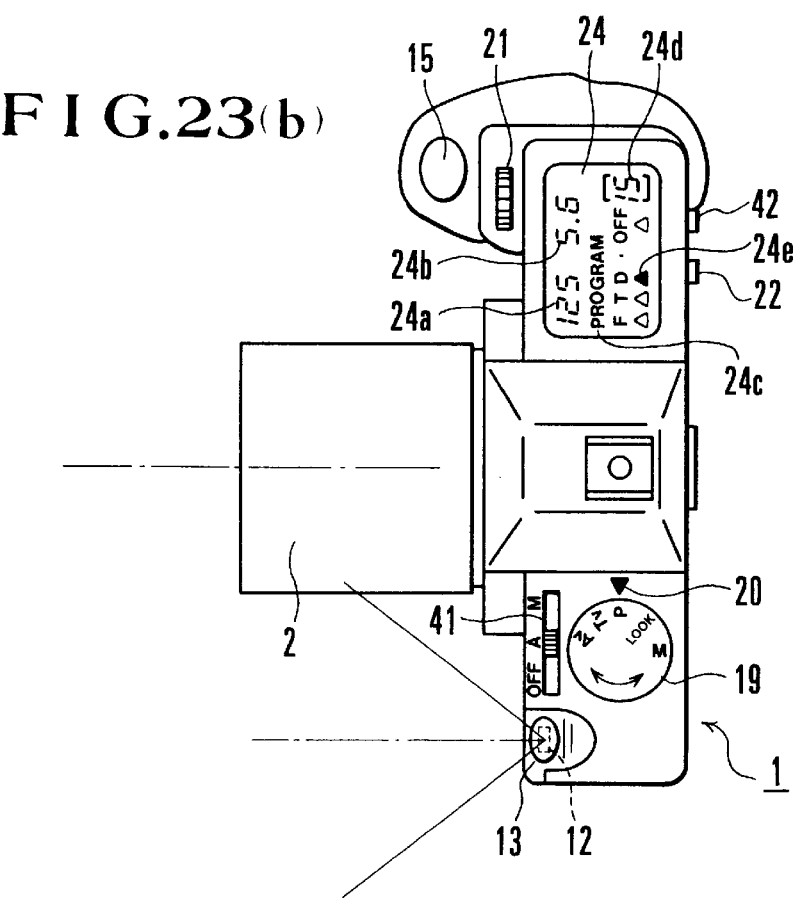

FIGS. 23(a) and 23(b) diagrammatically show the external appearance of the camera in side elevation and in top plan, respectively.

Figure 24:
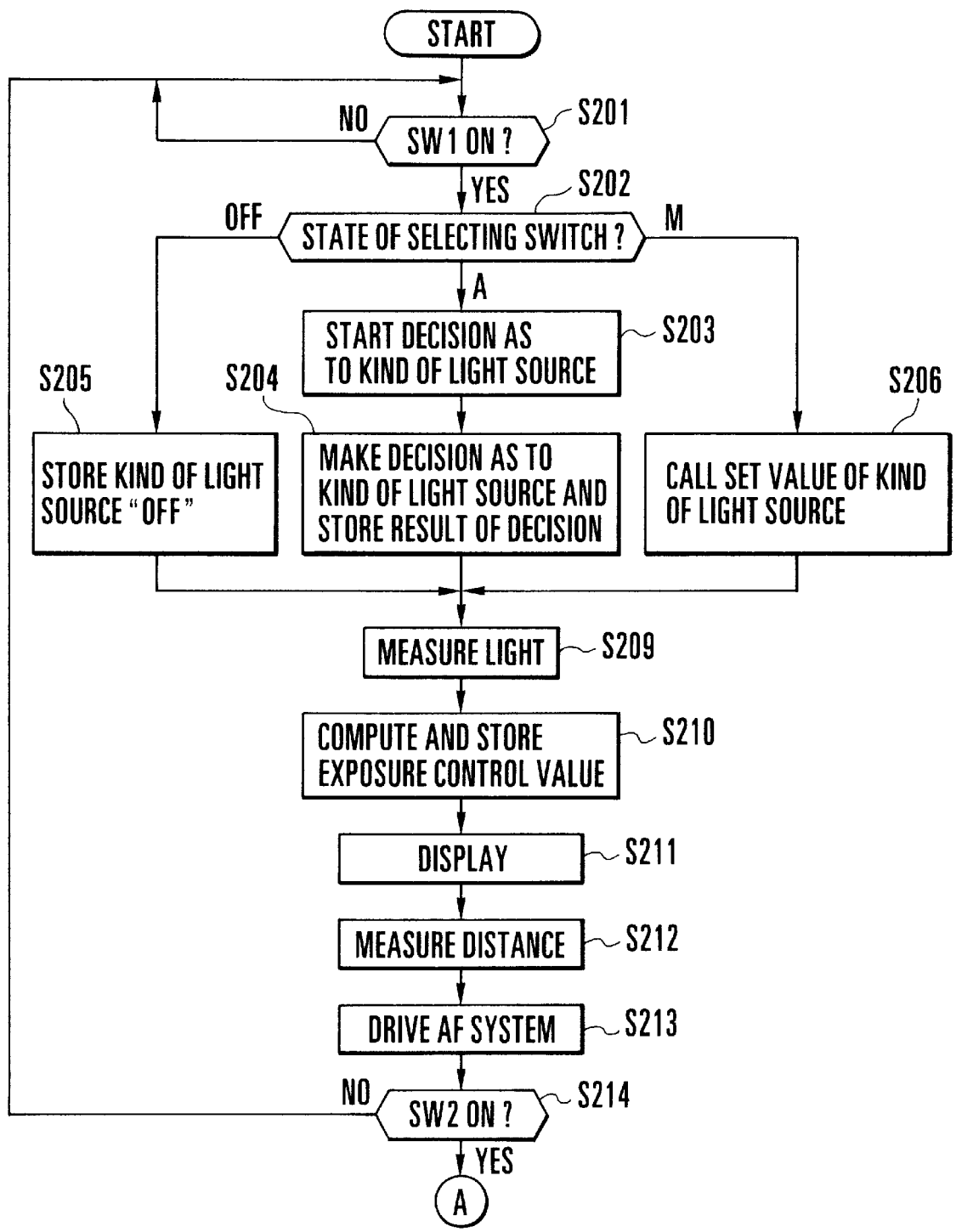
FIG. 24 is a flowchart showing the operation of the camera according to the embodiment shown in FIG. 22.

FIG. 24 shows a flowchart of the operation of the camera shown in FIG. 22.

According to this embodiment, a slide type selecting switch 41 is newly provided on the top of the camera body 1 as shown in FIG. 23(b). The selecting switch 41 has a two-bit switch arrangement made up of two elements D3 and D4, and is capable of selecting "OFF" which indicates the operation of inhibiting recording of the kind of light source, "A:Automatic" which indicates the operation of recording the result of an automatic decision, or "M:Manual" which indicates the operation of recording the content of manual setting.

Further, a setting switch 42 is newly provided on the back of the camera body 1. The setting switch 42 is arranged to be active only when the selecting switch 41 is set to the manual position "M". Each time a switch SW5 is turned on, the setting of the kind of light source is cyclically changed from the fluorescent lamp "F" in the order of →F→T→D→off . . . on step-by-step basis.

Identical reference numerals are used to denote constituent elements identical to those incorporated in any of the above-described embodiments, and the description thereof is omitted for the sake of simplicity.

In the case of the camera shown in FIG. 24, both the index 24e on the external LCD display 24 and the index 32e on the viewfinder LCD display 32 indicate "off" if the selecting switch 41 is set to the position "OFF". If the selecting switch 41 is set to the position "M", the indexes 24e and 32e indicate the content set by the setting switch. 42. If the selecting switch 41 is set to the position "A", the indexes 24e and 32e indicate the result of an automatic decision as to the kind of light source.

The operation of the aforesaid camera will be described below with reference to FIG. 24.

If the main dial 19 of the camera body 1 is set to a position other than "Lock", it is detected whether the switch SW1 has been turned on (S201). If the switch SW1 is off, the process waits for the switch SW1 to be turned on. If the switch SW1 is on, the process proceeds to Step S202, in which a decision is made as to the state of the selecting switch 41.

If the result of the decision is "A", the colorimetric information detecting circuit 14 is activated to start colorimetry (S203). Then, the process proceeds to the subroutine shown in FIG. 7 as described previously in connection with the second embodiment of the present invention, the processing of making a decision as to the kind of light source and storing the result of the decision is carried out (S204).

If it is determined in Step S202 that the state of the selecting switch 41 is "OFF", the storage of the kind of light source is switched off (S205).

If it is determined in Step S202 that the state of the selecting switch 41 is "M", the set value of the kind of light source which has been set by the setting switch 42 is called (S206).

Then, light measurement is performed by using the light measuring circuit 9 (S209), and an exposure control value is computed on the basis of the obtained measured-light value and the computed exposure control value is stored in the RAM (S210).

The stored exposure control value and the stored content about the kind of light source which has been stored in any of Steps S204, S205 and S206 are displayed on the external LCD display 24 and the viewfinder LCD display 32 (S211).

Photographic processing which follows Step S211 is identical to that performed in the previously-described embodiment, and the description thereof is omitted.

According to the above-described embodiment, it is possible to achieve effects and advantages similar to those of the embodiment shown in FIG. 15, and since information about the kind of photographic light source can be preset, it is possible to more securely prevent occurrence of an erroneous decision as to the kind of light source even in the case of a scene which tends to cause such erroneous decision.

Figure 25:
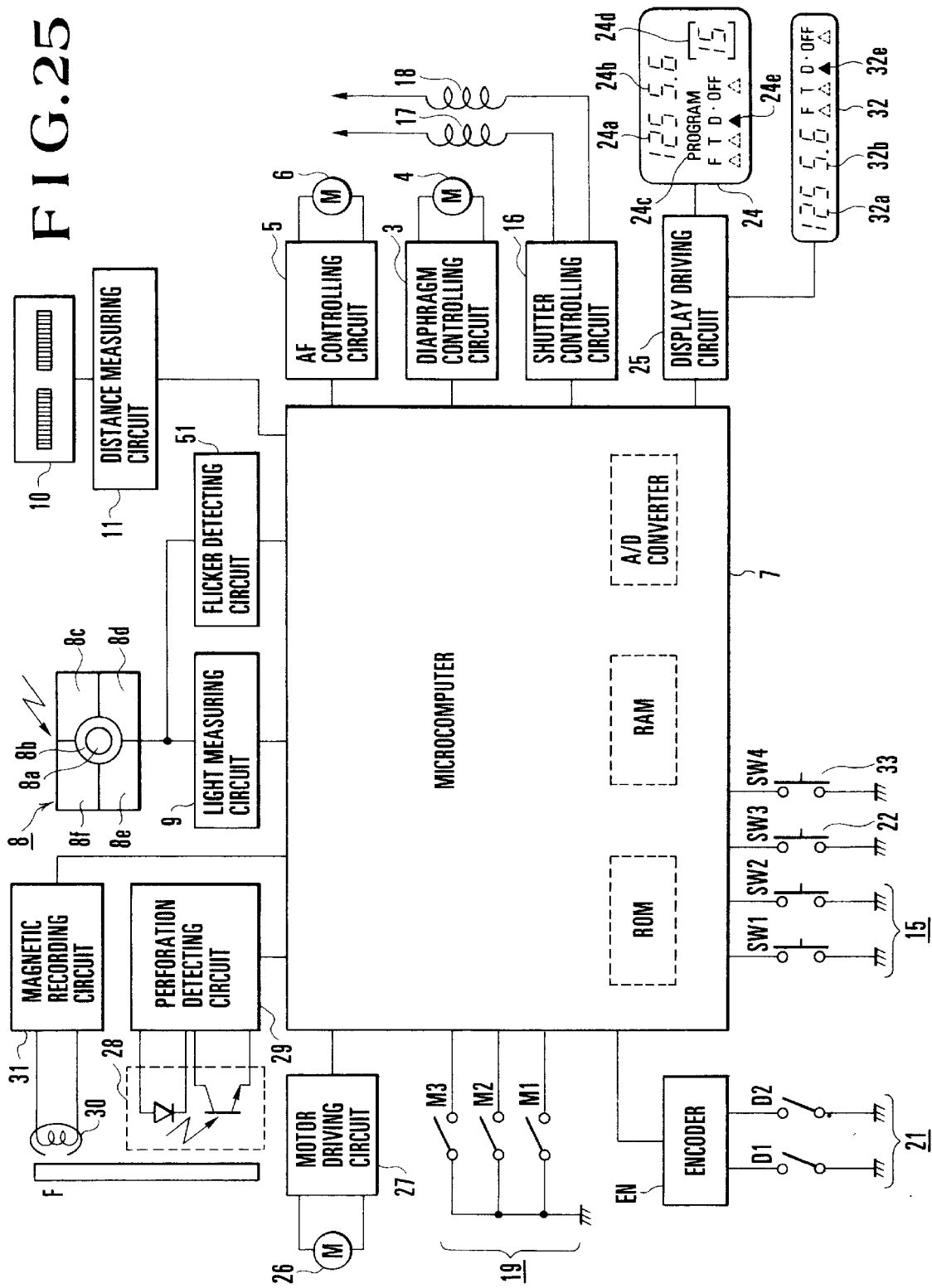
FIG. 25 is a schematic block diagram showing a camera capable of recording information about an illumination light source according to another embodiment of the present invention.

FIG. 25 is a block diagram showing another embodiment of the present invention, and shows a camera capable of recording information about the kind of light source.

Although calorimetric means, such as the calorimetric sensor 12 and the colorimetric information detecting circuit 14, are employed for making a decision as to the kind of light source in the embodiments shown in FIGS. 15 and 22, the embodiment shown in FIG. 25 makes a decision as to the kind of light source by detecting a flicker contained in illumination light during photography.

For this reason, in this embodiment, the RGB sensor 12 and the colorimetric information detecting circuit 14 are omitted. Instead, the flicker detecting circuit 51 is newly provided, and is connected to the light measuring sensor 8. The light measuring sensor 8 is the multiple-point light measuring sensor having the six light measuring areas 8a to 8f, and the flicker detecting circuit 51 performs flicker detection on the basis of the sum of the output signals of the light measuring areas 8a to 8f for the purpose of efficiently and uniformly detecting a flicker in the picture.

Incidentally, the operation of making a decision as to the kind of light source through flicker detection and storing the result of the decision is performed by means of processing identical to that shown in FIG. 13 referred to previously, and the description thereof is omitted.

In this embodiment as well, the stored kind of light source can be changed by the manipulation of the changing switch 33 through processing similar to that used in the embodiment shown in FIG. 15. Otherwise, the camera may be provided with the selecting switch 41 and the setting switch 42 for performing such changing operation as described above with reference to FIG. 22.

Figure 26:
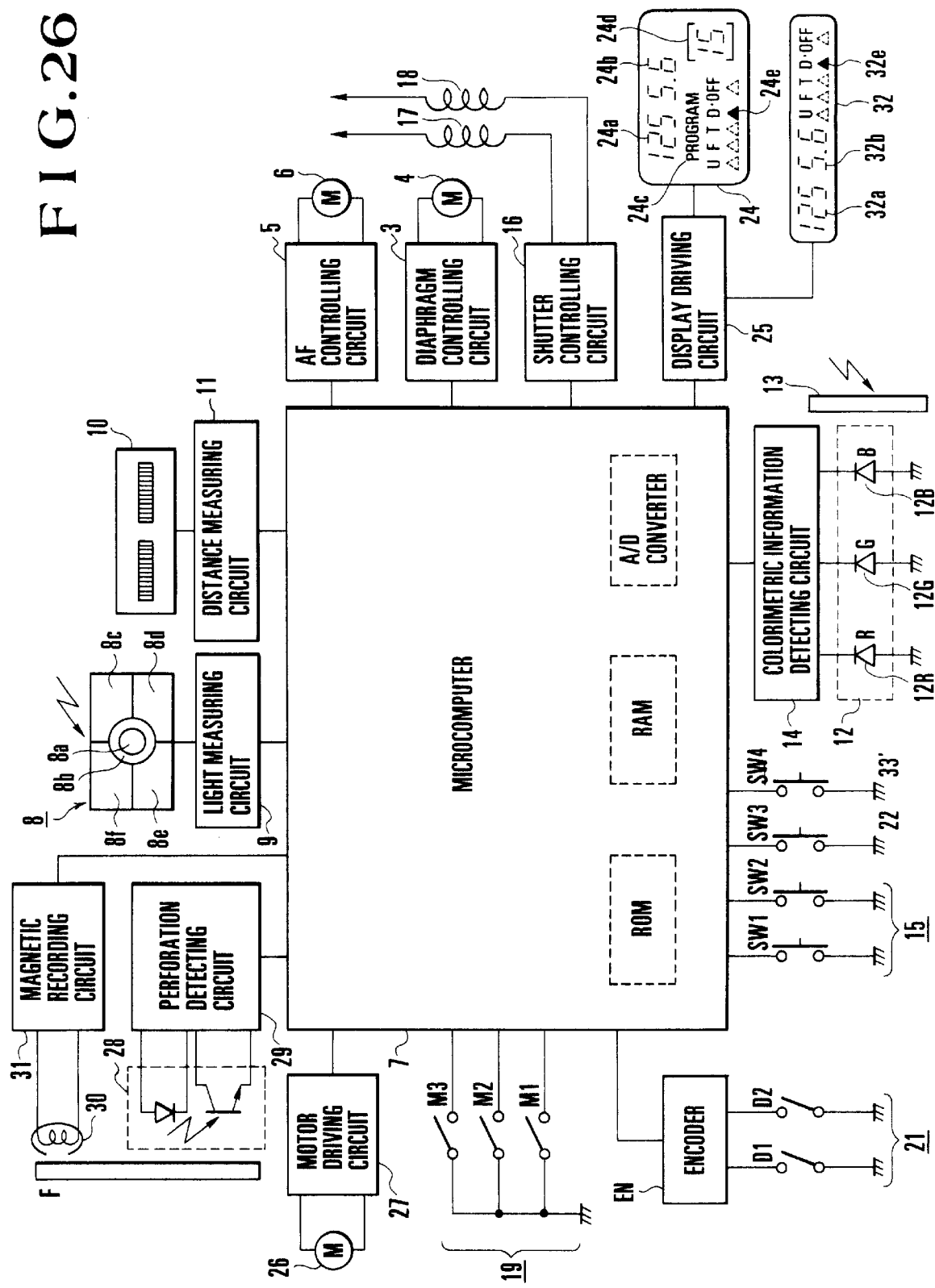
FIG. 26 is a schematic block diagram showing a camera capable of recording information about an illumination light source according to another embodiment of the present invention.

FIG. 26 is a circuit diagram showing another embodiment of the present invention, and identical reference numerals are used to denote constituent elements identical to those used in the embodiment shown in FIG. 15.

Figure 27:
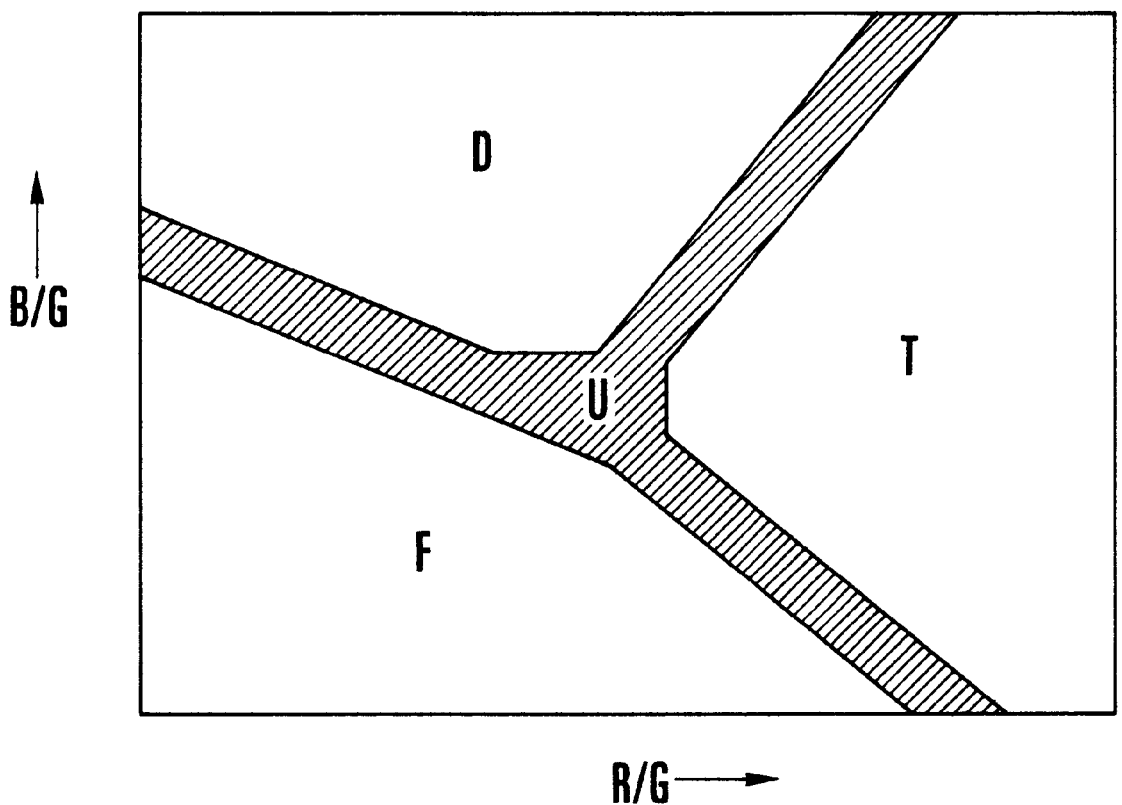
FIG. 27 is a decision region diagram for the camera according to the embodiment shown in FIG. 26.

The microcomputer 7 of this embodiment is arranged to make a decision as to whether illumination light during photography is the daylight "D", the fluorescent lamp "F", the tungsten lamp "T" or unknown "U", by using the R/G value and the B/G value by referring to a decision region diagram based on which to make a decision as to the kind of light source, such as that shown in FIG. 27. The decision region diagram shown in FIG. 27 is experimentally obtained in advance, and is stored in the ROM of the microcomputer 7.

In the decision region diagram, a region "U" which indicates that the kind of light source is unknown is disposed in such a manner that the other regions "D", "T" and "F" do not directly adjoin one another. This is because there is a high probability that a mixed-illuminant scene or a color failure scene is present in the region "U". If it is detected that the kind of light source which illuminates a particular scene belongs to the region "U", it is not preferable to set conditions based on any one of "D", "T" and "F" as the kind of light source for the purpose of printing such a scene. Accordingly, it is desirable to produce a print without setting specific conditions, i.e., on the basis of a color balance setting and an exposure setting based on normal AE.

In FIG. 26, reference numeral 33' denotes a selecting switch for selecting execution or nonexecution of the operation of detecting information about the kind of light source by using the calorimetric information detecting circuit 14. Each time the selecting switch 33' is manipulated (depressed to close the switch SW4), execution or nonexecution of such detecting operation is switched therebetween.

The external LCD display 24 displays the following contents, namely, the shutter speed 24a, the aperture value 24b, the exposure mode 24c, the frame counter 24d, and the index 24e for indicating the kind of light source, i.e., one of "F" (fluorescent lamp), "T" (tungsten lamp), "D" (daylight), "U" (unknown) and "off" (which indicates that the camera is set by means of the selecting switch 33' so as not to execute detection of information about the kind of light source). The viewfinder LCD display 32 displays the following contents: the shutter speed 32a, the aperture value 32b, and the index 32e for indicating the kind of light source, i.e., one of "F" (fluorescent lamp), "T" (tungsten lamp), "D" (daylight), "U" (unknown) and "off" (nonexecution of detection of information about the kind of light source).

Figure 28:
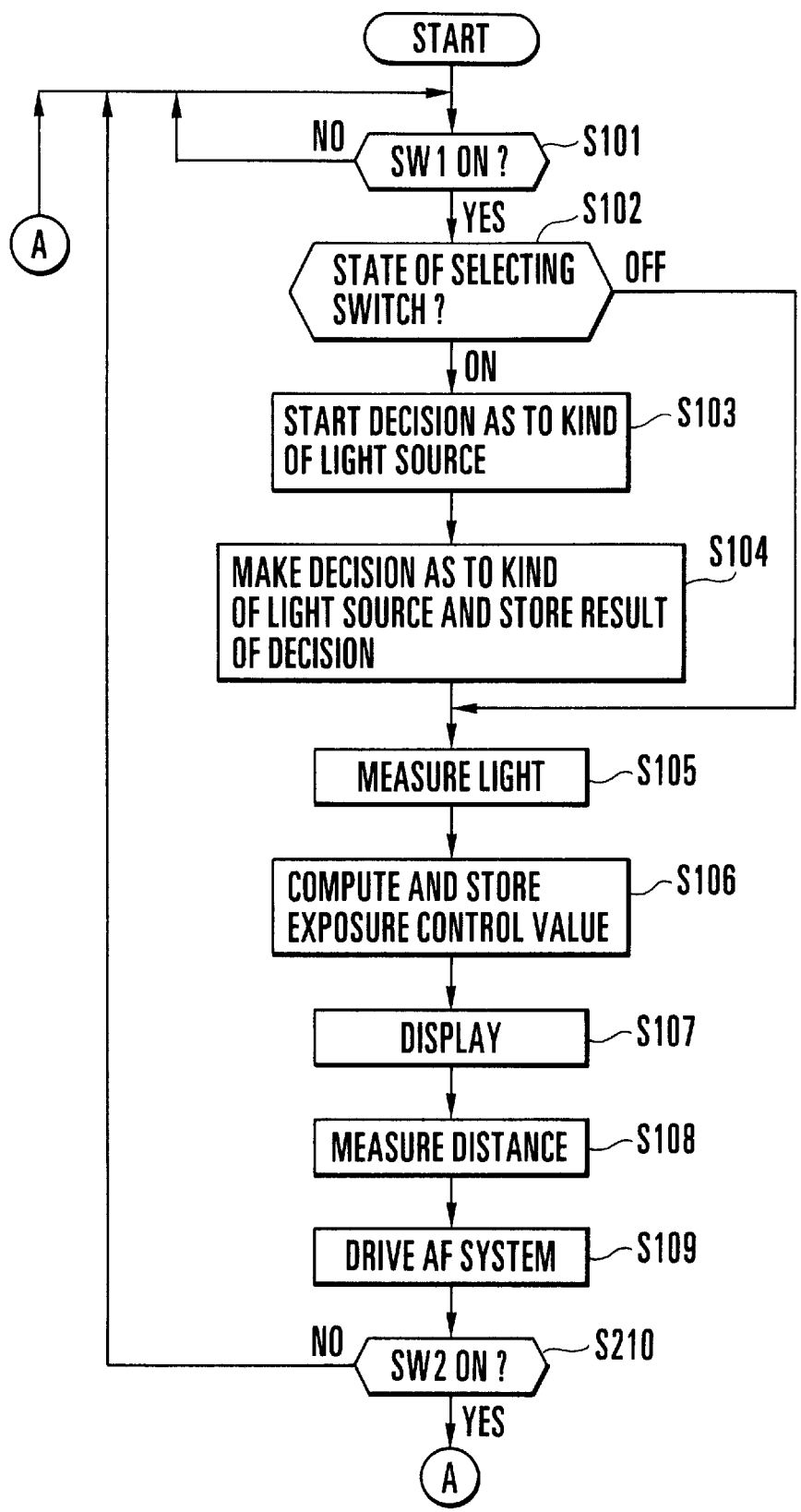
FIG. 28 is a flowchart showing the operation of the camera according to the embodiment shown in FIG. 26.
Figure 29:
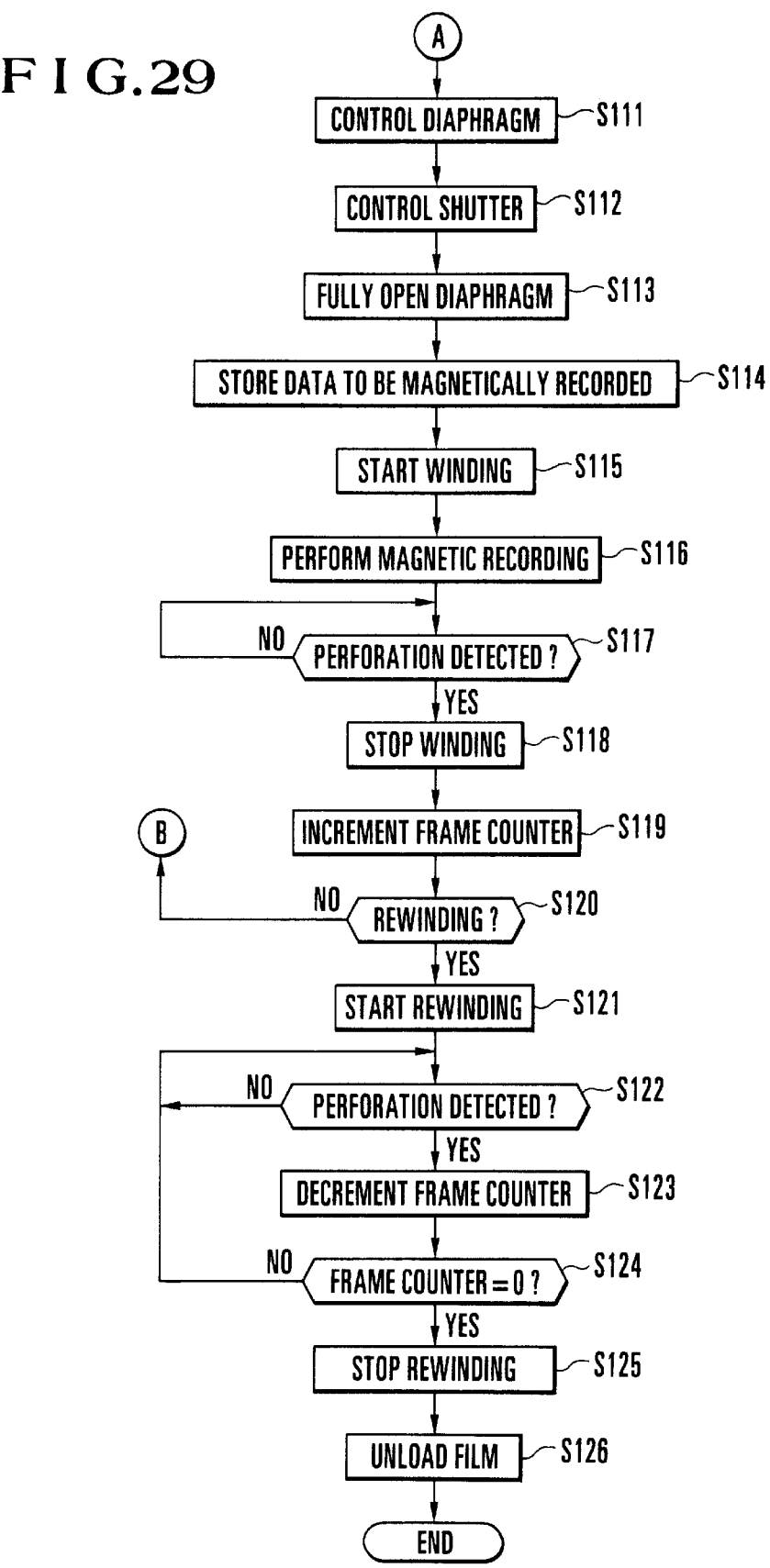
FIG. 29 is a flowchart showing the operation of the camera according to the embodiment shown in FIG. 26.

FIGS. 28 and 29 are flowcharts showing the operation of the camera according to the embodiment shown in FIG. 26. The operation of the camera will be described below with reference to FIGS. 28 and 29.

If the main dial 19 of the camera body 1 is set to a position other than "Lock", it is detected whether the switch SW1 has been turned on (S101). If the switch SW1 is not on, the process waits for the switch SW1 to be turned on. If the switch SW1 is on, the process proceeds to Step S102, in which a decision is made as to the state of the selecting switch 33' (S102). If the selecting switch 33' is on, the colorimetric information detecting circuit 14 is activated to start colorimetry (S103). Then, a decision is made as to the kind of light source and storage of the result of the decision is carried out (S104).

Figure 30:
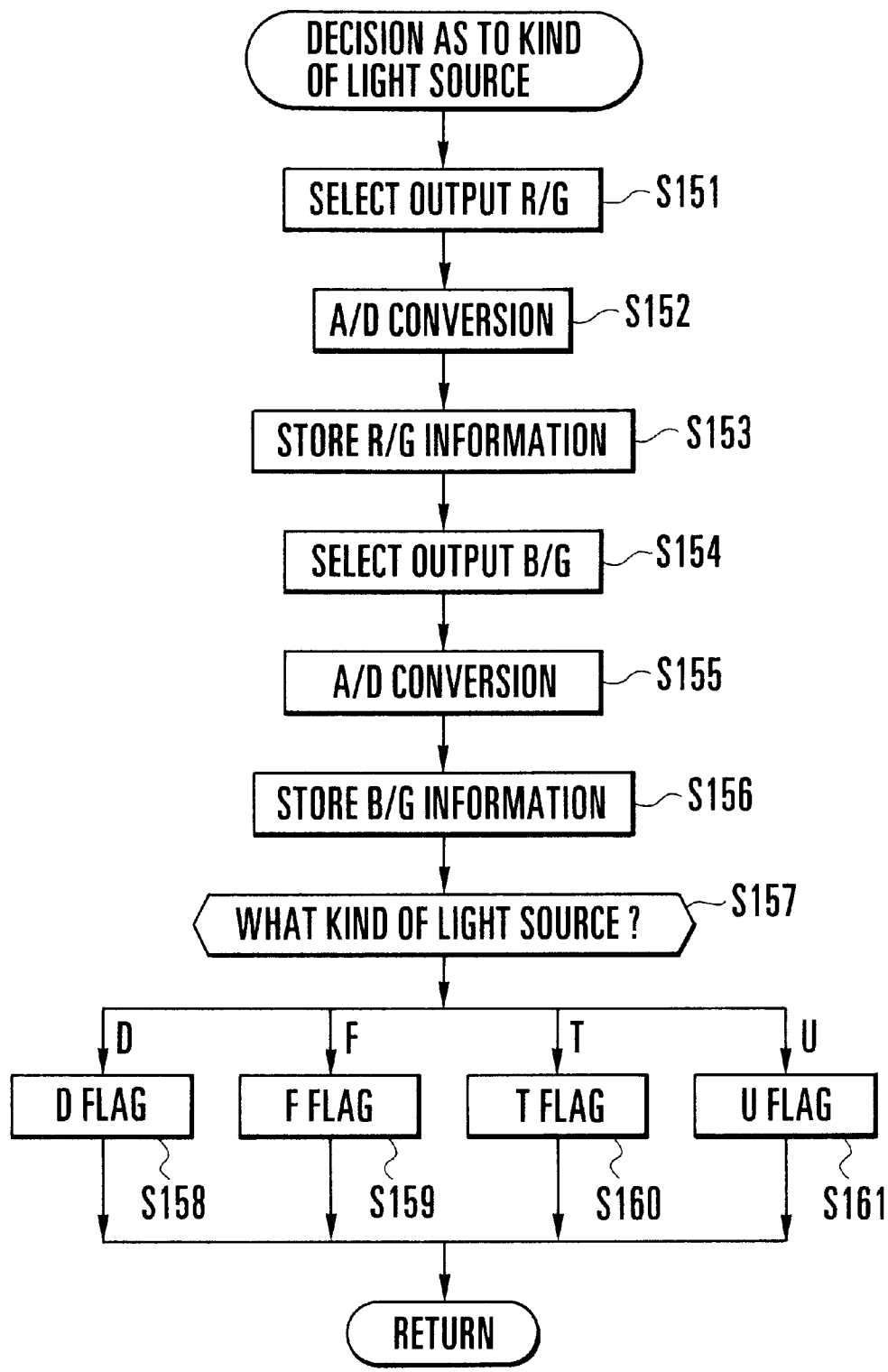
FIG. 30 is a flowchart showing a subroutine for the kind-of-light source decision processing shown in FIG. 28.

FIG. 30 shows the decision subroutine executed in Step S104. The flowchart shown in FIG. 30 is approximately identical to that shown in FIG. 5, and the detailed description thereof is omitted. Referring to Steps S157 to S161 of FIG. 30, a decision is made as to the kind of light source (S157). If it is determined that the kind of light source is daylight, the D flag is turned on (S158). If it is determined that the kind of light source is a fluorescent lamp, the F flag is turned on (S159). If it is determined that the kind of light source is a tungsten lamp, the T flag is turned on (S160). If it is determined (S161) that the kind of light source is unknown because of a mixed-illuminant scene or a color failure scene, a U flag is turned on (S161). In any case, the process proceeds to Step S105. The subroutine shown in FIG. 30 differs from that shown in FIG. 5 in this respect only.

When the process returns to the flowchart shown in FIG. 4, the light measuring circuit 9 is driven to start light measurement (S105), and an exposure control value, i.e., a shutter speed and an aperture value, are computed on the basis of the obtained, measured-light value and they are stored (S106). The result of the decision made as to the kind of light source which has been stored in Step S104 is displayed via the display driving circuit 25 by the index 24e on the external LCD display 24 and by the index 32e on the viewfinder LCD display 32, while the shutter speed and the aperture value which have been stored in Step S106 are respectively displayed by the shutter speed 24a and the aperture value 24b and by the shutter speed 32a and the aperture value 32b (S107). The distance measuring sensor 10 and the distance measuring circuit 11 are driven to detect the distance to a subject (S108), and the AF controlling circuit 5 and the AF motor 6 are driven to perform AF driving to make the position of focus of the photographic lens 2 coincident with the position of the subject (S108).

Then, it is determined whether the switch SW2 has been turned on by the manipulation of the release button 15 (S109). If a negative decision is made, the process returns to Step S101 (S110). If an affirmative decision is made, the process proceeds to the release operation shown in FIG. 29 which follows (A). In Step S111, the diaphragm controlling circuit 3 and the diaphragm driving motor 4 are controlled on the basis of the aperture value stored in Step S106, thereby reducing the diaphragm to the desired aperture value (S111).

The shutter controlling circuit 16 is made to control the retention-of-shutter-leading-curtain releasing magnet 17, thereby starting an exposure cycle. Then, the shutter controlling circuit 16 is made to drive the retention-of-shutter-trailing-curtain releasing magnet 18 when the shutter time stored in Step S106 elapses, thereby bringing the exposure cycle to an end (S112).

The stopped-down diaphragm is returned to the fully open state (S113). In Step S114, storage of data to be magnetically recorded later is performed. The data contains the data (D, F, T or U) about the kind of light source which has been stored in Step S104 as well as photographic data such as photographic mode, shutter time, aperture value, date and time instant. Then, the motor driving circuit 27 is made to drive the film transporting motor 26 in the forward direction, thereby starting winding the film F to the next photographic frame by one frame (S115). During the winding of the film F, the data stored in Step S114 is magnetically recorded on the magnetic recording layer provided on the film F by means of the magnetic recording circuit 31 and the magnetic head 30 (S116).

In Step S117, the perforation detecting circuit 29 and the photoreflector 28 are made to detect the perforations formed in the film F, so that it is determined whether the transportation of the film F by one frame has been completed, on the basis of the result of detection of the perforations. If it is determined that the transportation of the film F by one frame has been completed, the supply of electrical power to the motor 26 is shut off to stop winding the film F (S118). Then, a frame counter indicative of the number of exposed frames is incremented by one (S119), and it is determined whether rewinding is to be performed (S120). If no rewinding is needed, the process returns to Step S101. If rewinding is to be performed, the driving circuit 27 is made to drive the transporting motor 26 in the reverse direction, thereby starting rewinding the film F (S121).

The perforation detecting circuit 29 is made to detect whether the film F is being rewound on frame-by-frame basis (S122), and each time it is detected that the film F has been rewound by one frame, the frame counter is decremented by one (S123). Then, it is determined whether all the frames have been rewound (S124). If all the frames have been rewound, the process proceeds to Step S125, in which rewinding is brought to a stop. Then, the film F is unloaded from the camera body 1 (S126) and the entire operation is completed.

Figure 31:
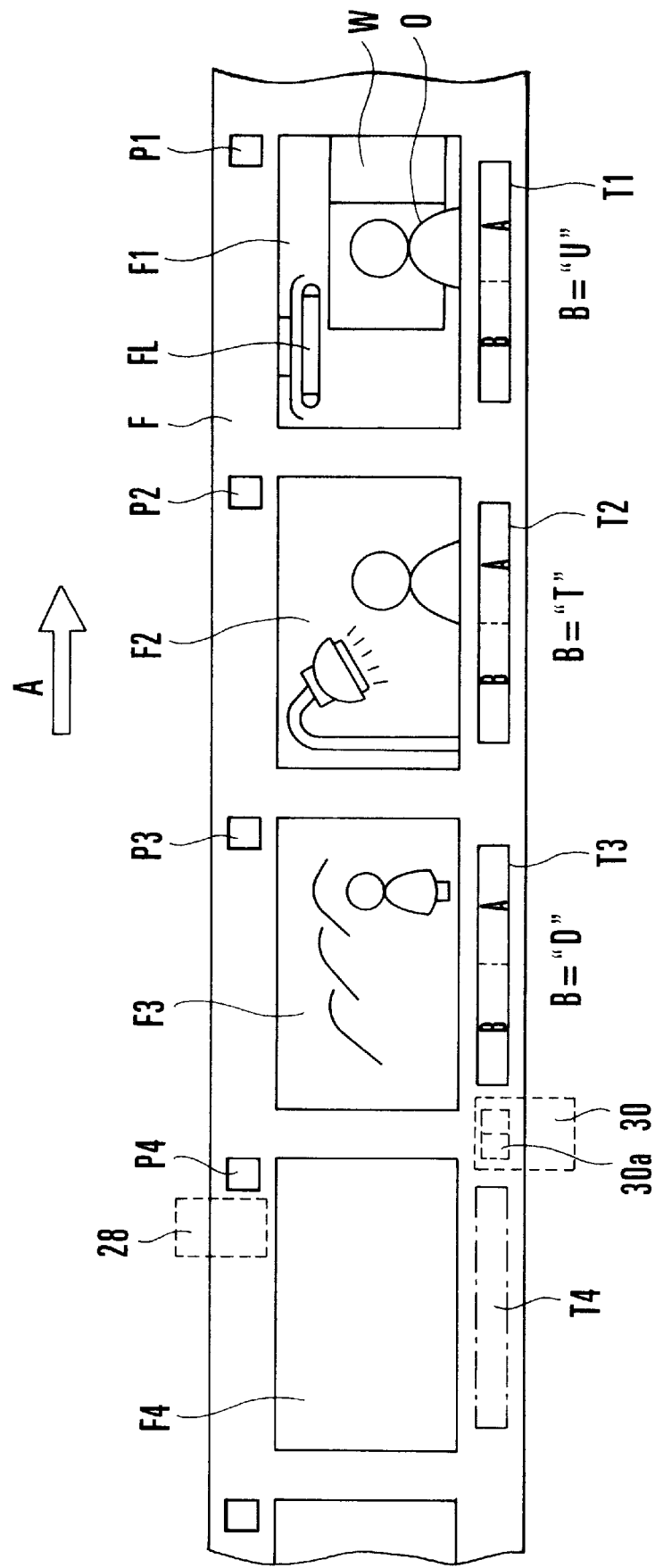
FIG. 31 is a view conceptually showing the state of a film containing frames exposed by the camera shown in FIG. 26.

FIG. 31 is a view conceptually showing the state of the film F being exposed by the camera according to the above-described embodiment.

Data recorded in each of the magnetic storage parts T1, T2 and T3 are indicated by "A" and "B", and the data "A" is general photographic data (exposure mode, shutter speed, aperture value, date, time instant, etc.) while the data "B" is information about the kind of light source (F, T, D or U).

In the example shown in FIG. 31, the data "B" about the photographic frame F2 indicates "T" and the data "B" about the photographic frame F3 indicates "D". The photographic frame F1 is exposed to a mixed-illuminant scene in which a person O, i.e., a main subject, is illuminated with daylight through a window W and fluorescent light emitted from a fluorescent lamp FL. It is, therefore, determined that the kind of light source is unknown, on the basis of the decision region diagram of FIG. 27 and the flowchart of FIG. 30, and the result of this decision is recorded as B="U".

Since the photographic frames F2 and F3 are respectively exposed to a scene illuminated with a tungsten lamp and a scene illuminated with daylight, B="T" and B="D" are recorded on the magnetic layers corresponding to the respective photographic frames F2 and F3.

If the film F is to be printed after development, the contents of the magnetic storage parts T1, T2 and T3 are read out by the magnetic readout means of a printer. Therefore, a print is produced from the photographic frame F1 on the basis of exposure settings and color balance settings according to normal AE which does not use special settings based on the kind of light source.

In the case of the photographic frame F2, the amount of print exposure as well as color balance are adjusted on the basis of an algorithm suited to a subject illuminated with tungsten light, while, in the case of the photographic frame F3, the amount of print exposure as well as color balance are adjusted on the basis of an algorithm suited to a subject illuminated with daylight. In this manner, it is possible to produce a good print from any of the photographic frames F1, F2 and F3.

If the selecting switch 33' is manipulated to select "OFF" (which indicates nonexecution of detection of information about the kind of light source), it is determined in Step S102 of FIG. 28 that no recording of information about the kind of light source is needed.

Figure 32:
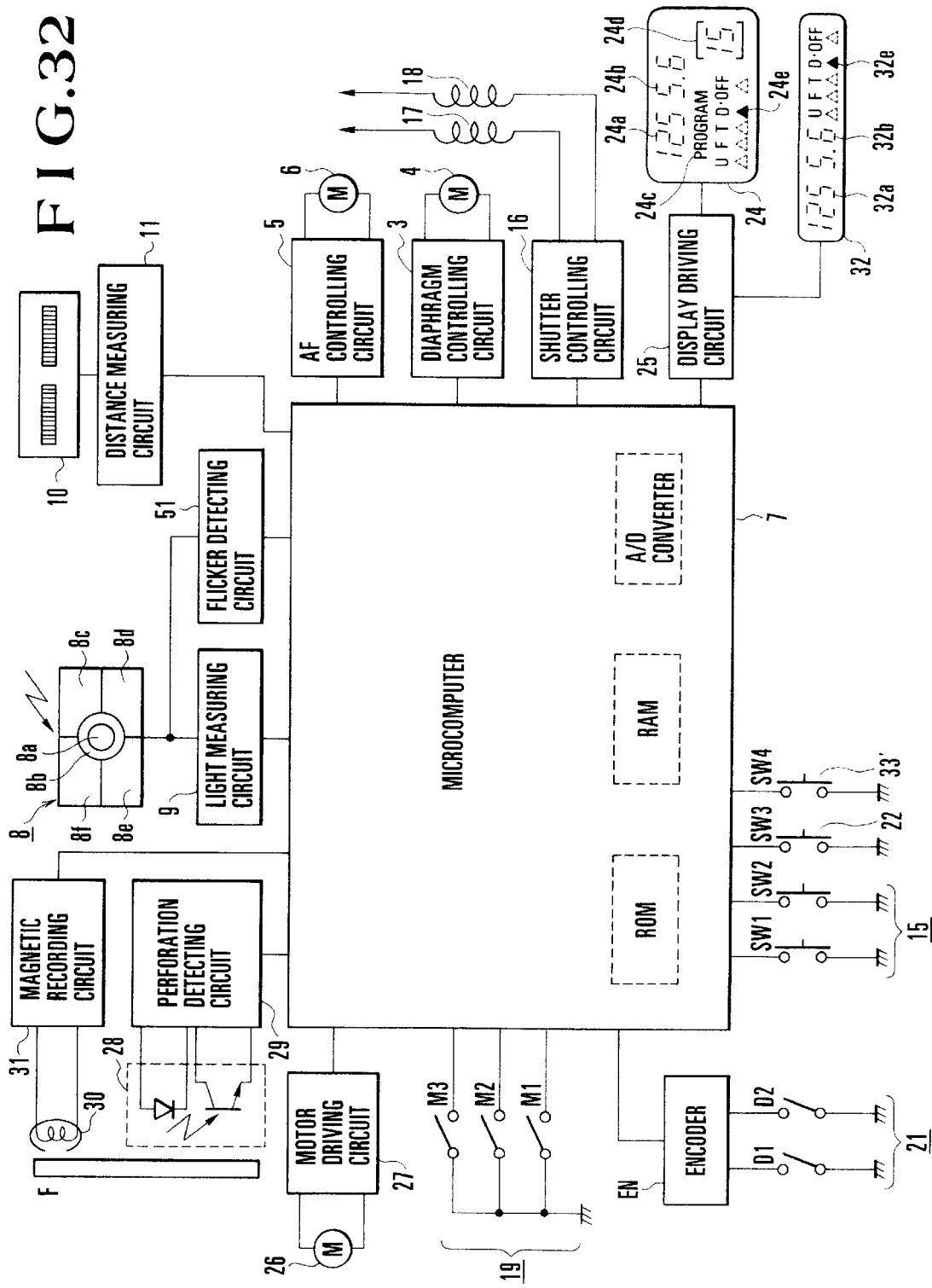
FIG. 32 is a schematic block diagram showing a camera capable of recording information about an illumination light source according to another embodiment of the present invention.

FIG. 32 is a block diagram showing another embodiment of the present invention, and shows a camera capable of recording information about the kind of illumination light source.

In the camera shown in FIG. 32, the flicker detecting circuit 51 for detecting a flicker contained in illumination light is connected to the light measuring sensor 8 so that the output of the flicker detecting circuit 51 can be inputted to the microcomputer 7, and the calorimetric information detecting circuit 14 and the associated elements which are used in the embodiment shown in FIG. 26 are omitted. The light measuring sensor 8 is the multiple-point light measuring sensor having the six light measuring areas 8a to 8f, and the flicker detecting circuit 51 performs flicker detection on the basis of the sum of the output signals of the light measuring areas 8a to 8f for the purpose of efficiently and uniformly detecting a flicker in the picture. Incidentally, in FIG. 32, identical reference numerals are used to denote the other constituent elements identical to those used in the embodiment shown in FIG. 26, and the description thereof is omitted.

FIG. 33(a) to 33(h) are the input and output waveforms of the flicker detecting circuit 51 shown in FIG. 32. FIGS. 33(a) and 33(b) show a case where the fluorescent lamp F is detected. FIGS. 33(c) and 33(d) show a case where the tungsten lamp T is detected. FIGS. 33(e) and 33(f) show a case where the daylight D is detected.

FIG. 33(g) and 33(h) show the output waveforms obtained from a mixed-illuminant scene illuminated with "F" and "T" light sources, and respectively show the output waveform of the first-stage amplifying part of the flicker detecting circuit 51 and the output waveform obtained by passing the output waveform of the first-stage amplifying part through the high-pass circuit.

In the case shown in FIGS. 33(g) and 33(h), since the light source F contains a high-frequency component, a flicker voltage Vu is observed in the output waveform (FIG. 33(h)) obtained by passing the output waveform of the first-stage amplifying part through the high-pass filter. The flicker voltage Vu is detected as a small value compared to the flicker voltage Vf (FIG. 33(b)) obtained in the case of illumination with the "F" light source alone, and a large value compared to the flicker voltage Vt (FIG. 33(d)) obtained in the case of illumination with the "T" light source alone. Accordingly, it is possible to detect the mixed-illuminant scene illuminated with the "F" and "T" light sources by performing comparing processing.

Figure 34:
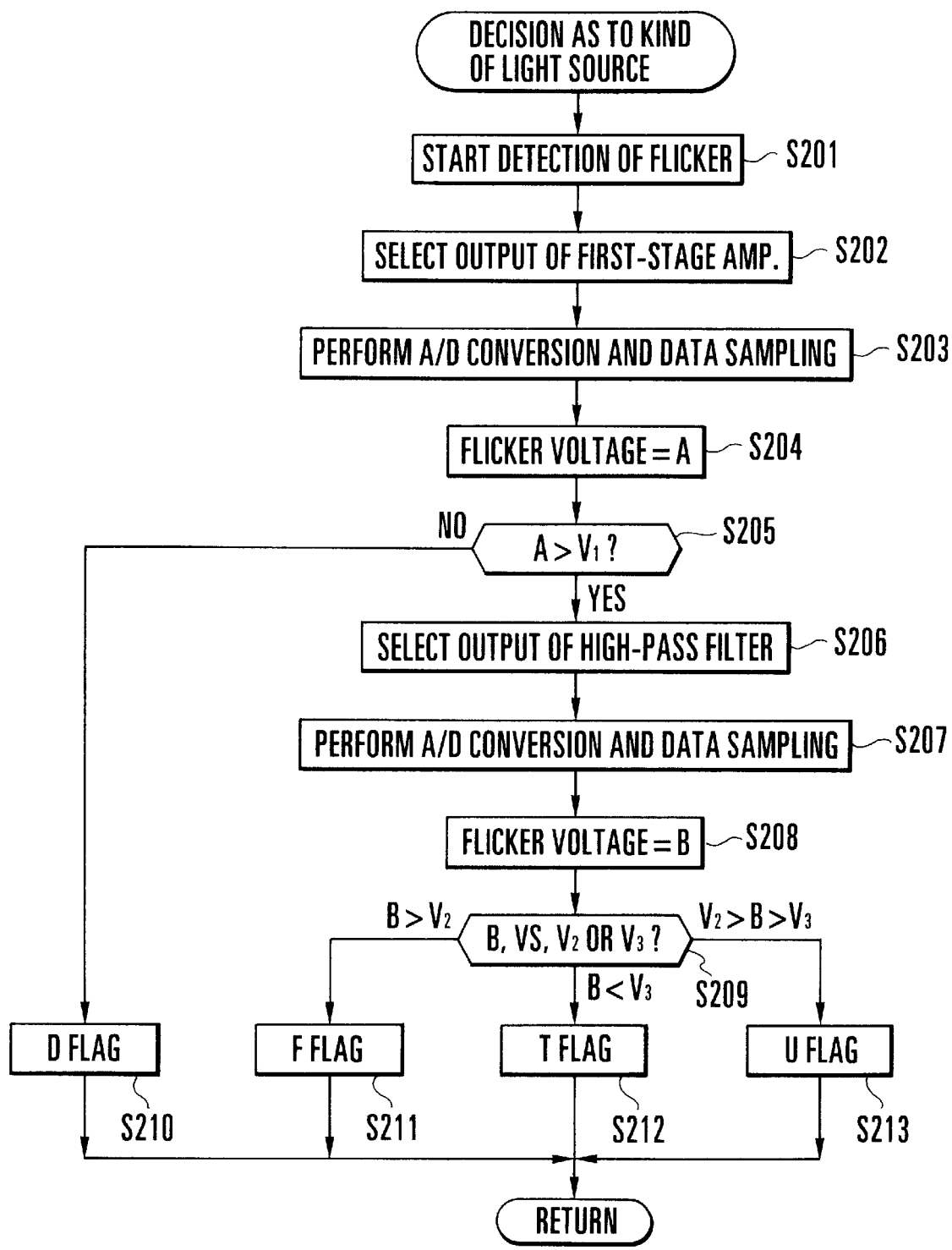
FIG. 34 is a flowchart showing the operation of the camera according to the embodiment shown in FIG. 32.

FIG. 34 is a flowchart showing the operation of the embodiment shown in FIG. 26. The operation of the embodiment shown in FIG. 26 will be described below with reference to FIG. 34. Incidentally, the flowchart shown in FIG. 34 corresponds to the flowchart of FIG. 30 which is used in the embodiment shown in FIG. 26, and represents a subroutine for making a decision as to the kind of light source. Since the entire basic operation is substantially identical to the flowcharts shown in FIGS. 28 and 29, the description thereof is omitted. In addition, since the processing of discriminating between daylight and a fluorescent lamp is identical to that shown in FIG. 13, the description thereof is omitted.

Referring to a comparison with the flicker voltage B in Step S209 of FIG. 34, if B<V3, it is determined that the kind of light source is tungsten light, and the T flag is turned on (S212). If V2>B>V3, it is determined that the current scene is a mixed-illuminant scene (unknown) (S212), and the U flag is turned on (S213).

The result of such decision is magnetically recorded during the transportation of the film F by one frame after a shutter release operation in a manner similar to that explained previously in connection with FIG. 26.

Although, in the description of this embodiment, reference has been made to a mixed-illuminant scene illuminated with the "T" and "F" light sources, it is also possible to detect a mixed-illuminant scene illuminated with the "D" and "T" light sources or a mixed-illuminant scene illuminated with the "D" and "F" light sources, because a flicker voltage of intermediate magnitude is observed in the output waveform of the high-pass filter.

In addition, in the case of the mixed-illuminant scene illuminated with the "D" and "T" light sources or the "D" and "F" light sources, it is possible to detect such mixed-illuminant scene from the flicker voltage of the first-stage amplifying part, because a flicker voltage, which has a magnitude intermediate between the magnitude of a flicker voltage observed in the case of the "D" light source and the magnitude of a flicker voltage observed in the case of the "F" or "T" light source, is observed in the output waveform of the first-stage amplifying part.

Figure 35:
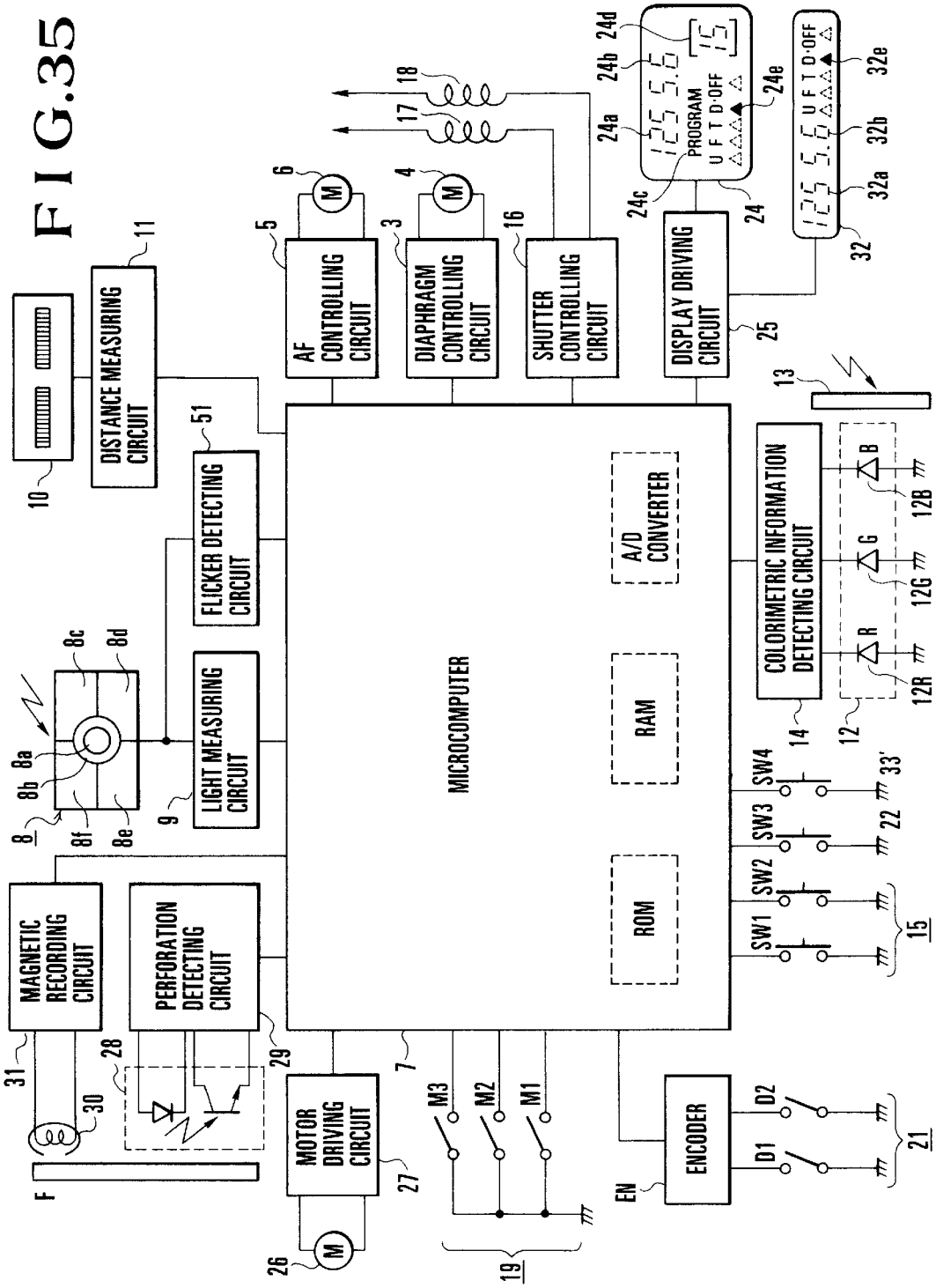
FIG. 35 is a schematic block diagram showing a camera capable of recording information about an illumination light source according to another embodiment of the present invention.

FIG. 35 is a block diagram showing another embodiment of the present invention, and shows a camera capable of recording information about the kind of illumination light source.

This embodiment is provided with the photographic lens 2 and the calorimetric information detecting circuit 14 as well as the flicker detecting circuit 51. In FIG. 35, identical reference numerals are used to denote constituent elements identical to those used in the embodiments shown in FIGS. 26 and 32.

According to the embodiment shown in FIG. 35, it is possible to more securely prevent production of an imperfect print by using two means for detecting the kind of light source, i.e., colorimetric means and flicker detecting means.

The calorimetric means is arranged to detect the kind of light source within an angle of view, such as that shown in FIG. 2, whereas the light measuring sensor 8 which constitutes the flicker detecting means is arranged to perform light measurement on a light flux passing through the photographic lens 2, i.e., detect the kind of light source within the angle of view of the photographic lens 2. Since the kind of light source can be detected through the two different angles of view, there is a higher possibility that predominance light sources of different kinds will be present within the respective angles of view in a scene illuminated with two or more kinds of light sources. Accordingly, it is possible to detect a mixed-illuminant scene at higher accuracy.

Figure 36:
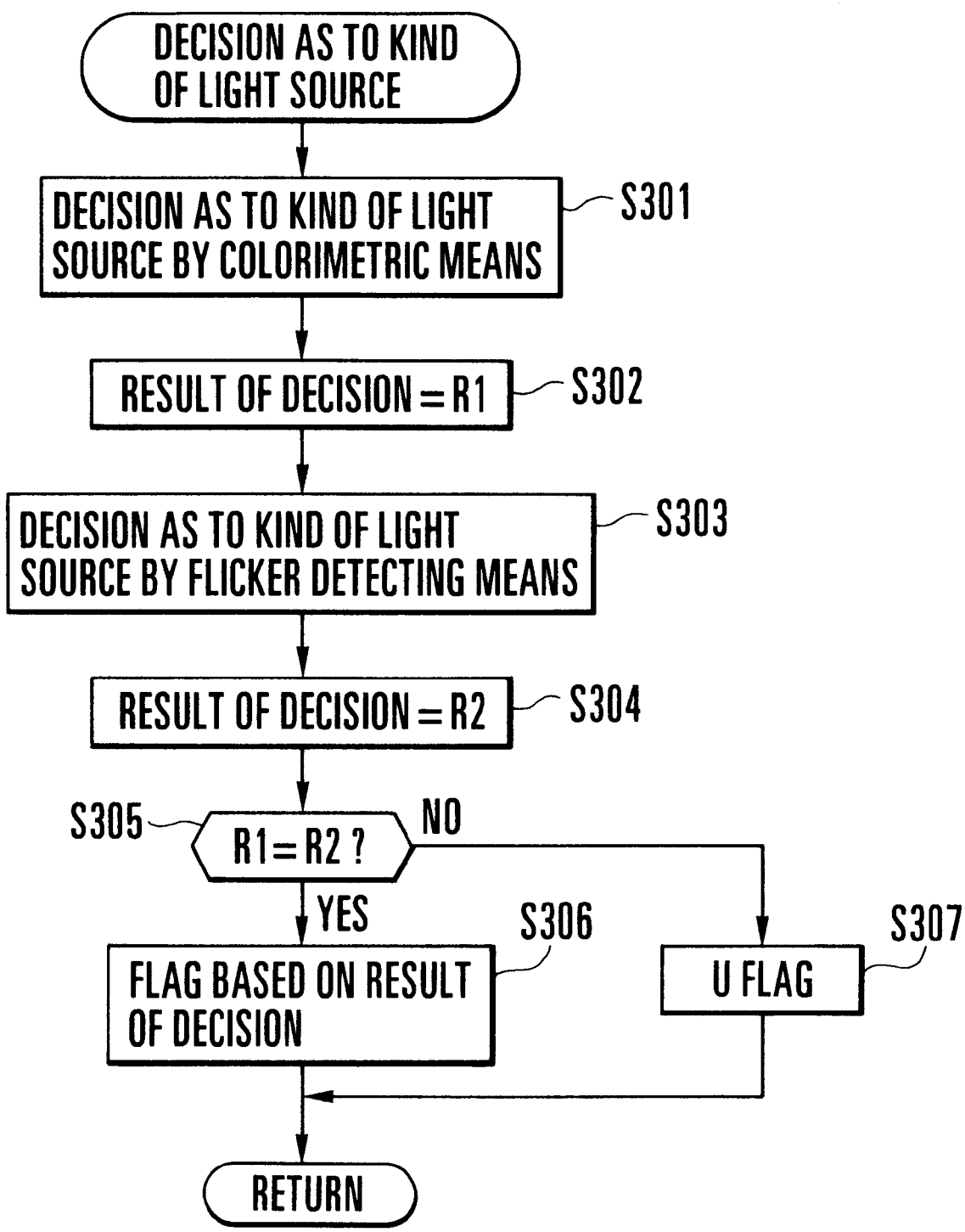
FIG. 36 is a flowchart showing the operation of the camera according to the embodiment shown in FIG. 35.

FIG. 36 is a flowchart of the operation of the embodiment shown in FIG. 35. The subroutine shown in FIG. 36 is substituted for each of the kind-of-light-source decision subroutine shown in FIG. 30 which is prepared for the embodiment of FIG. 26 and the kind-of-light-source decision subroutine shown in FIG. 34 which is prepared for the embodiment of FIG. 32.

Referring to FIG. 36, if the subroutine for making a decision as to the kind of light source is called, a decision is made as to the kind of light source by using the colorimetric means (S301). The result of the decision (any of D, T, F and U) as to the kind of light source is stored as R1 (S302). Then, a decision is made as to the kind of light source by using the flicker detecting means (S303). The result of the decision (any of D, T, F and U) by the flicker detecting means is stored as R2 (S304). It is determined whether the decision results R1 and R2 provided by the colorimetric means and the flicker detecting means coincide with each other (S305). If both decision results R1 and R2 coincide with each other, a flag which corresponds to the decision results provided by both means is set, and the process returns to the main routine (S306). If the decision results R1 and R2 do not coincide with each other, the U flag is turned on, and the process returns to the main routine (S307). Incidentally, although this embodiment employs the colorimetric means and the flicker detecting means, the bright line detecting means which is used in the conventional example (for detecting a bright line of 436 nm, etc., peculiar to a fluorescent lamp) may be employed instead of either of the colorimetric means and the flicker detecting means. Incidentally, the respective decisions made in Steps S301 and S303 are independently processed by the flowcharts shown in FIGS. 30 and 34.

As is apparent from the above description, the aforesaid embodiment is provided with the two different kinds-of-light-sources detecting means (the calorimetric means and the flicker detecting means), and if there is a possibility that the kind of light source is erroneously detected, the result of the decision as to the kind of light source is recorded as "unknown". Accordingly, it is possible to prevent production of an imperfect print.

Figure 37:
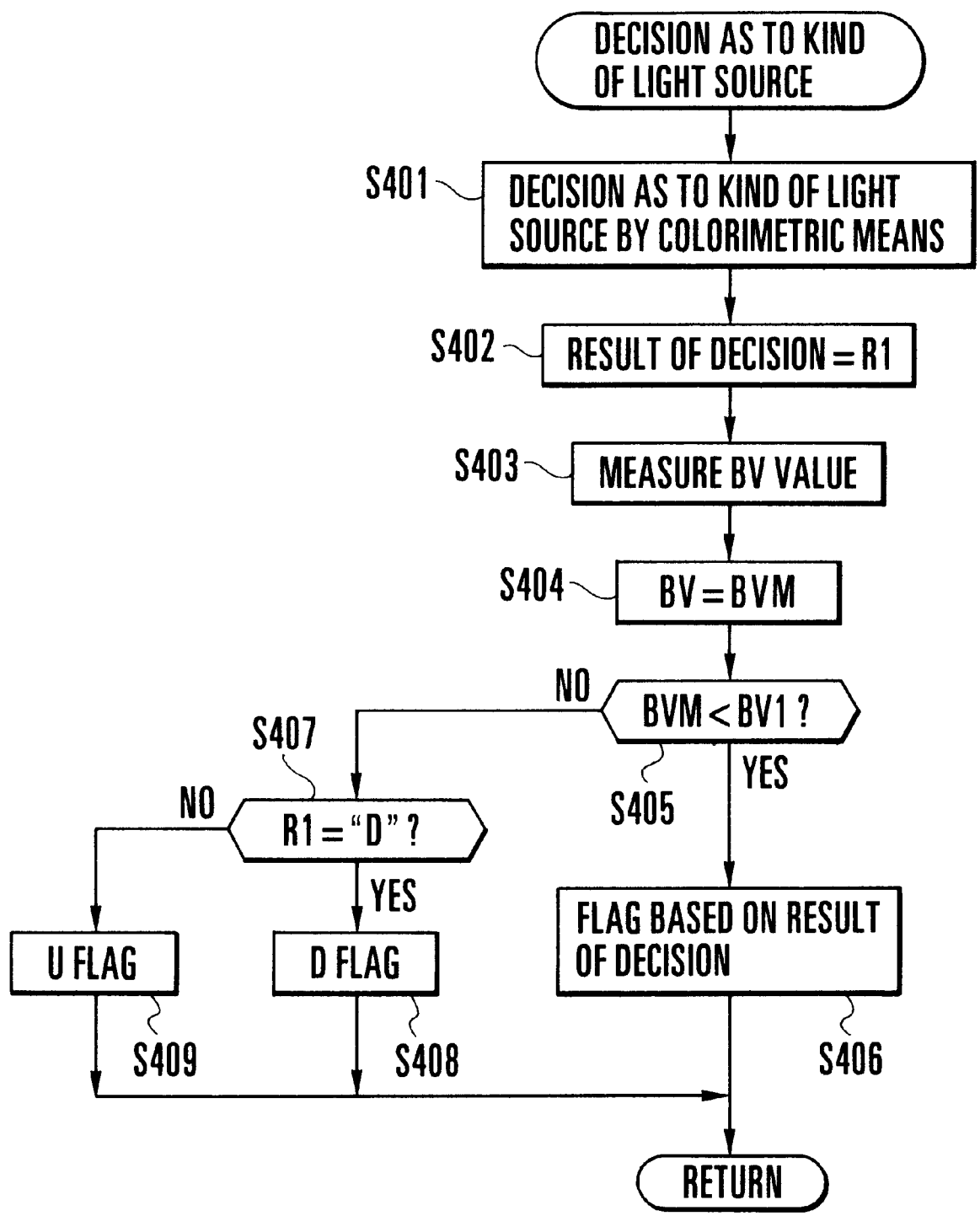
FIG. 37 is a flowchart showing the operation of a camera capable of recording information about an illumination light source according to another embodiment of the present invention.
Figure 38:
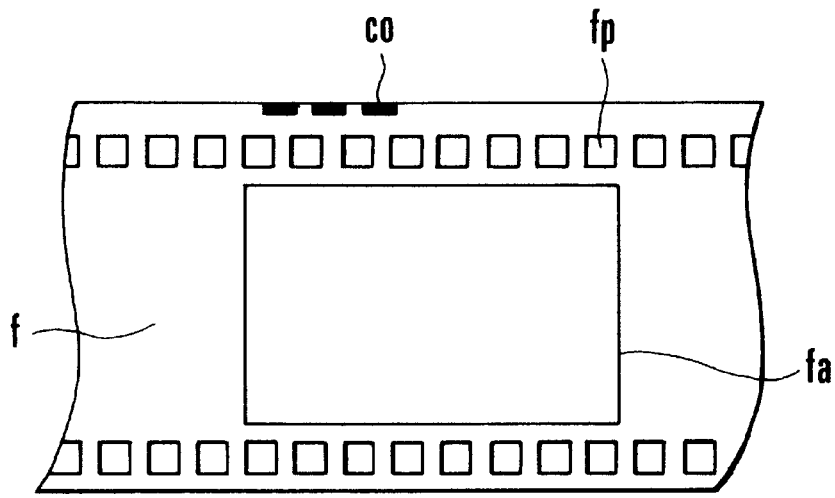
FIG. 38 is a front elevational view of a conventional film on which information about the kind of light source is recorded.
Figure 39:
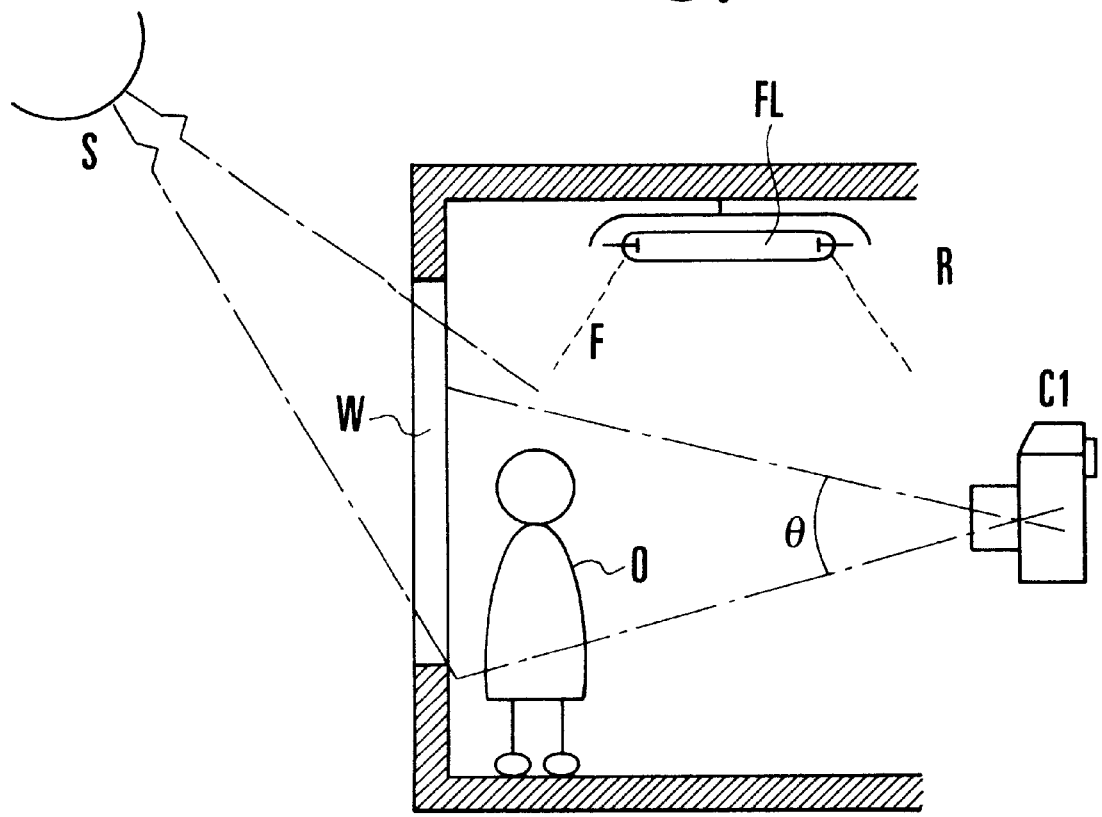
FIG. 39 is an explanatory view of a conventional art, showing a mixed-illuminant scene.

FIG. 37 is a flowchart of the operation of a camera according to another embodiment.

The operation of making a decision as to the kind of light source will be described below with reference to the flowchart shown in FIG. 37. If the subroutine for making a decision as to the kind of light source is called, a decision is made as to the kind of light source by using the calorimetric means (S401). The result of the decision (any of D, T, F and U) as to the kind of light source is stored as R1 (S402). Then, the light measuring sensor 8 and the light measuring circuit 9 are driven once to measure a subject luminance value BV (S403). The measured subject luminance value is stored as a value BVM (S404). It is determined whether the stored value BVM is smaller (darker) than a preset luminance value BV1 (S405). If an affirmative decision is made, a flag is turned on on the basis of the result of the decision made in Step S402, and the process returns to the main routine (S406).

If it is determined that BVM>BV1, the process proceeds to Step S407, in which it is determined whether the kind of light source stored in Step S402 is the daylight D. In the case of the daylight D, the D flag is turned on and the process returns to the main routine (S408). If the kind of light source is not the daylight D, the U flag is turned on, and the process returns to the main routine (S409).

Incidentally, to achieve similar effects, the colorimetric means which is used in this embodiment may be replaced with the flicker detecting means, or the colorimetric means and the flicker detecting means.

In the above-described manner, the aforesaid embodiment adopts a method which includes the steps of making a decision as to the kind of light source by using the colorimetric means and again making a decision as to the result of the decision obtained from the colorimetric means, on the basis of a subject luminance. Accordingly, if a high subject luminance like the luminance of a subject under a bright sky is observed when the result of a decision obtained from the calorimetric means is "F" or "T", it is possible to determine that it is apparently proper to regard the result of the decision as an erroneous decision. In addition, if there is a possibility that an erroneous decision will be made as to the kind of light source, it is possible to record the decision result as "unknown". It is, therefore, possible to securely prevent production of an imperfect print.

What is claimed is:

1. A camera system capable of causing a detecting circuit to detect information relative to the kind of illumination light source and causing a detection result provided by said detecting circuit to be recorded on a recording part, comprising:

(a) a first operation member which shifts to a first operation state by manual operation and to a second operation state through the first operation state, the second operation state being for starting an image recording, (b) a second operation member provided independently from the first operation member, (c) a control circuit including a holding circuit, which control circuit causes the detection circuit to repeatedly detect information about the kind of light source during shift of the first operation member from the first operation state to the second operation state when the second operation member is not operated, said control circuit having at least one mode of first to third modes:

first mode for causing the holding circuit to hold a detection result of the detection circuit obtained when the second operation member is operated when the first operation member is operated in the first operation state, second mode for causing the holding circuit to hold a detection result of the detection circuit obtained when the first operation member shifts to the first operation state under a condition that the second operation member is operated, third mode for causing the holding circuit to hold a detection result of the detection circuit by the operation of the second operation member irrespective of the operation state of the first operation member, and (d) a recording controlling circuit for causing the recording part to record information detected by the detection circuit when the first operation member shifts to the second operation state through the first operation state under the condition that the second operation member is not operated, and causing the recording part to record the information held by the holding circuit when the detection result is held by the holding circuit under at least one of the first to third modes.

2. A camera system according to claim 1, further comprising:

a timer for holding the information in the holding circuit for a predetermined time.

3. A camera system according to claim 1, wherein the recording part is a magnetic recording part provided on each frame of a film.

4. A camera system according to claim 1, wherein the first operation member is a release operation member.

5. A camera system capable of causing a detecting circuit to detect information relative to the kind of illumination light source and causing a detection result provided by said detecting circuit to be recorded on a recording part, comprising:

- a) a displaying circuit for displaying the kind of illumination light source detected by the detecting circuit;
- b) a changing circuit for setting information relative to the kind of light source by manual operation independently of the detection result provided by said detecting circuit; and
- c) a recording controlling circuit for causing data which corresponds to the detection result or data which corresponds to the information set by said changing circuit to be recorded on said recording part, wherein said recording controlling circuit records the set data in preference to the data corresponding to the detection result when the information relative to the kind of light source is set by said changing circuit.

6. A camera system capable of causing a detecting circuit to detect information relative to the kind of illumination light source and causing a detection result provided by said detecting circuit to be recorded on a recording part, comprising:

- a displaying circuit for displaying the kind of illumination light source detected by the detecting circuit;
- a changing circuit for setting information relative to the kind of light source by manual operation independently of the detection result provided by said detecting circuit;
- a holding circuit for holding the detecting result provided by said detecting circuit;
- a recording controlling circuit for causing data which corresponds to the detection result or data which corresponds to the information set by said changing circuit to be recorded on said recording part, wherein, said changing circuit changing the detection result held by said holding circuit into other information, and said recording controlling circuit causing data which corresponds to a content of said holding circuit to be recorded.

7. A camera system according to claim 6, wherein said recording part is a magnetic recording part provided on a film.

8. A camera system capable of causing a detecting circuit to detect information relative to the kind of illumination light source and causing a detection result provided by said detecting circuit to be recorded on a recording part, comprising:

- a a displaying circuit for displaying the kind of illumination light source detected by the detecting circuit;
- b a changing circuit for setting information relative to the kind of light source by manual operation independently of the detection result provided by said detecting circuit; and
- c) a recording controlling circuit for causing data which corresponds to the detection result or data which corresponds to the information set by said changing circuit to be recorded on said recording part,
- wherein said camera system further comprising a selecting circuit for manually selecting either of the information set by said changing circuit and the detection result provided by said detecting circuit to cause data which corresponds to the selected information or detection result to be recorded.

9. A camera system according to claim 8, wherein said recording part is a magnetic recording part provided on a film.

10. A camera system capable of causing a detecting circuit to detect information relative to the kind of illumination light source and causing a detection result provided by said detecting circuit to be recorded on a recording part, comprising a recording controlling circuit for when the detection result provided by said detecting circuit represents information relative to an unknown illumination light source, causing data representative of unknown to be recorded on said recording part, wherein said detecting circuit includes a color metric information detecting circuit which has a color metric sensor and detects a color information of the illumination light source, and judges a first light source when the detected color information belongs to a first region a second light source when the detected color information belongs to a second region and an unknown light source when the detected color information belongs to a third region.

11. A camera system capable of causing a detecting circuit to detect information relative to the kind of illumination light source and causing a detection result provided by said detecting circuit to be recorded on a recording part, comprising a recording controlling circuit for when the detection result provided by said detecting circuit represents information relative to an unknown illumination light source, causing data representative of unknown to be recorded on said recording part, wherein said detecting circuit includes a calorimetric circuit and a flicker detecting circuit for detecting a flicker signal of a received-light signal, said detecting circuit being arranged to determine that the kind of illumination light source is unknown, when the kinds of illumination light sources independently detected by said colorimetric circuit and said flicker detecting circuit do not coincide with each other.

12. A camera system capable of causing a detecting circuit to detect information relative to the kind of illumination light source and causing a detection result provided by said detecting circuit to be recorded on a recording part, comprising a recording controlling circuit for, when the detecting result provided by said detecting circuit represents information relative to an unknown illumination light source, causing data representative of unknown to be recorded on said recording part, wherein said detecting circuit has a flicker detecting circuit which detects a flicker of a received signal, and a determinating circuit which determines a level of the flicker detected by the flicker detecting circuit and determines a kind of light source according to the determined level of the flicker, said determinating circuit determining an unknown light source when the detected level is between a first and second levels.

13. A camera system capable of causing a detecting circuit to detect information relative to the kind of illumination light source and causing a detection result provided by said detecting circuit to be recorded on a recording part, comprising a recording controlling circuit for when the detection result provided by said detecting circuit represents information relative to an unknown illumination light source, causing data representative of unknown to be recorded on said recording part, wherein said detecting circuit has a first light source determinating circuit and a light measuring circuit, said first light source determining circuit determines a kind of light source, and said detecting circuit has further a second light source determining circuit which determines an unknown light source on the basis of an output of the light measuring circuit and the kind of light source determined by the first light source determining circuit.

* * * * *

UNITED STATES PATENT AND TRADEMARK OFFICE
CERTIFICATE OF CORRECTION

PATENT NO. : 6,201,932 B1
DATED : March 13, 2001
INVENTOR(S) : Shinichi Tsujimoto It is certified that error appears in the above-identified patent and that said Letters Patent is hereby corrected as shown below:

Column 1,
Line 5, delete "No,." and insert -- No., --.

Column 5,
Line 58, delete "calorimetric" and insert -- colorimetric --.

Column 7,
Line 46, delete "calorimetric" and insert -- colorimetric --.
Lines 61,65, and 67, delete "BIG" and insert -- B/G --.

Column 8,
Line 56, delete "calorimetric" and insert -- colorimetric --.

Column 10,
Line 31, delete "calorimetric" and insert -- colorimetric --.

Column 13,
Line 3, before "sensor" delete "calorimetric" and insert -- colorimetric --.
Line 3, before "information" delete "calorimetric" and insert -- colorimetric --.

Column 14,
Line 66, delete "calorimetric" and insert -- colorimetric --.

Column 15,
Line 30, delete "calorimetric" and insert -- colorimetric --.

Column 16,
Line 39, delete "silo" and insert -- S110 --.

Column 19,
Line 50, before "means" delete "calorimetric" and insert -- colorimetric --.
Line 50, after "the" delete "calorimetirc" and insert -- colorimetric --.

Column 20,
Line 43, delete "calorimetric" and insert -- colorimetric --.

Column 23,
Line 20, delete "calorimetric" and insert -- colorimetric --.

UNITED STATES PATENT AND TRADEMARK OFFICE
CERTIFICATE OF CORRECTION

PATENT NO. : 6,201,932 B1
DATED : March 13, 2001
INVENTOR(S) : Shinichi Tsujimoto It is certified that error appears in the above-identified patent and that said Letters Patent is hereby corrected as shown below:

Column 24,
Line 39, delete "calorimetric" and insert -- colorimetric --.
Line 48, delete "calorimetric" and insert -- colorimetric --.

Column 25,
Line 28, delete "calorimetric" and insert -- colorimetric --.
Line 41, delete "calorimetric" and insert -- colorimetric --.

Column 26,
Line 5, delete "calorimetric" and insert -- colorimetric --.

Column 28,
Line 25, delete "calorimetric" and insert -- colorimetric --.

Signed and Sealed this

First Day of January, 2002

Attest:

JAMES E. ROGAN
*Attesting Officer*     *Director of the United States Patent and Trademark Office*